United States Patent
Beveridge et al.

(10) Patent No.: US 10,819,776 B2
(45) Date of Patent: Oct. 27, 2020

(54) AUTOMATED RESOURCE-PRICE CALIBRATION AND RECALIBRATION BY AN AUTOMATED RESOURCE-EXCHANGE SYSTEM

(71) Applicant: VMware, Inc., Palo Alto, CA (US)

(72) Inventors: Daniel Beveridge, Apollo Beach, FL (US); Ricky Trigalo, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 407 days.

(21) Appl. No.: 15/730,243

(22) Filed: Oct. 11, 2017

(65) Prior Publication Data

US 2018/0063235 A1 Mar. 1, 2018

Related U.S. Application Data

(63) Continuation-in-part of application No. 15/285,355, filed on Oct. 4, 2016.
(Continued)

(51) Int. Cl.
*G06F 17/00* (2019.01)
*H04L 29/08* (2006.01)
*G06Q 30/02* (2012.01)

(52) U.S. Cl.
CPC ..... *H04L 67/1023* (2013.01); *G06Q 30/0206* (2013.01); *H04L 67/1021* (2013.01)

(58) Field of Classification Search
CPC ............ H04L 67/1023; H04L 67/1021; G06Q 30/0206
See application file for complete search history.

(56) References Cited

U.S. PATENT DOCUMENTS

| | | | |
|---|---|---|---|
| 6,553,347 B1 * | 4/2003 | Tavor | G06Q 10/083 705/1.1 |
| 2012/0221454 A1 * | 8/2012 | Morgan | G06F 9/5027 705/37 |

(Continued)

OTHER PUBLICATIONS

Mihailescu et al. Strategy-Proof Dynamic Resource Pricing of Multiple Resource Types on Federated Clouds. 2010 (Year: 2010).*
(Continued)

*Primary Examiner* — Syed H Hasan

(57) ABSTRACT

The current document is directed a resource-exchange system that facilitates resource exchange and sharing among computing facilities. The currently disclosed methods and systems employ efficient, distributed-search methods and subsystems within distributed computer systems that include large numbers of geographically distributed data centers to locate resource-provider computing facilities that match the resource needs of resource-consumer computing-facilities based on attribute values associated with the needed resources, the resource providers, and the resource consumers. The resource-exchange system monitors and controls resource exchanges on behalf of participants in the resource-exchange system in order to optimize resource usage within participant data centers and computing facilities. The resource-exchange system automatically determines resource pricing on behalf of participant resource-provider computing facilities and subsequently recalibrates resource pricing on behalf of participant resource-provider computing facilities to steer hosting requests towards proportionate consumption of resources allocated by the resource-provider computing facilities to the resource-exchange system.

20 Claims, 67 Drawing Sheets

Related U.S. Application Data

(60) Provisional application No. 62/380,450, filed on Aug. 28, 2016.

(56) References Cited

U.S. PATENT DOCUMENTS

| | | | | |
|---|---|---|---|---|
| 2013/0073724 | A1* | 3/2013 | Parashar | G06F 9/5038 709/224 |
| 2014/0278623 | A1* | 9/2014 | Martinez | G06Q 10/06 705/7.12 |
| 2015/0067171 | A1* | 3/2015 | Yum | G06F 9/5072 709/226 |
| 2015/0206207 | A1* | 7/2015 | Narasimhan | G06Q 30/0283 705/400 |
| 2015/0222723 | A1* | 8/2015 | Adapalli | H04L 67/2809 705/26.41 |
| 2015/0326449 | A1* | 11/2015 | Melander | H04L 41/5054 709/226 |
| 2017/0357532 | A1* | 12/2017 | Miraftabzadeh | H04L 41/0896 |
| 2018/0197161 | A1* | 7/2018 | Kuzkin | G06Q 20/00 |

OTHER PUBLICATIONS

Rochwerger et al. The Reservoir model and architecture for open federated. 2009. (Year: 2009).*
Woo et al., Optimal application allocation on multiple public clouds. 2014. (Year: 2014).*
Kash et al. Pricing the Cloud. 2015. (Year: 2015).*
Mihailescu et al. Dynamic Resource Pricing on Federated Clouds. 2010. (Year: 2010).*
Wang et al. Revenue Maximization with Dynamic Auctions in IaaS Cloud Markets. 2014. (Year: 2014).*
Xu et al. Dynamic Cloud Pricing for Revenue Maximization. 2013. (Year: 2013).*
International Search Report, dated Nov. 29, 2017.

* cited by examiner

1540 — filter    attribute : relational_expression

1542 — policy    filter
                 {filter, filter}
                 {filter, filter, . . . , filter}

1544 — search_evaluation_expression    evaluator
                                       {evaluator, evaluator}
                                       {evaluator, evaluator, . . . , evaluator}

1546 — evaluator    simple_evaluator
                    weight, simple_evaluator 1548 — simple evaluator    minimum-positive_attribute
                           floor, minimum-positive_attribute 1550 — minimum-positive_attribute    numeric or ordered-set attribute with values that map to a set of numerically increasing values ordered in descending order with respect to desirability or fitness 1552 — search    search_evaluation_expression
                 search_evaluation_expression, policy
                 search_evaluation_expression, {policy, . . . , policy}

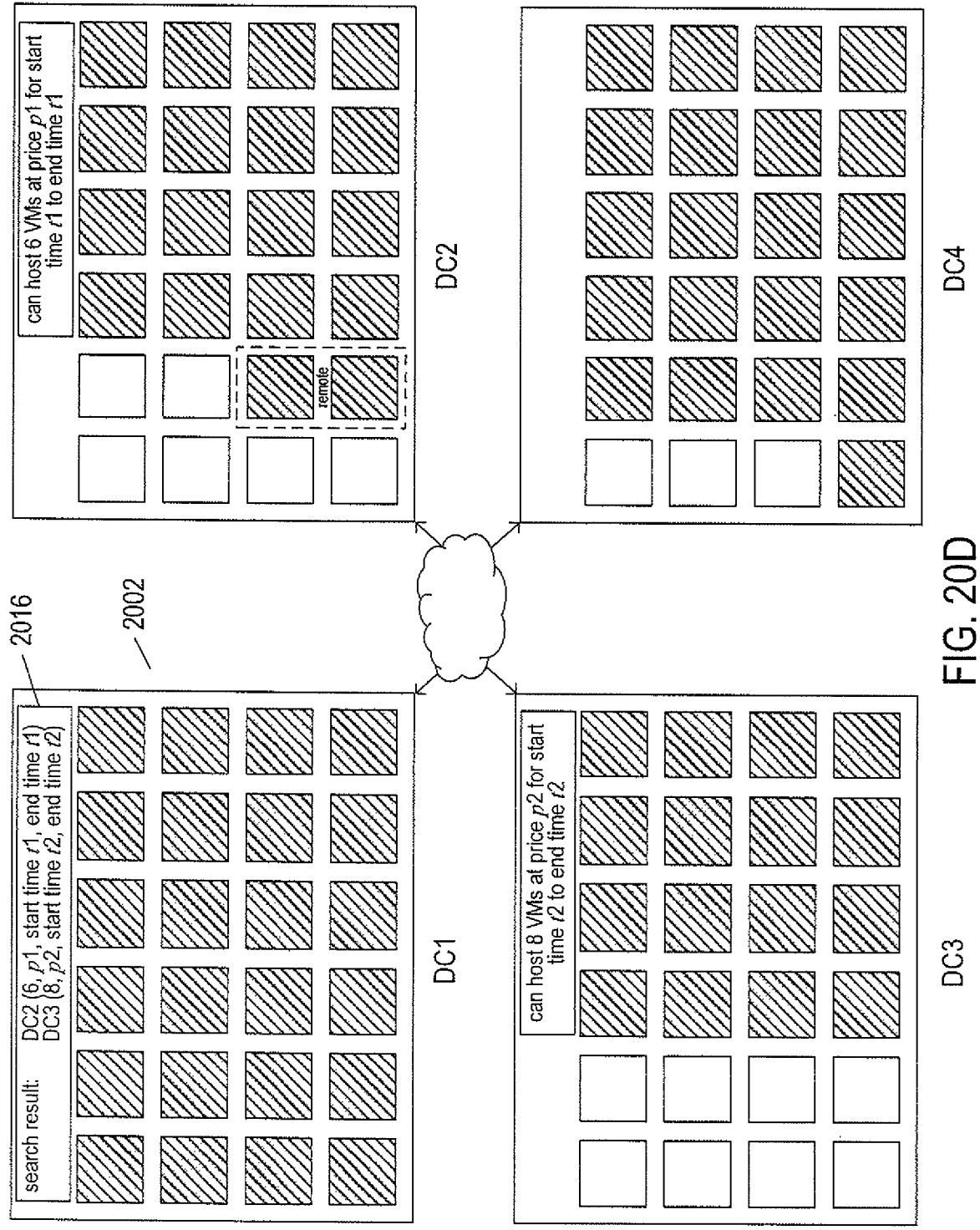

$$\text{Price\_Adjustment}_x = \begin{cases} \text{when } R_x < 1, \ 1 + (1 - R_x)(\text{maxIncrease}), \\ \text{when } R_x > 1, \ 1 - (1 - R^{-1}_x)(\text{maxDecrease}), \\ \text{otherwise } 1 \end{cases} \right\} 2571$$

$$\text{Price}_x = \text{Price\_Adjustment}_x P_x \quad \text{---} 2572$$

$$(1 - \text{maxDecrease})(P_x) \leq \text{Price}_x \leq (1 + \text{maxIncrease})(P_x) \quad \text{---} 2573$$

FIG. 25E

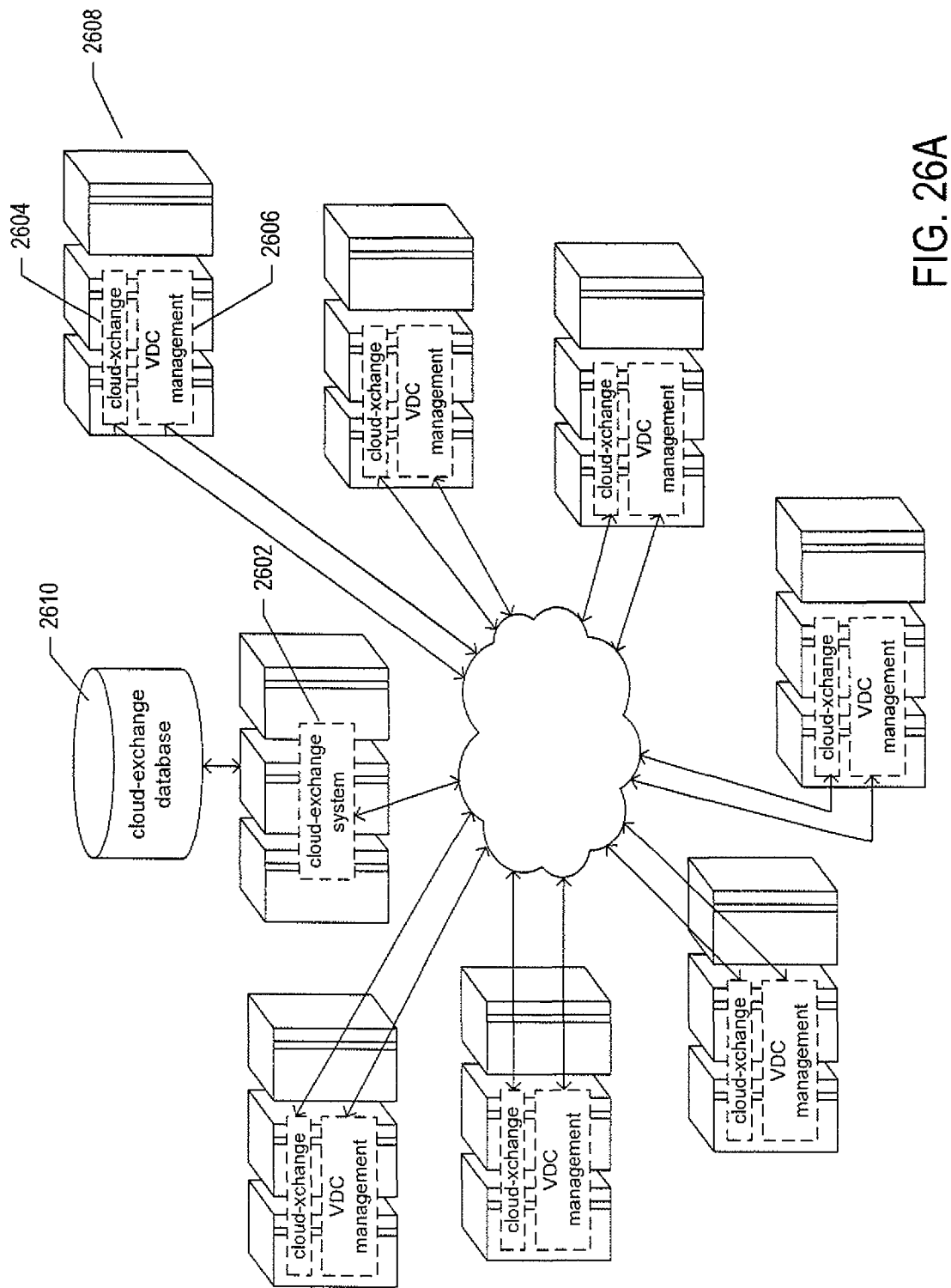

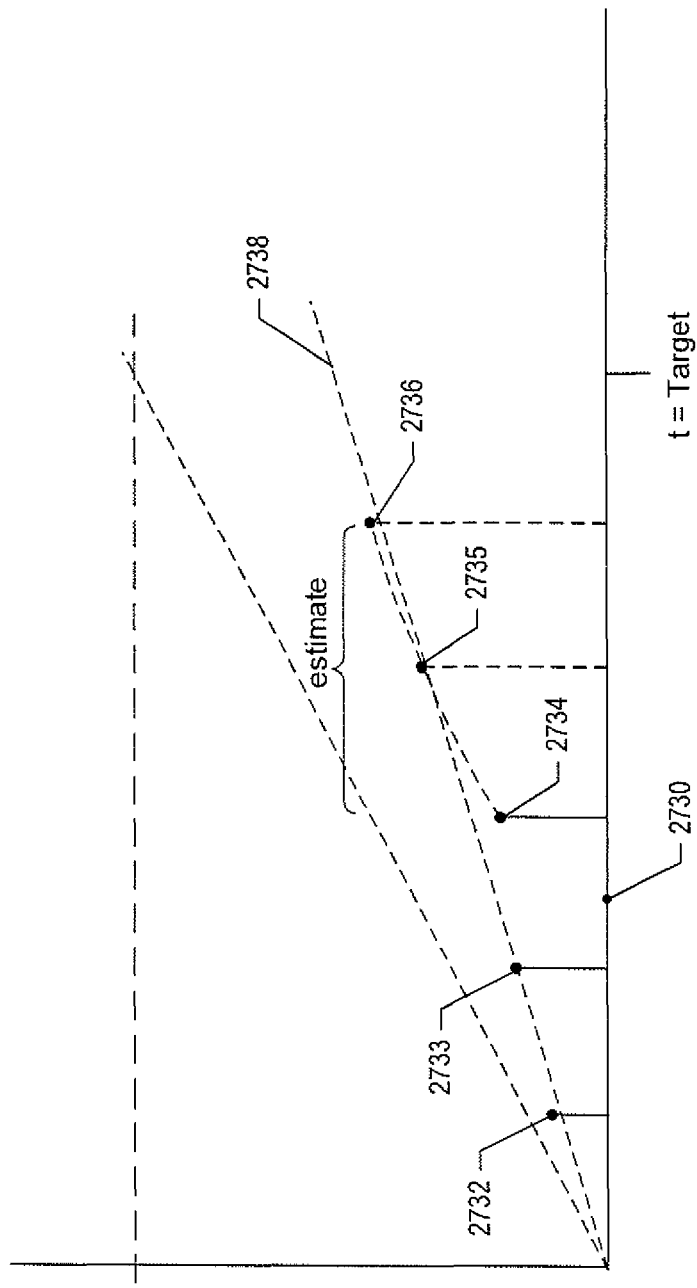

AUTOMATED RESOURCE-PRICE CALIBRATION AND RECALIBRATION BY AN AUTOMATED RESOURCE-EXCHANGE SYSTEM

CROSS-REFERENCE TO RELATED APPLICATIONS

This application is a continuation-in-part of application Ser. No. 15/285,355, filed Oct. 4, 2016, which claims the benefit of Provisional Application No. 62/380,450, filed Aug. 28, 2016.

TECHNICAL FIELD

The current document is directed to distributed computer systems, distributed-computer-system management subsystems, and, in particular, to methods and systems within a resource-exchange system that automatically calibrate and recalibrate resource prices on behalf of resource-provider-computing-facility hosts.

BACKGROUND

Computer systems and computational technologies have steadily evolved, during the past 70 years, from initial vacuum-tube-based systems that lacked operating systems, compilers, network connectivity, and most other common features of modern computing systems to vast distributed computing systems that include large numbers of multiprocessor servers, data-storage appliances, and multiple layers of internal communications networks interconnected by various types of wide-area networks and that provide computational resources to hundreds, thousands, tens of thousands, or more remote users. As operating systems, and virtualization layers have been developed and refined, over the years, in parallel with the advancements in computer hardware and networking, the robust execution environments provided by distributed operating systems and virtualization layers now provide a foundation for development and evolution of many different types of distributed application programs, including distributed database-management systems, distributed client-server applications, and distributed web-based service-provision applications. This has resulted in a geometric increase in the complexity of distributed computer systems, as a result of which owners, administrators, and users of distributed computer systems and consumers of computational resources provided by distributed computing systems increasingly rely on automated and semi-automated management and computational-resource-distribution subsystems to organize the activities of many users and computational-resource consumers and to control access to, and use of, computational resources within distributed computer systems. In many cases, greater overall computational efficiency can be obtained for a large number of distributed computing facilities when resources can be shared and exchanged among the distributed computing facilities. However, currently, effective resource sharing and exchange among computing facilities of multiple organizations is generally difficult or impossible.

SUMMARY

The current document is directed a resource-exchange system that facilitates resource exchange and sharing among computing facilities. The currently disclosed methods and systems employ efficient, distributed-search methods and subsystems within distributed computer systems that include large numbers of geographically distributed data centers to locate resource-provider computing facilities that match the resource needs of resource-consumer computing-facilities based on attribute values associated with the needed resources, the resource providers, and the resource consumers. The resource-exchange system monitors and controls resource exchanges on behalf of participants in the resource-exchange system in order to optimize resource usage within participant data centers and computing facilities. The resource-exchange system automatically determines resource pricing on behalf of participant resource-provider computing facilities and subsequently recalibrates resource pricing on behalf of participant resource-provider computing facilities to steer hosting requests towards proportionate consumption of resources allocated by the resource-provider computing facilities to the resource-exchange system.

BRIEF DESCRIPTION OF THE DRAWINGS

FIGS. 15A-C illustrate certain of the information and data entities used within the currently disclosed distributed-search methods and subsystems.

FIGS. 19A-B illustrate operation of the evaluator queues and master queue within an active search context.

FIGS. 20A-E illustrate the concept of resource exchange among cloud-computing facilities, data centers, and other computing facilities.

FIGS. 25A-E illustrate an automated-initial-pricing strategy for resource-provider resources that attempts to force hosting requests towards requested-resource proportions that mirror the proportions of resource capacities in the resource pool provided by the resource provider to the cloud-exchange system.

FIGS. 26A-B illustrate the type of data acquired and maintained by the cloud-exchange system for a variety of purposes, including for calibrating and recalibrating resource prices automatically on behalf of resource providers.

FIGS. 27A-E illustrate automated resource-pricing recalibration by the cloud-exchange system on behalf of resource-provider participants.

DETAILED DESCRIPTION

The current document is directed to a resource exchange that facilitates resource sharing among multiple computing facilities. In a first subsection, below, an overview of the problem domain addressed by the currently disclosed methods and systems is provided in a first subsection. A second subsection provides an overview of computer systems, virtualization layers, and distributed computer systems. A third subsection describes a distributed search engine and a fourth subsection provides a brief description of a distributed resource-exchange system that employs the distributed search engine and that aggregates a large number of physical and virtual data centers to create a distributed, multi-organization computing, resource-exchange, and resource-sharing facility. Finally, a fifth subsection discloses automated price calibration and price recalibration by a cloud-exchange system on behalf of resource-provider-computing-facility participants of the cloud-exchange system.

The Problem Domain Addressed by the Currently Disclosed Methods and Systems

Figure 1:
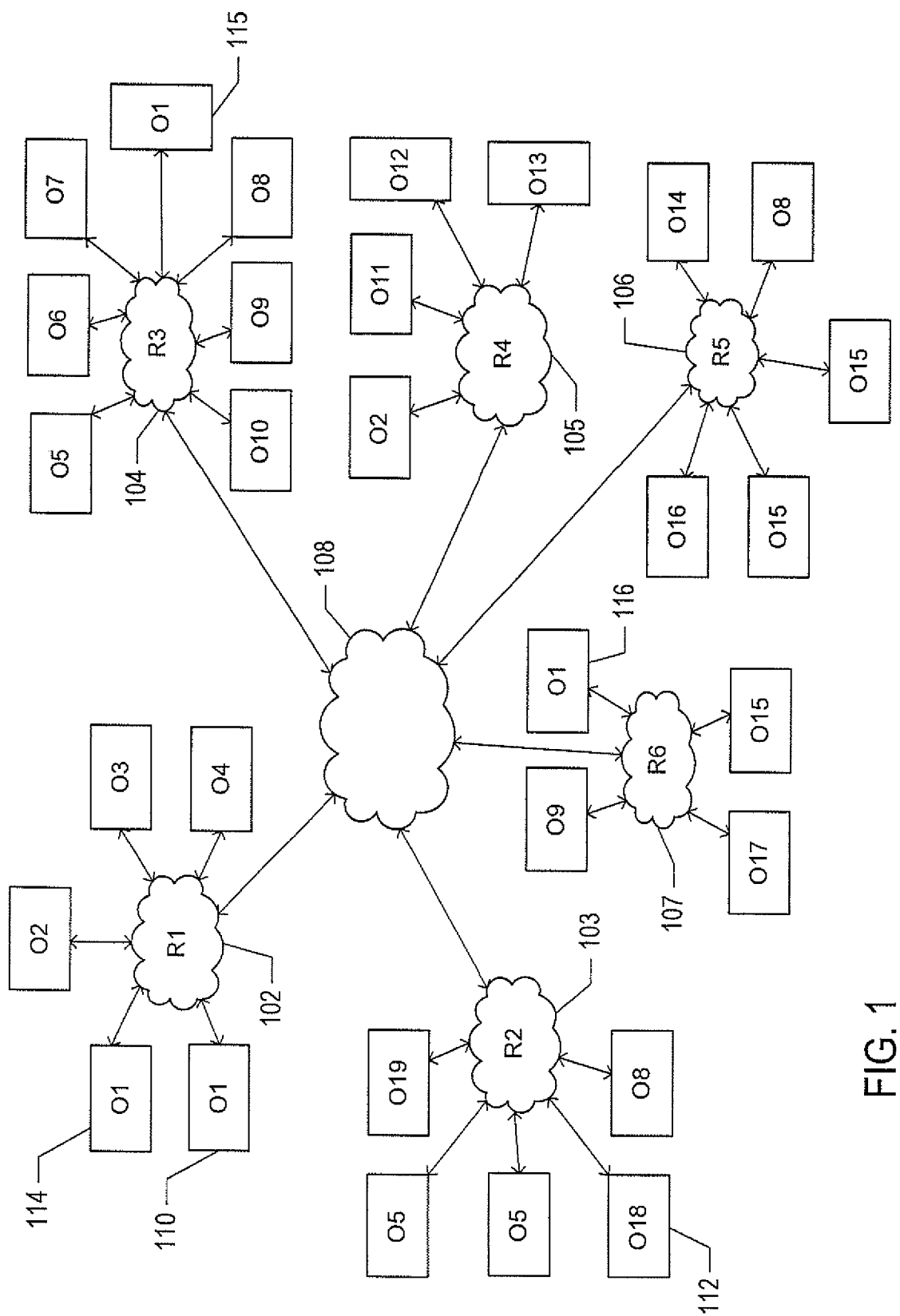
FIGS. 1, 2A-E, and 3 illustrate the problem domain addressed by the methods and systems disclosed in the current document.
Figure 2A:
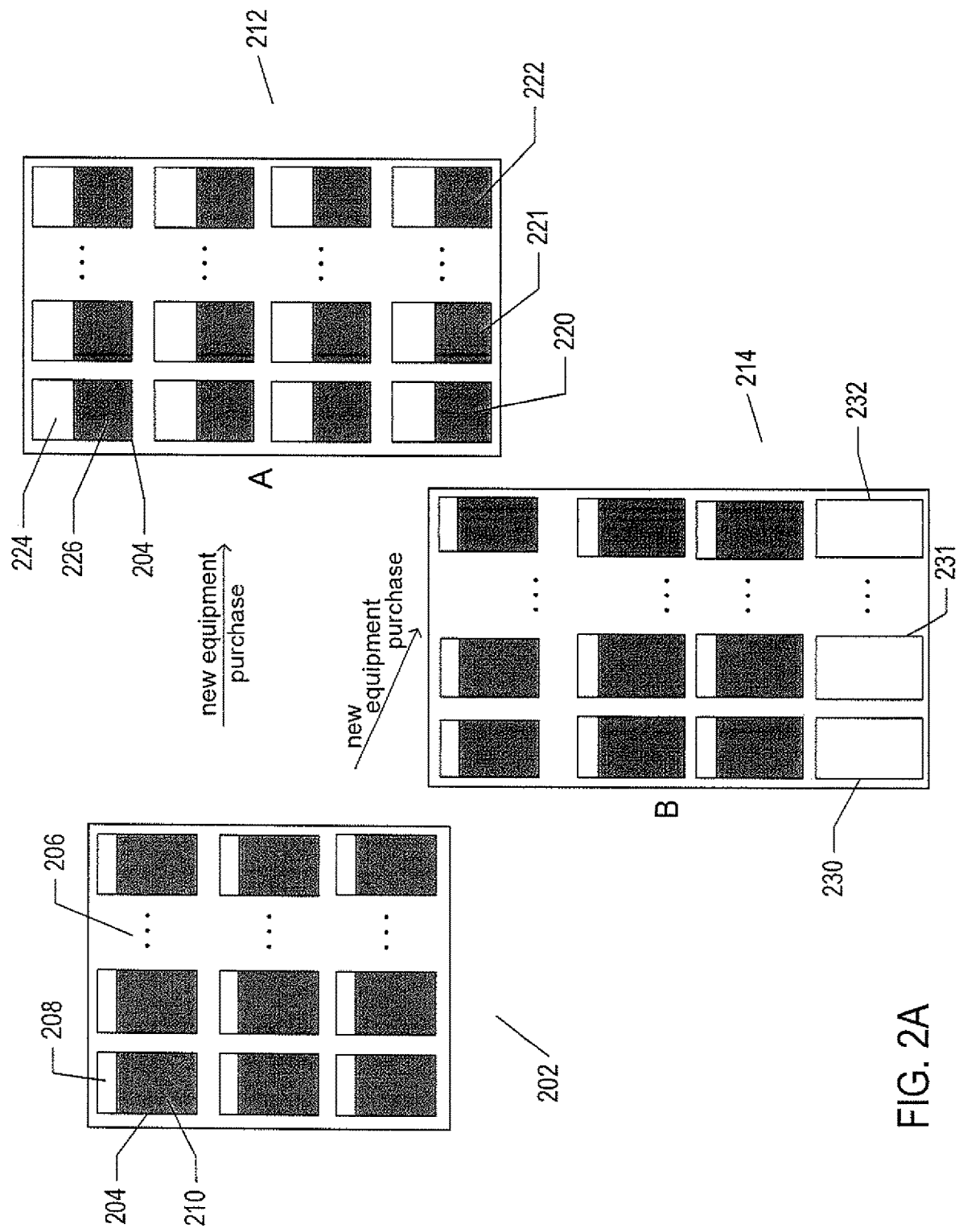
Figure 2B:
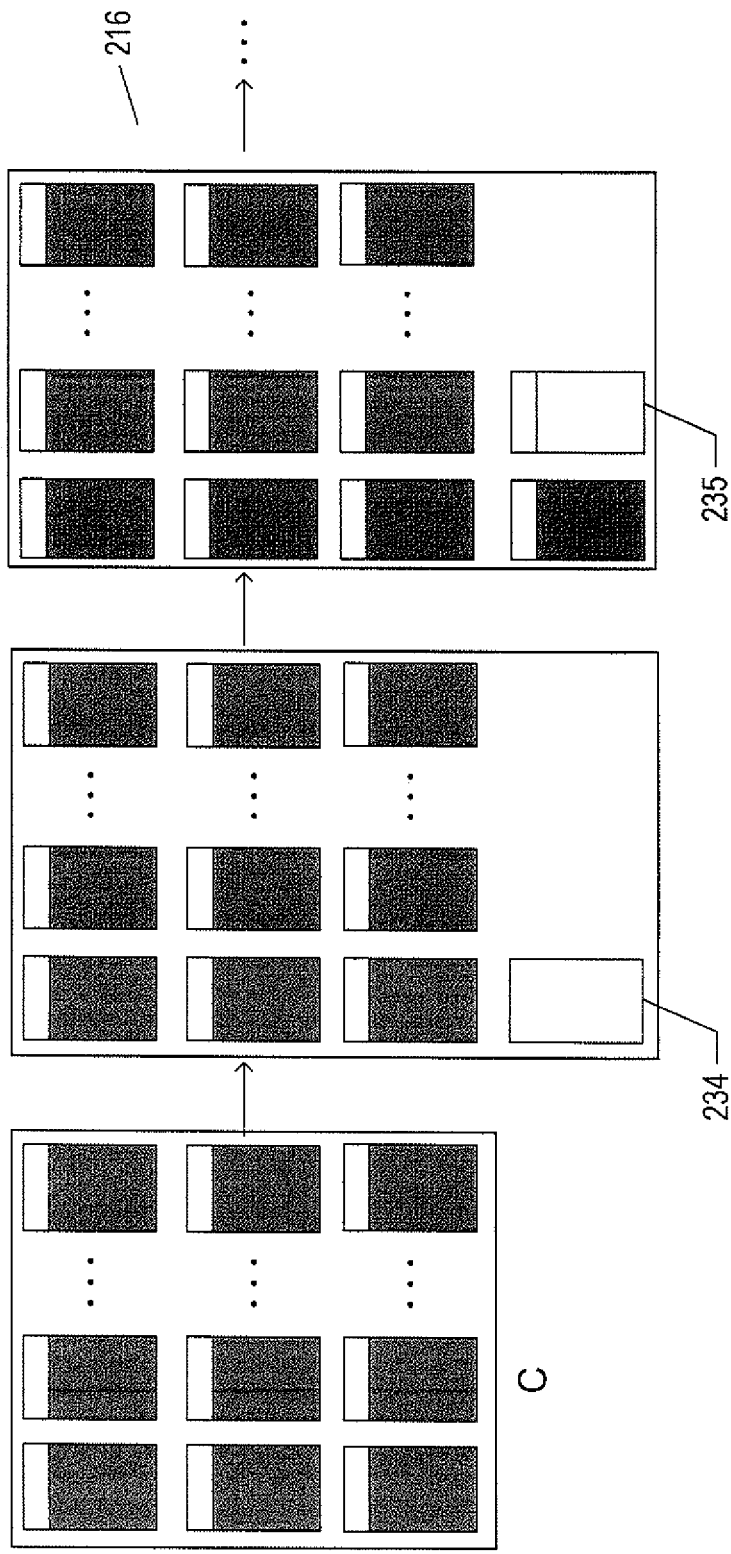
Figure 2C:
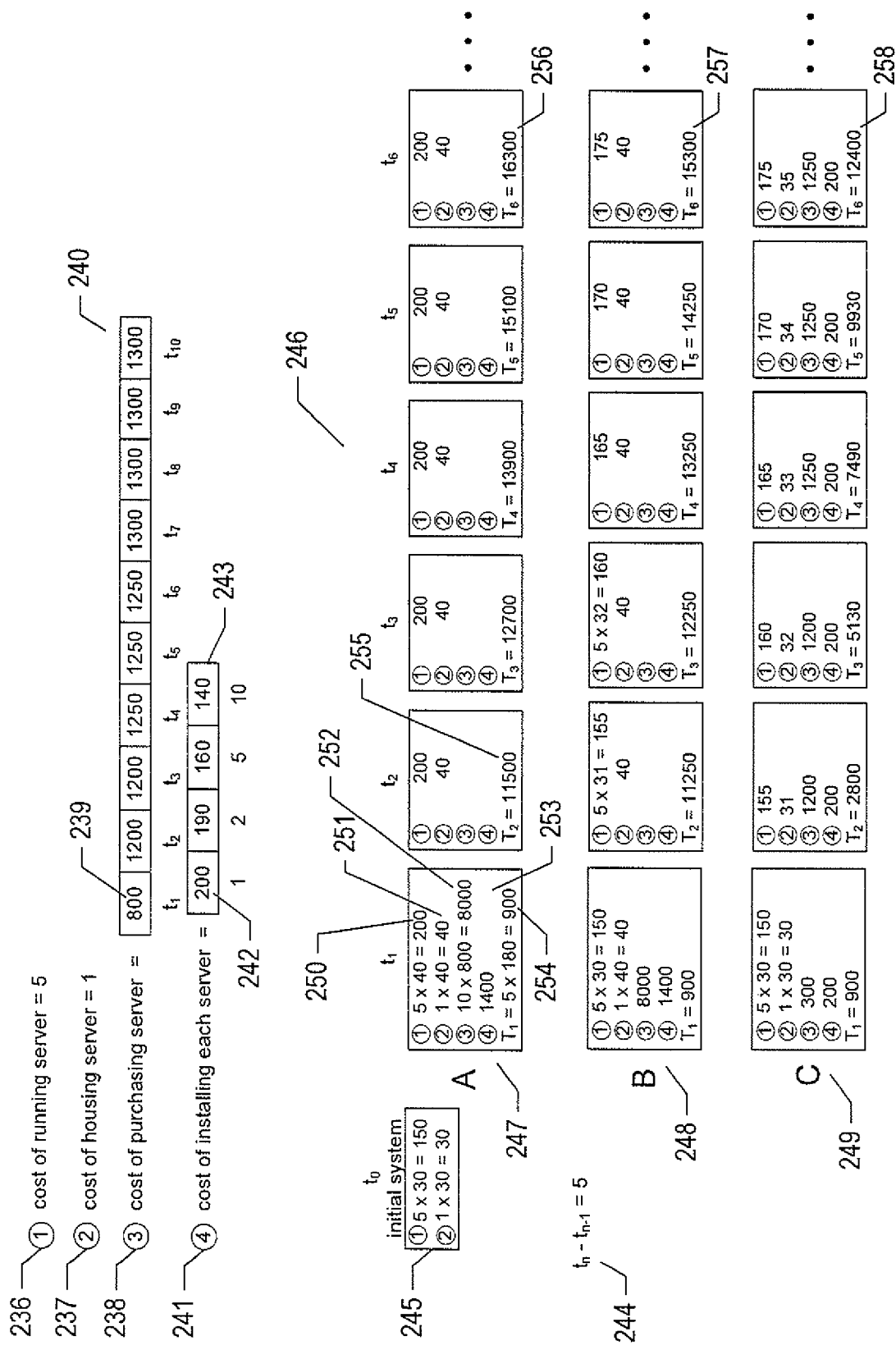
Figure 2D:
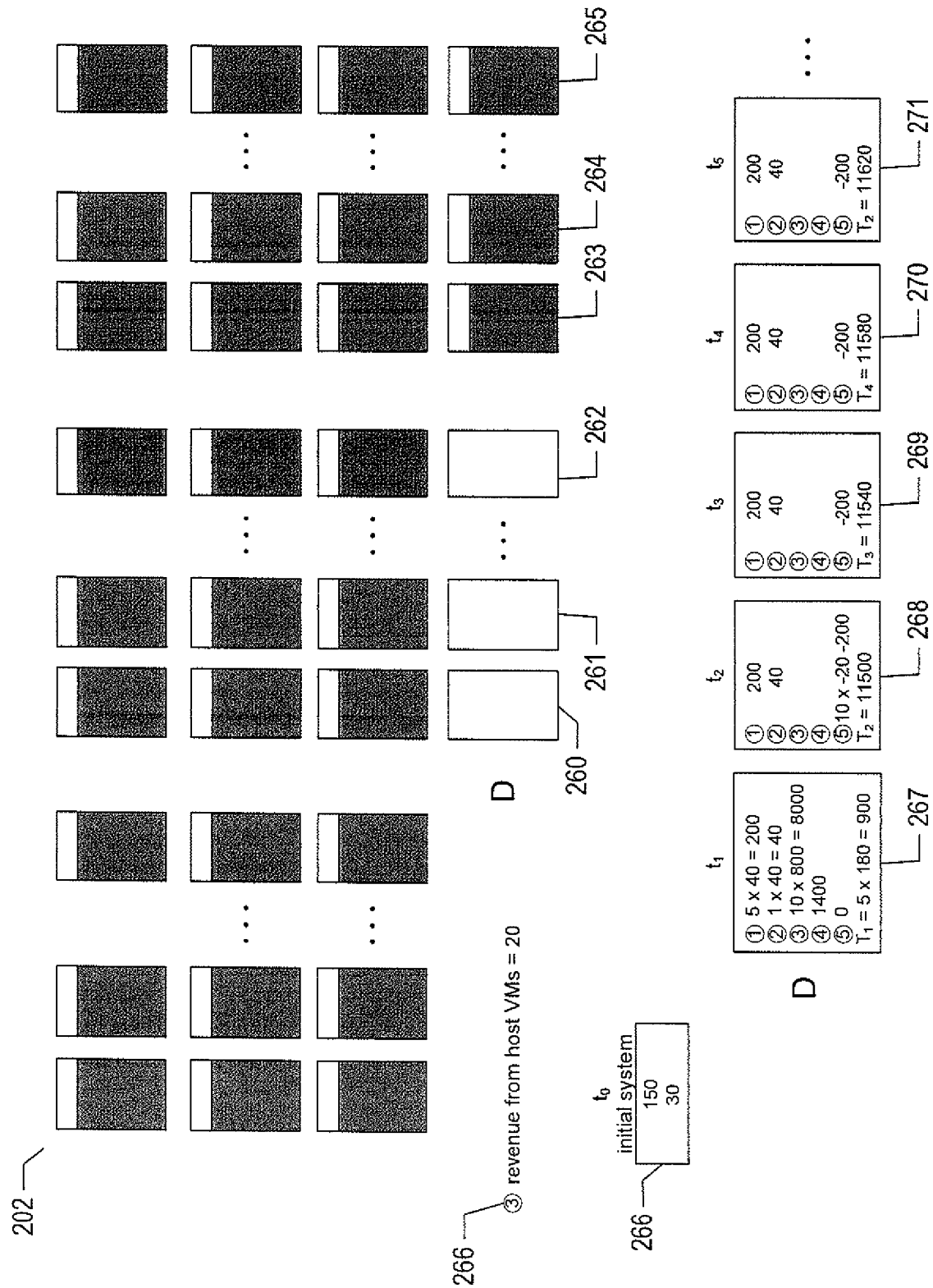
Figure 2E:
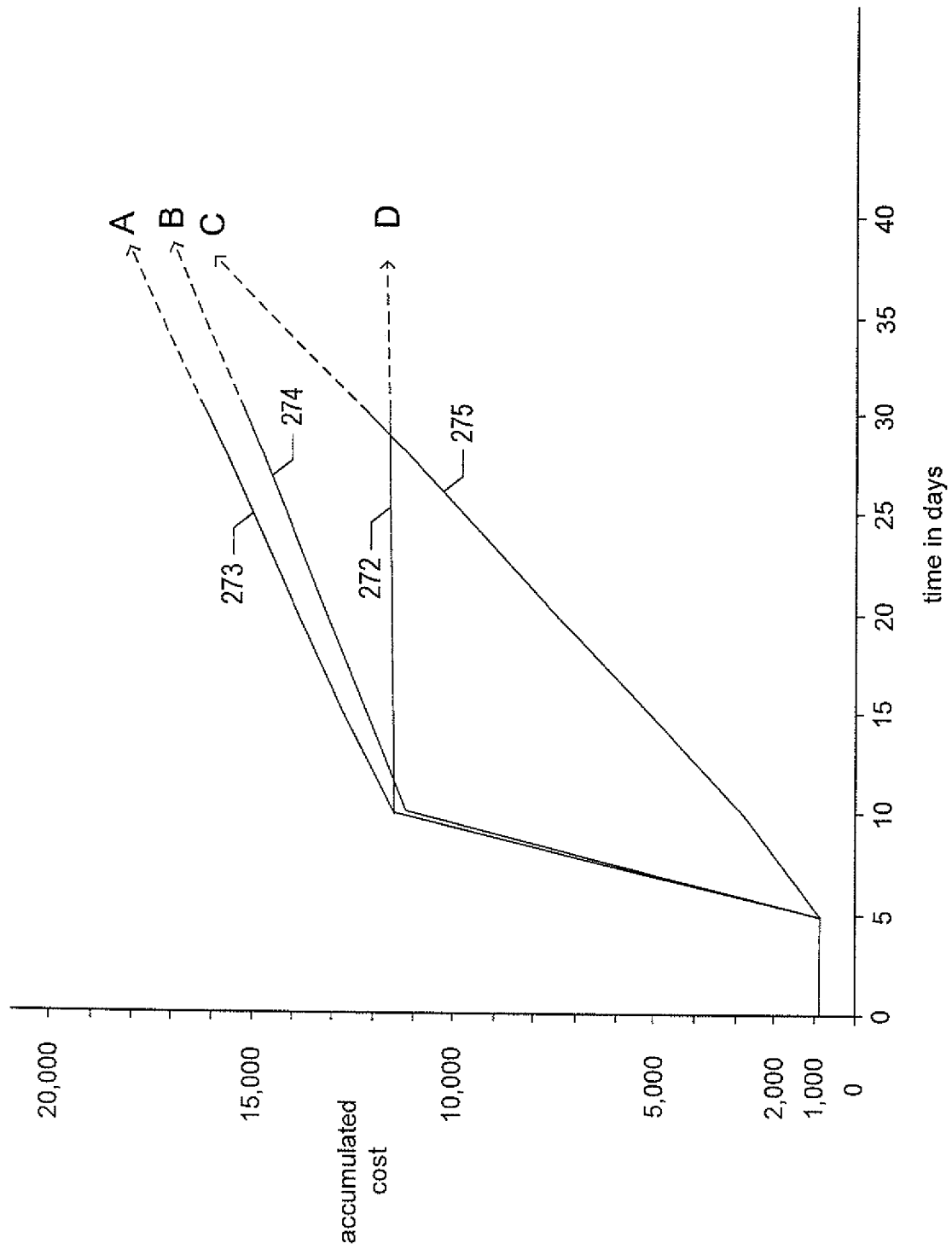
Figure 3:
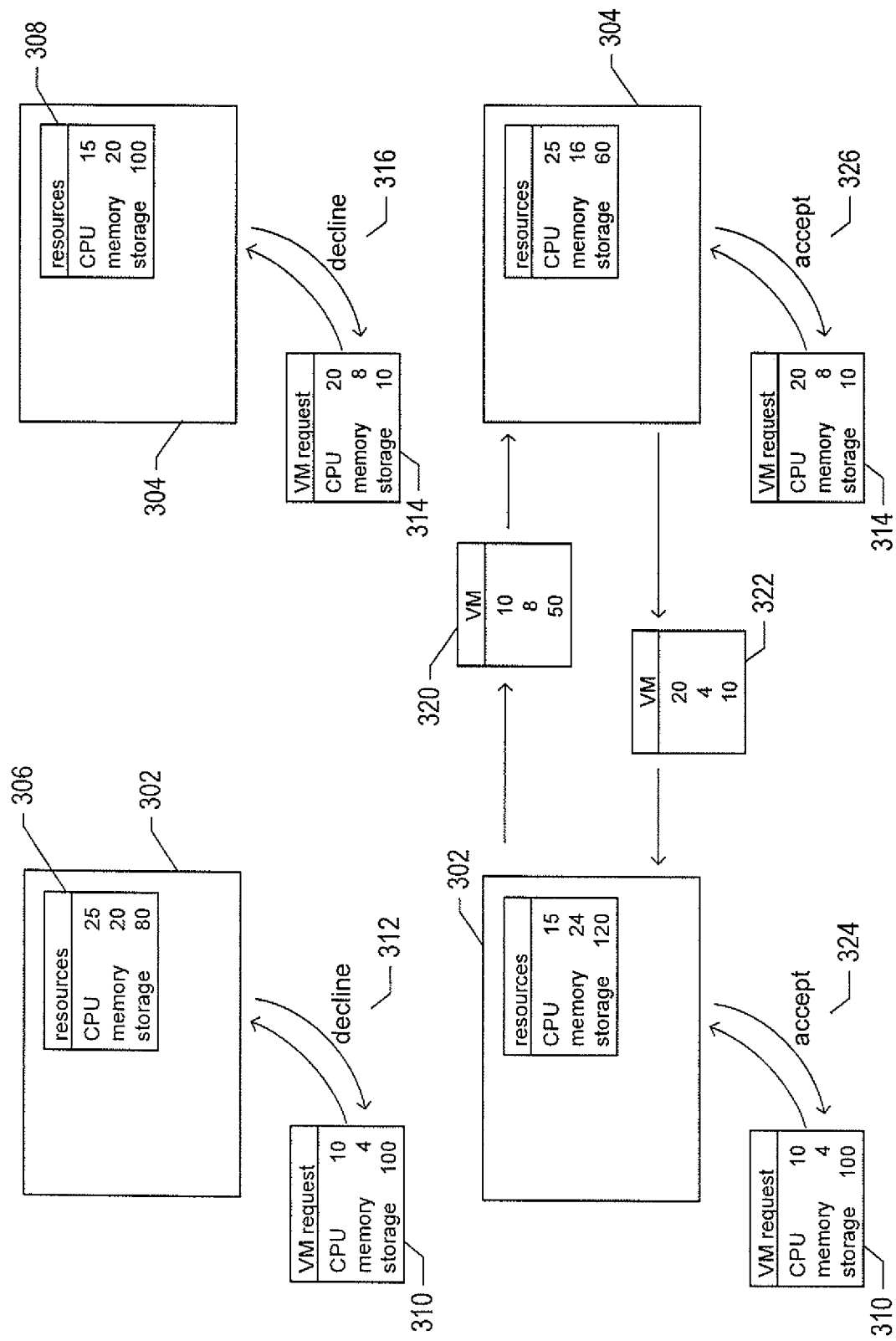

FIGS. 1-3 illustrate the problem domain addressed by the methods and systems disclosed in the current document. FIG. 1 shows a large number of virtual and physical data centers spread throughout a large geographical area. Each virtual/physical data center may include hundreds to thousands of individual computer systems along with internal networking and pooled mass-storage resources. Although only 30 virtual/physical data centers are shown in FIG. 1, hundreds to thousands of virtual/physical data centers may be spread throughout a large geographical area. As shown in FIG. 1, the virtual/physical data centers are connected to regional communications hubs 102-107, which are, in turn, interconnected through wide-area networking 108. Each virtual/physical data center is represented by a rectangle, such as virtual/physical data center 110. Each rectangle representing a virtual/physical data center is additionally labeled with an indication of the organization that owns and maintains the virtual/physical data center, such as the indication "O1" within the rectangle representing virtual/physical data center 110. Certain organizations own and maintain only a single virtual/physical data center, including organization "O18," which owns and maintains virtual/physical data center 112. Other organizations own and maintain multiple virtual/physical data centers, including organization "O1," which owns and maintains virtual/physical data centers 110 and 114-116.

Currently, an organization can supplement the computational resources of the organization's one or more virtual/physical data centers by contracting for computational resources from cloud-computing facilities. An organization can configure virtual machines within a cloud-computing facility to remotely run applications and services on behalf of the organization. Use of computational resources provided by cloud-computing facilities allows an organization to expand and contract computational resources in response to increasing and decreasing demand for the services provided by the organization, without purchasing additional physical computer systems to satisfy increased demand and without powering down physical computer systems to lessen ongoing costs associated with spare capacity. The advent of cloud computing has enabled organizations to make use of flexible and dynamic remote computational resources to obtain needed computational resources without needing to purchase, maintain, and manage additional computational resources on-site. However, third-party cloud-computing facilities do not fully address the computational-resource needs of organizations, fail to address the recurring problem of spare capacity within private virtual/physical data centers, and fail to provide seamless migration of virtual machines back and forth between resource consumers and resource providers as well as seamless extension of a resource-consumer's private virtual-machine execution environment into the cloud-based domain of resource providers.

It should be emphasized that the problem domain addressed by the currently disclosed methods and systems is, in general, one of computational efficiency. As discussed below, the automated resource-exchange system, in which the currently disclosed methods and systems are employed, facilitates sharing and exchange of computational resources among very large numbers of virtual/physical data centers that are owned, maintained, and managed by large numbers of different organizations. The resource-exchange system effectively aggregates portions of the computational resources of the large number of virtual/physical data centers for use by organizations in need of additional computational resources. As a result, the large numbers of virtual/physical data centers, as a whole, can achieve significantly greater computational efficiencies through resource exchange and sharing. In other words, the resource-exchange system provides a means for partially aggregating multiple virtual/physical data centers and for increasing the computational efficiency of the partially aggregated virtual/physical data centers.

In the implementations discussed in the current application, the resource-exchange system partially aggregates multiple virtual/physical data centers by providing a largely automated auction-based marketplace in which computational resources are advertised for lease by resource sellers and leased from resource sellers by resource buyers. In other words, the resource-exchange system achieves computational efficiencies through computational-resource transactions. In the described implementations, these transactions involve financial exchanges between buyers and sellers. However, the financial exchanges are used to simplify the complex problems associated with matching buyers to sellers and sellers to buyers. Similar computational efficiencies can be alternatively obtained using more abstract credit exchanges, rather than financial exchanges or by directly trading different types of computational resources and services. However, since many of the various considerations and constraints associated with leasing computational resources and with other types of resource exchanges are naturally expressed in terms of financial costs and benefits, use of financial exchanges represents a significant computational efficiency for the resource-exchange system. The primary goal for creating and operating the resource-exchange system is, despite the use of financial transactions, to increase the overall efficiencies related to owning, maintaining, and the managing virtual/physical data centers rather than to create a new type of financial market.

FIGS. 2A-E illustrate an example of a cost-efficiency increase for a virtual/physical data center made possible by the resource-exchange system. In FIG. 2A, the virtual/physical data center 202 is represented as a large rectangle containing numerous physical server computers, including server 204. In FIGS. 2A-E, multiple ellipses, such as ellipses 206, are used to indicate that a particular row of servers includes many additional servers not explicitly shown in the figures. In the numerical examples that follow, each of the ellipses represents seven servers that are not shown in the figures. Each server, including server 204, is generally shown as including a first unshaded portion, such as portion 208 of server 204, representing unused server resources and a second shaded portion, such as second portion 210, representing currently used server resources. Server 204 is currently being used at 80% of the server's total capacity. In this example, servers are generally loaded to 80% capacity. In the example of FIGS. 2A-E, the organization managing the virtual/physical data center 202 intends to purchase an additional 10 servers due to an expected low price point for servers. Three different strategies for purchasing the 10 additional servers are shown, in FIGS. 2A-B, as strategies A 212, B 214, and C 216.

According to strategy A, the 10 additional servers 220-222 are immediately purchased and installed in the virtual/physical data center 212. Tasks running within the virtual/physical data center 212 are redistributed among the now 40 servers running within the virtual/physical data center. Redistribution of the tasks lowers the use of each server to 60% of capacity, as can be seen by comparing the size of the unshaded portion 224 and shaded portion 226 of server 204 in the virtual/physical data center illustrating strategy A 212 to the unshaded portion 208 and shaded portion 210 of server 204 in the initial 30-server virtual/physical data center 202.

Purchasing the 10 additional servers according to strategy B involves immediately purchasing the 10 additional servers 230-232 but leaving them powered down until there is additional demand within the virtual/physical data center for additional computational resources. Purchasing the 10 additional servers according to strategy C involves purchasing one additional server 234 and waiting to purchase a second additional server 235 until the first additional server 234 approaches use at 80% of capacity.

FIG. 2C illustrates the costs incurred at successive time points by the organization when additional servers are purchased according to strategies A, B, and C. The cost calculations are approximate and based on a coarse, 5-day granularity, but nonetheless relative accurately illustrate the cost implications of the three different strategies. For this simple example, there are four different types of costs associated with acquiring and running servers: (1) the cost of running a server 236, which includes power and maintenance costs, estimated at five dollars per day; (2) the cost of housing the server within the data center 237, estimated to be 1 dollar per day; (3) the cost of purchasing a new server 238, $800 at time $t_1$ (239 in table 240), With purchase-cost increases at subsequent time intervals shown in table 240; and (4) the cost of installing a server in the data center 241, estimated at $200 for installing a single server 242, but less per server as the number of servers installed at a single time point increases, as shown in table 243. In the current example, each interval between successive time points represents five days 244. The initial system includes 30 servers 245 and thus incurs a cost of $150 per day to run the servers and a cost of $30 per day to house the servers. In the lower portion of FIG. 2C 246, the accumulated costs for the data center at successive intervals $t_1$, $t_2$, . . . , $t_6$ are shown for strategy A 247, strategy B 248, and strategy C 249. These costs assume that the purchase of the 10 additional servers begins at time point $t_1$, 5 days following an initial time point $t_0$. For strategy A, at time point $t_1$, the cost for running the 40 servers 250 is $200 per day, the cost for housing the servers 251 is $40 per day, the cost for purchasing the 10 additional servers 252 is $8000, according to table 240, and the cost of installing the 10 additional servers 253 is $1400, according to table 243. The total cost accumulated since time point $t_0$ 253 is $900, which is the cost of running the initial virtual/physical data center 202 per day, $180, multiplied by 5 days. For strategy A at time point $t_2$, the total cost accumulated since time point $t_0$ 255 is $11,500, which includes the total cost 254 of $900 accumulated up to time point $t_1$ along with the price of purchasing and installing the 10 additional servers and 5 times the daily cost of running the servers, $240×5=$1200. As shown in FIG. 2C, by time point $t_6$, the total accumulated cost 256 of strategy A is $16,300, the total accumulated cost 257 of strategy B is $15,300, and the total accumulated cost 258 of strategy C is $12,400. However, the rate of increase in total-accumulated-cost for strategy C is much steeper than those for strategies A and B.

FIG. 2D illustrates a fourth strategy D for purchasing the 10 additional servers made possible by the resource-exchange system. According to the fourth strategy D, the 10 additional servers 260-262 are immediately purchased and installed. However, rather than redistributing tasks within the virtual/physical data center, as in strategy A, the organization managing virtual/physical data center 202 advertises the availability of computational-resource leases to other organizations participating in the marketplace provided by the resource-exchange system. As a result, within a reasonably short period of time, the new additional servers are operating at 80% of capacity 263-2652 executing virtual machines on behalf of remote computational-resource leasing organizations. Because the organization managing virtual/physical data center 202 is leasing the 10 additional servers, there is a negative cost, or revenue 266, associated with the 10 additional servers. Using the same illustration conventions as used in FIG. 2C, the costs associated with strategy D are shown at successive time points 267-271. By comparing these costs to those for strategies A, B, and C, shown in FIG. 2C, the rate of increase in total-accumulated-cost for strategy D is much flatter than those for strategies A, B, and C.

FIG. 2E shows a plot of the total accumulated cost vs. time for the four strategies A, B, C, and D, discussed above with reference to FIGS. 2A-D. Clearly, after less than 30 days, strategy D, represented by cost curve 272, provides a significantly lower accumulated cost then strategies A, B, and C, represented by cost curves 273-275. The resource-exchange system has provided a way for the organization managing virtual/physical data center 202 to maximize use of the computational resources within the virtual/physical data center and, by doing so, minimize operating costs. In addition; the organizations that lease computational resources provided by the 10 additional servers also achieve access to greater computational bandwidth for far less cost than would be incurred by purchasing and installing new physical servers. Considering the data centers participating in the market provided by the resource-exchange system as a large computing-facility aggregation, the aggregate computational efficiency is much higher, when leasing transactions are automatically facilitated by the resource-exchange system, than when no resource exchanges are possible. In the example discussed above with reference to FIGS. 2A-E, a larger fraction of the aggregate computational resources of the data centers are used because additional tasks are being executed by the 10 additional servers. Eventually, the 10 additional servers in data center 202 may be used for executing tasks on behalf of the organization that manages virtual/physical data center 202, once the leases have terminated. But, by initially purchasing the 10 additional servers at time point $t_1$, the organization managing data center 202 has taken advantage of a favorable purchase price for the 10 additional servers at time point $t_1$ without bearing the cost of the spare capacity represented by the 10 additional servers until internal tasks become available.

FIG. 3 illustrates another example of how the resource-exchange system can increase the computational efficiency of an aggregation of virtual/physical data centers. At the top of FIG. 3, two virtual/physical data centers 302 and 304 are shown as large rectangles. Indications 306 and 308 of the currently available computational resources within the virtual/physical data centers 302 and 304 are shown within the rectangles representing virtual/physical data centers 302 and 304. These resources include CPU bandwidth, available memory, and available mass-storage, in appropriate units. The first virtual/physical data center 302 is shown receiving a request 310 to execute an additional task, implemented as a virtual machine, that requires 10 units of CPU bandwidth, 4 units of memory, and 100 units of mass storage. The first virtual/physical data center declines 312 the request because the first virtual/physical data center has insufficient storage resources for executing the virtual machine. Similarly, the second virtual/physical data center 304 receives a request 314 to execute a new virtual machine, but declines 316 the request because the second data lacks sufficient CPU bandwidth to execute the new virtual machine.

The same two virtual/physical data centers 302 and 304 and the same two virtual-machine-execution requests 310 and 314 are again shown in the lower portion of FIG. 3. However, in the example shown in the lower portion of FIG. 3, the two data centers have exchanged two already executing virtual machines 320 and 322 via the marketplace provided by the resource-exchange system. The virtual/physical first data center 302 has leased computational resources from the second virtual/physical data center 304 to execute a storage-intensive virtual machine 320. Because the second virtual/physical data center has an excess of mass-storage resources, the second virtual/physical data center can host virtual machine 320 less expensively than the virtual machine can be executed within the first virtual/physical data center 302. Similarly, the second data center has leased computational resources from the first virtual/physical data center to execute the CPU-bandwidth-intensive virtual machine 322. The result of exchanging virtual machines 320 and 322 is a decrease in the operational costs for both data centers and more balanced ratios of different types of available computational resources within each virtual/physical data center. As a result, the first virtual/physical data center 302 can now accept 324 the virtual-machine-execution request 310 and the second virtual/physical data center 304 can now except 326 the virtual-machine-execution request 314. Thus, due to ongoing computational-resource exchanges made possible by the resource-exchange system, the partial aggregation of the two data centers can run more tasks, with greater overall capacity usage, than in the case that resource exchanges are not possible. The partial aggregation of the two virtual/physical data centers is significantly more computationally efficient because of their use of the marketplace provided by the resource-exchange system.

Thus, although the resource-exchange system is discussed in terms of providing a computational-resource-leasing marketplace, the resource-exchange system is an effective tool for increasing the computational efficiency of a partial aggregation of multiple data centers or multiple clusters within a datacenter. The resource-exchange system functions to increase the fraction of resource-capacity usage in the partial aggregation of multiple data centers as well as to redistribute load in order to balance the ratios of different available computational resources used within each data center to facilitate execution of additional task load.

Overview of Computer Systems and Computer Architecture

Figure 4:
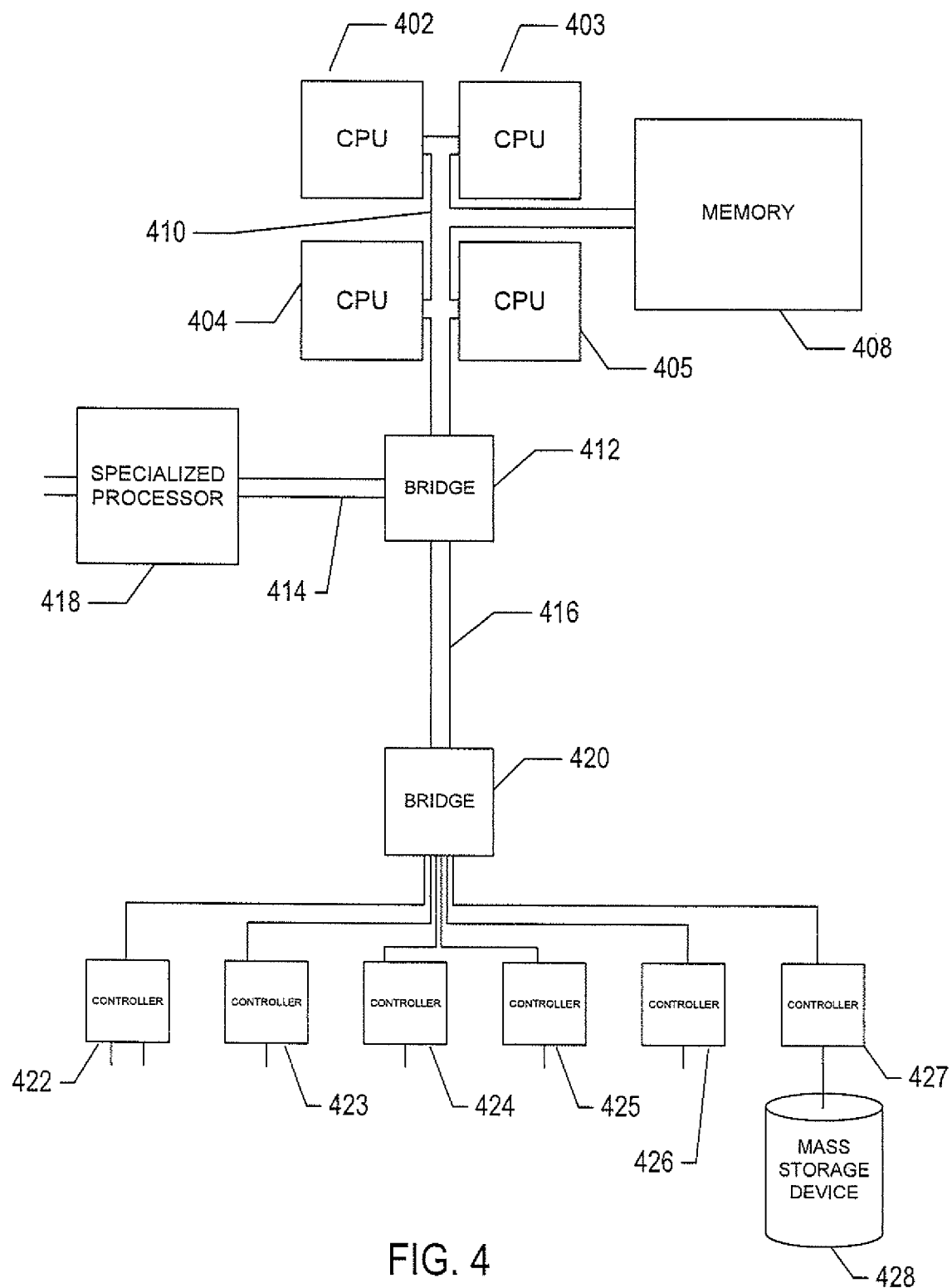
FIG. 4 provides a general architectural diagram for various types of computers.

FIG. 4 provides a general architectural diagram for various types of computers. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different mass-storage devices 428, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 5:
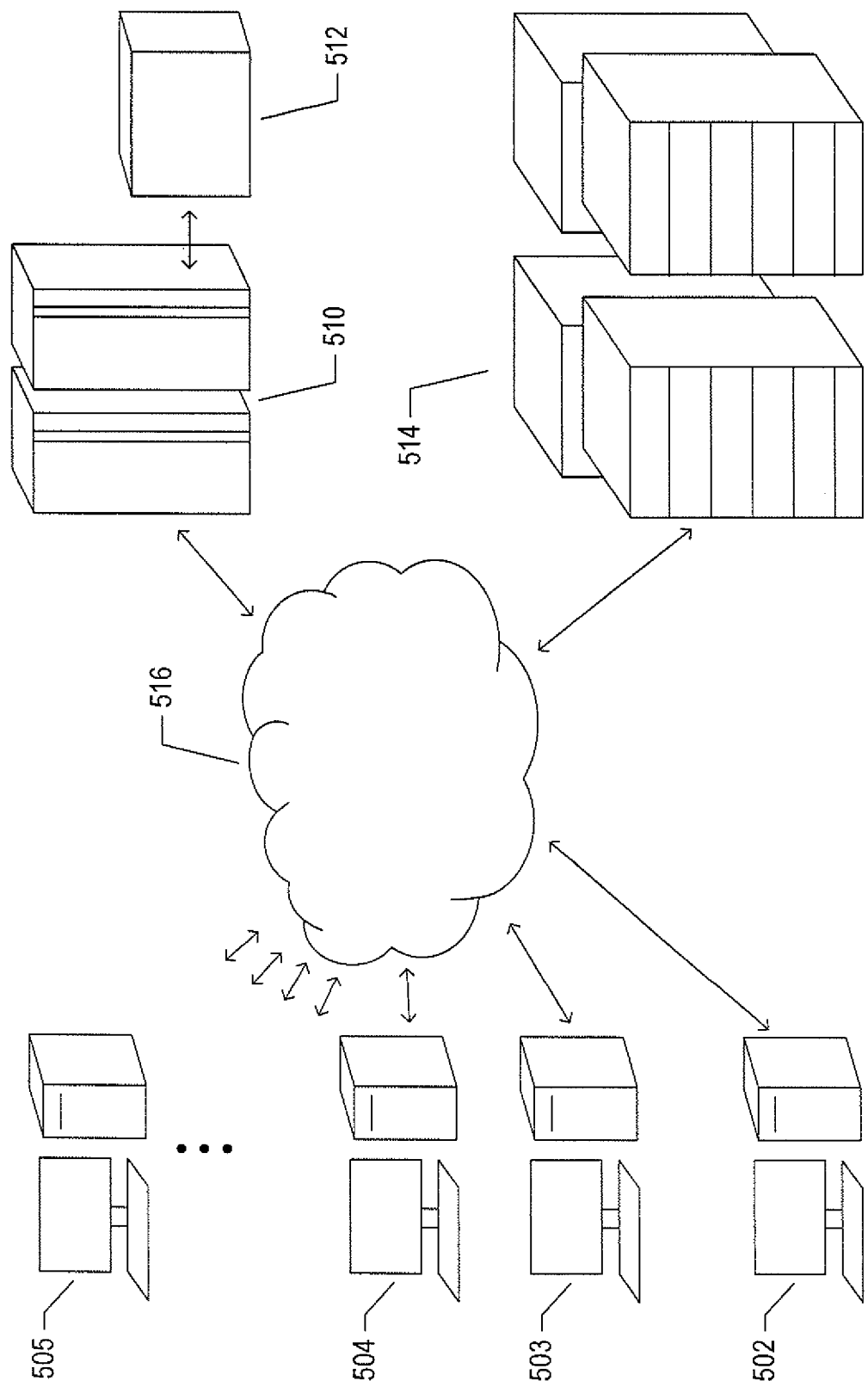
FIG. 5 illustrates an Internet-connected distributed computer system.

FIG. 5 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 5 shows a typical distributed system in which a large number of PCs 502-505, a high-end distributed mainframe system 510 with a large data-storage system 512, and a large computer center 514 with large numbers of rack-mounted servers or blade servers all interconnected through various communications and networking systems that together comprise the Internet 516. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 6:
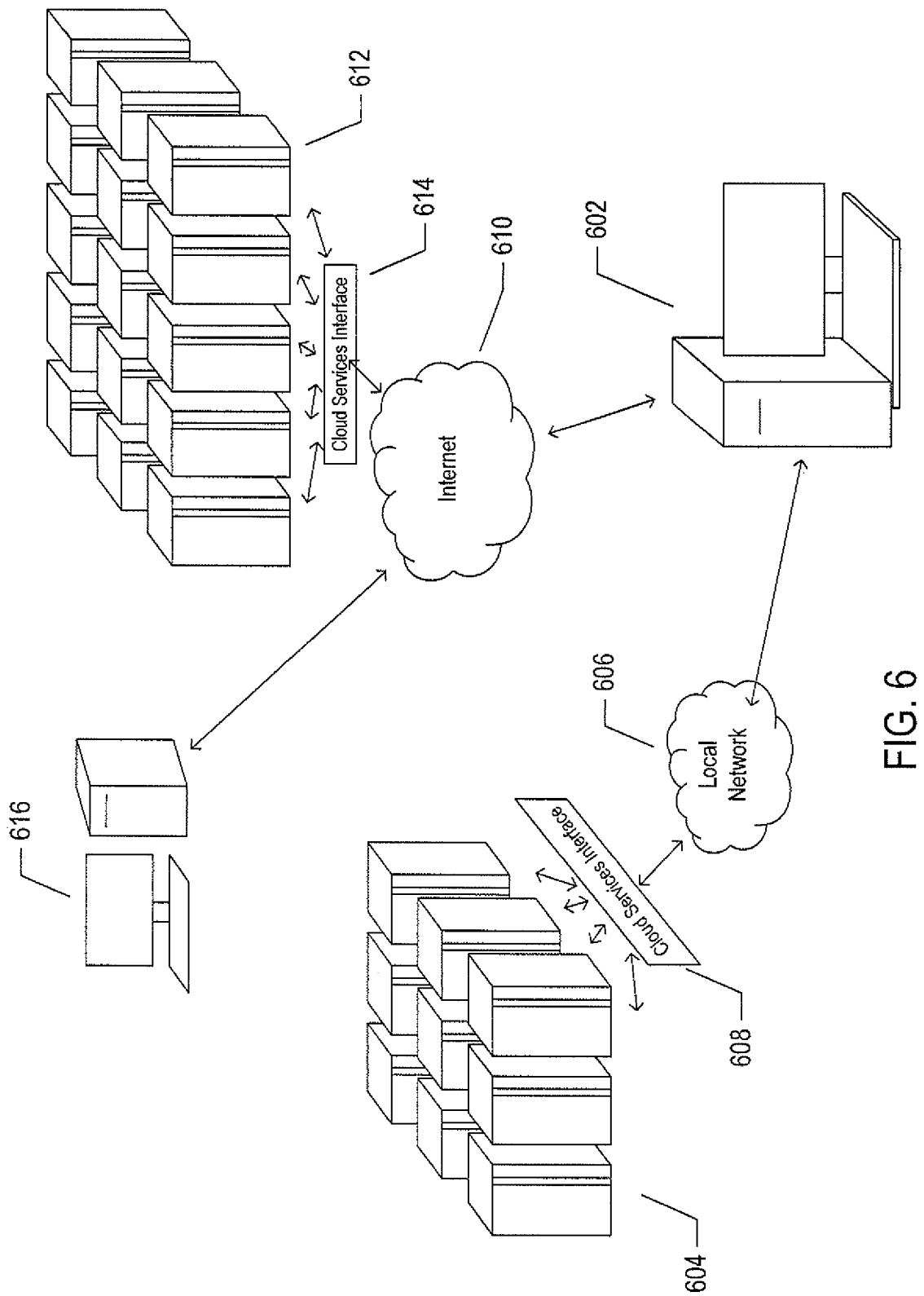
FIG. 6 illustrates cloud computing.

FIG. 6 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 6, a system administrator for an organization, using a PC 602, accesses the organization's private cloud 604 through a local network 606 and private-cloud interface 608 and also accesses, through the Internet 610, a public cloud 612 through a public-cloud services interface 614. The administrator can, in either the case of the private cloud 604 or public cloud 612, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 616.

Figure 7:
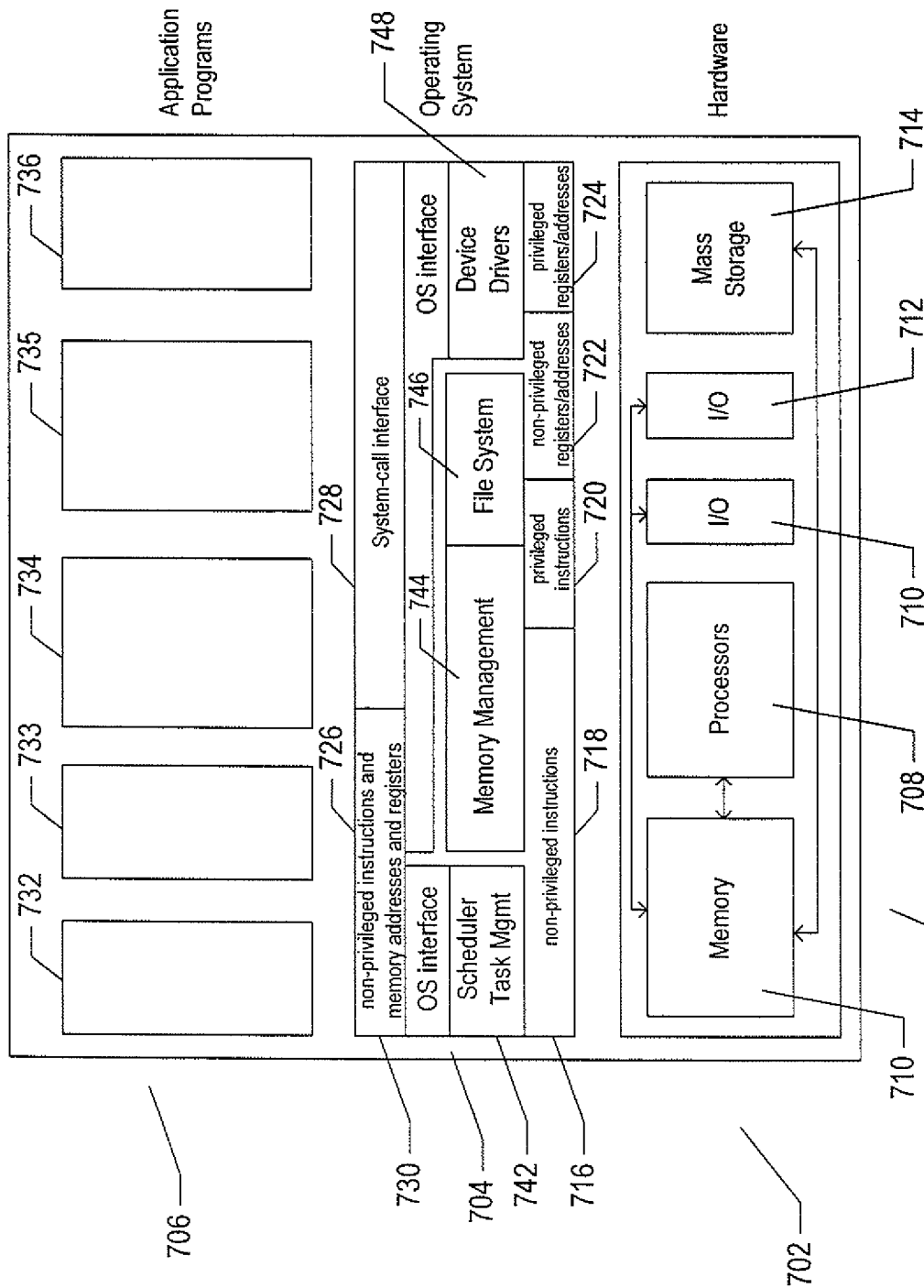
FIG. 7 illustrates generalized hardware and software components of a general-purpose computer system, such as a general-purpose computer system having an architecture similar to that shown in FIG. 1.

FIG. 7 illustrates generalized hardware and software components of a general-purpose computer system, such as a general-purpose computer system having an architecture similar to that shown in FIG. 4. The computer system 700 is often considered to include three fundamental layers: (1) a hardware layer or level 702; (2) an operating-system layer or level 704; and (3) an application-program layer or level 706. The hardware layer 702 includes one or more processors 708, system memory 710, various input-output ("I/O") devices 710 and 712, and mass-storage devices 714. Of course, the hardware level also includes many other components, including power supplies, internal communications links and busses, specialized integrated circuits, many different types of processor-controlled or microprocessor-controlled peripheral devices and controllers, and many other components. The operating system 704 interfaces to the hardware level 702 through a low-level operating system and hardware interface 716 generally comprising a set of non-privileged computer instructions 718, a set of privileged computer instructions 720, a set of non-privileged registers and memory addresses 722, and a set of privileged registers and memory addresses 724. In general, the operating system exposes non-privileged instructions, non-privileged registers, and non-privileged memory addresses 726 and a system-call interface 728 as an operating-system interface 730 to application programs 732-736 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 742, memory management 744, a file system 746, device drivers 748, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 746 facilitates abstraction of mass-storage-device and memory resources as a high-level, easy-to-access, file-system interface.

In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 8A:
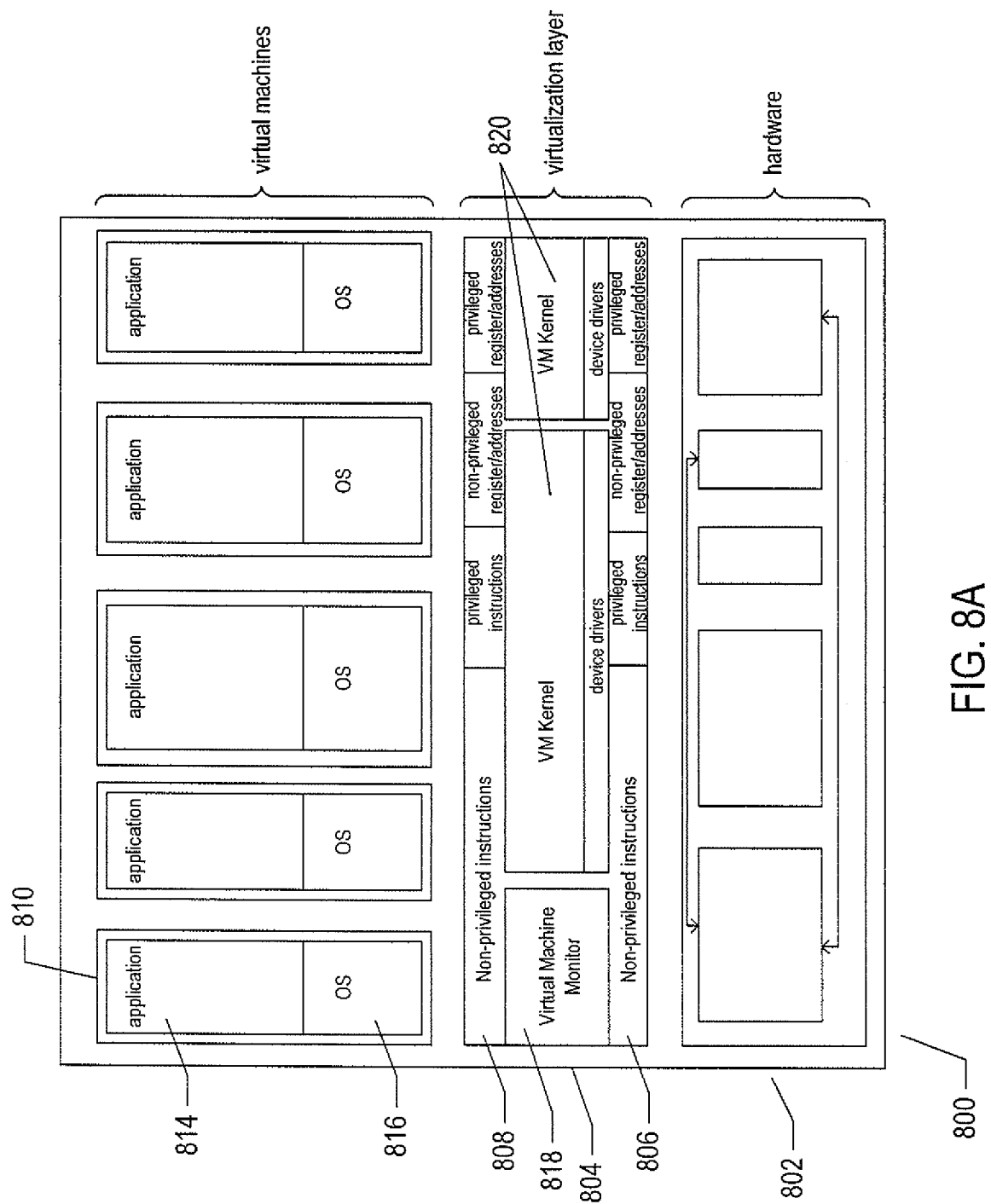
FIGS. 8A-D illustrate several types of virtual machine and virtual-machine execution environments.
Figure 8B:
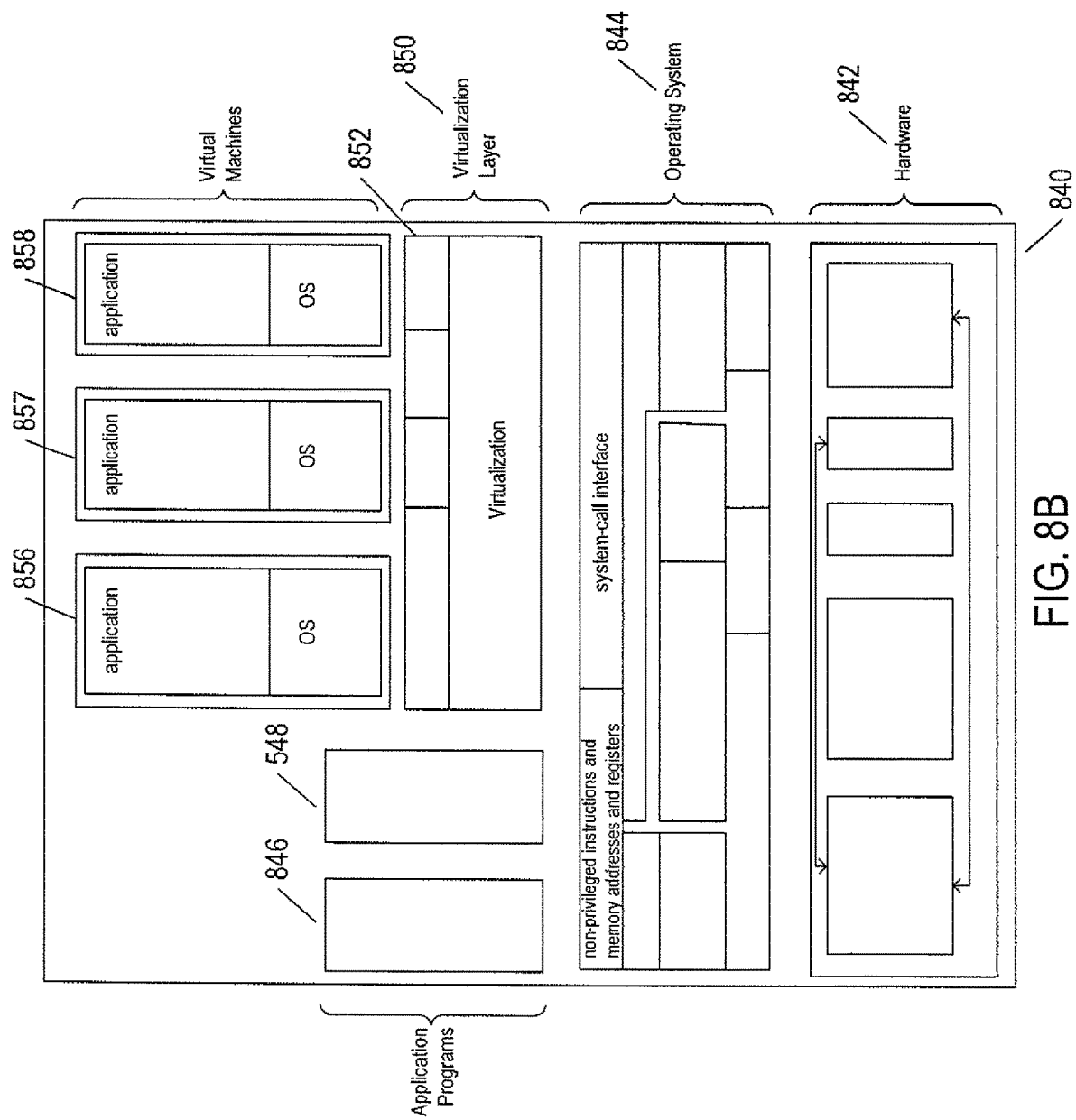

For these reasons, a higher level of abstraction, referred to as the "virtual machine," has been developed and evolved to further abstract computer hardware in order to address many difficulties and challenges associated with traditional computing systems, including the compatibility issues discussed above. FIGS. 8A-B illustrate two types of virtual machine and virtual-machine execution environments. FIGS. 8A-B use the same illustration conventions as used in FIG. 7. FIG. 8A shows a first type of virtualization. The computer system 800 in FIG. 8A includes the same hardware layer 802 as the hardware layer 702 shown in FIG. 7. However, rather than providing an operating system layer directly above the hardware layer, as in FIG. 7, the virtualized computing environment illustrated in FIG. 8A features a virtualization layer 804 that interfaces through a virtualization-layer/hardware-layer interface 806, equivalent to interface 716 in FIG. 7, to the hardware. The virtualization layer provides a hardware-like interface 808 to a number of virtual machines, such as virtual machine 810, executing above the virtualization layer in a virtual-machine layer 812. Each virtual machine includes one or more application programs or other higher-level computational entities packaged together with an operating system, referred to as a "guest operating system," such as application 814 and guest operating system 816 packaged together within virtual machine 810. Each virtual machine is thus equivalent to the operating-system layer 704 and application-program layer 706 in the general-purpose computer system shown in FIG. 7. Each guest operating system within a virtual machine interfaces to the virtualization-layer interface 808 rather than to the actual hardware interface 806. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 808 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 818 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 808, the accesses result in execution of virtualization-layer code to simulate or emulate the privileged resources. The virtualization layer additionally includes a kernel module 820 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 8B illustrates a second type of virtualization. In FIG. 8B, the computer system 840 includes the same hardware layer 842 and software layer 844 as the hardware layer 702 shown in FIG. 7. Several application programs 846 and 848 are shown running in the execution environment provided by the operating system. In addition, a virtualization layer 850 is also provided, in computer 840, but, unlike the virtualization layer 804 discussed with reference to FIG. 8A, virtualization layer 850 is layered above the operating system 844, referred to as the "host OS," and uses the operating system interface to access operating-system-provided functionality as well as the hardware. The virtualization layer 850 comprises primarily a VMM and a hardware-like interface 852, similar to hardware-like interface 808 in FIG. 8A. The virtualization-layer/hardware-layer interface 852, similar to interface 716 in FIG. 7, provides an execution environment for a number of virtual machines 856-858, each including one or more application programs or other higher-level computational entities packaged together with a guest operating system.

In FIGS. 8A-B, the layers are somewhat simplified for clarity of illustration. For example, portions of the virtualization layer 850 may reside within the host-operating-system kernel, such as a specialized driver incorporated into the host operating system to facilitate hardware access by the virtualization layer.

Figure 8C:
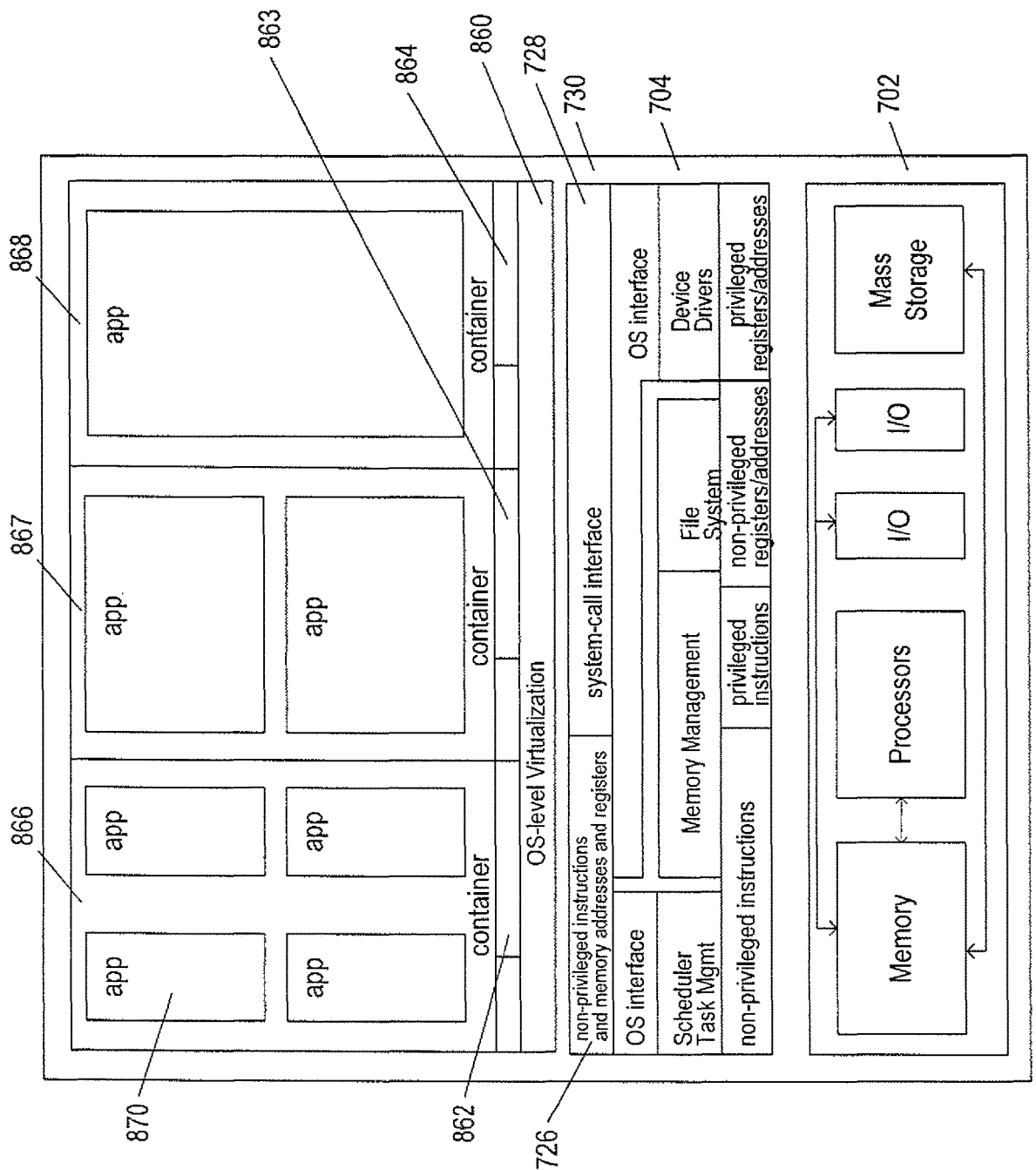

While the traditional virtual-machine-based virtualization layers, described with reference to FIGS. 8A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 8C illustrates the OSL-virtualization approach. In FIG. 8C, as in previously discussed FIG. 7, an operating system 704 runs above the hardware 702 of a host computer. The operating system provides an interface for higher-level computational entities, the interface including a system-call interface 728 and exposure to the non-privileged instructions and memory addresses and registers 726 of the hardware layer 702. However, unlike in FIG. 8A, rather than applications running directly above the operating system, OSL virtualization involves an OS-level virtualization layer 860 that provides an operating-system interface 862-864 to each of one or more containers 866-868. The containers, in turn, provide an execution environment for one or more applications, such as application 870 running within the execution environment provided by container 866. The container can be thought of as a partition of the resources generally available to higher-level computational entities through the operating system interface 730. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 8D:
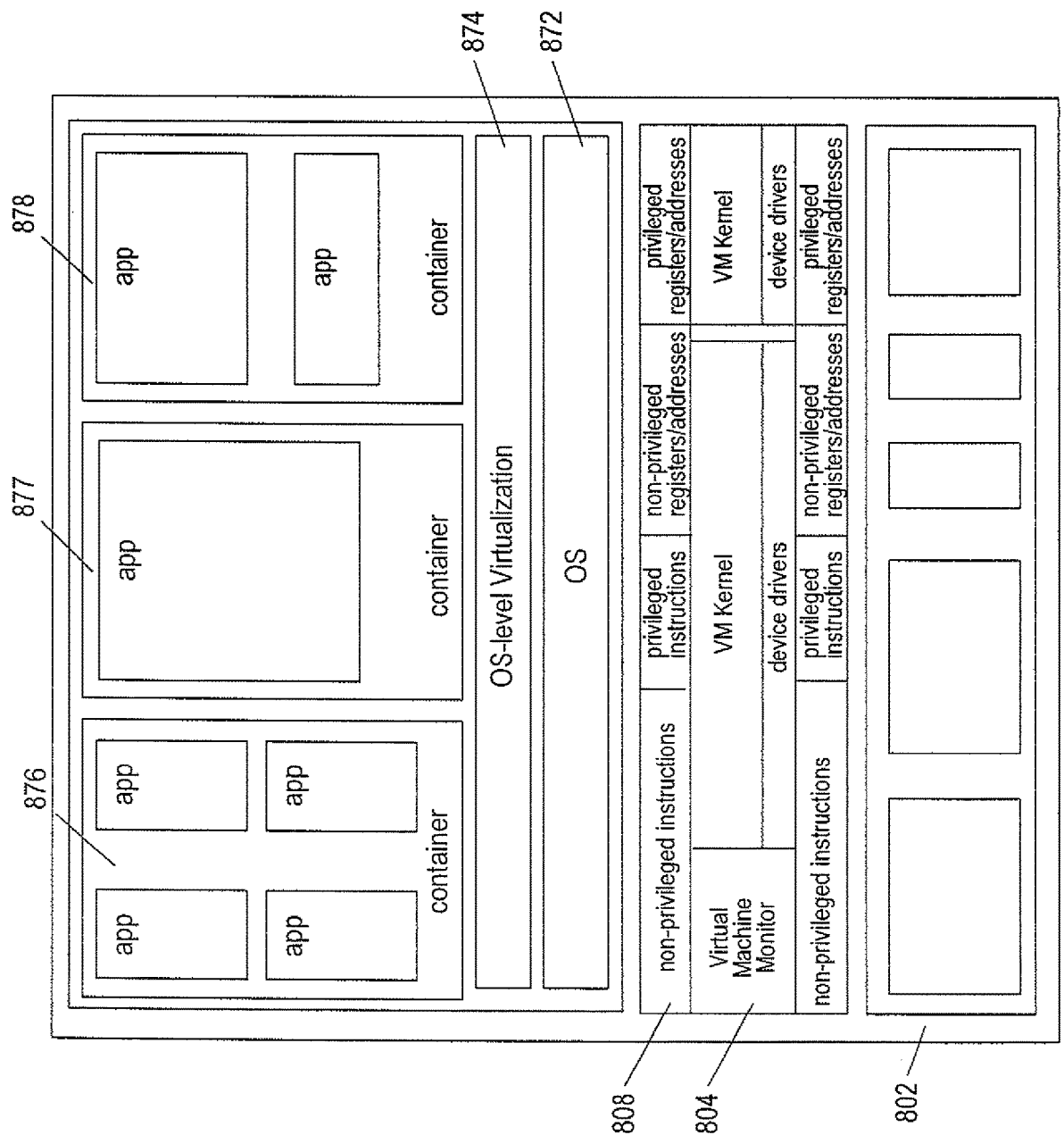

FIG. 8D illustrates an approach to combining the power and flexibility of traditional virtualization with the advantages of OSL virtualization. FIG. 8D shows a host computer similar to that shown in FIG. 8A, discussed above. The host computer includes a hardware layer 802 and a virtualization layer 804 that provides a simulated hardware interface 808 to an operating system 872. Unlike in FIG. 8A, the operating system interfaces to an OSL-virtualization layer 874 that provides container execution environments 876-878 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 874. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 8D, provides much of the advantages of both a traditional virtualization layer and the advantages of OSL virtualization. Note that, although only a single guest operating system and OSL virtualization layer as shown in FIG. 8D, a single virtualized host system can run multiple different guest operating systems within multiple virtual machines, each of which supports one or more containers.

In FIGS. 8A-D, the layers are somewhat simplified for clarity of illustration. For example, portions of the virtualization layer 850 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 9:
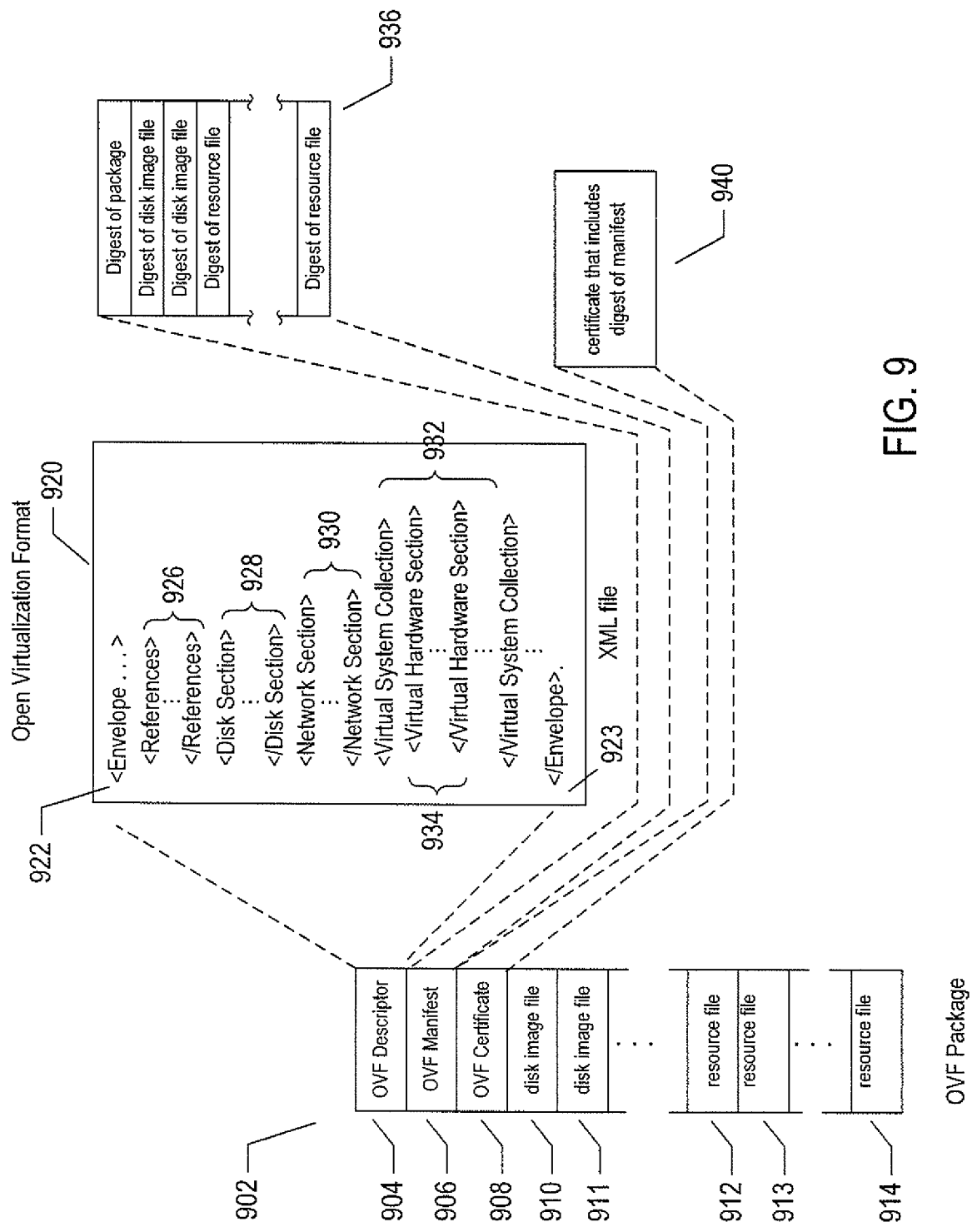
FIG. 9 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 9 illustrates an OVF package. An OVF package 902 includes an OVF descriptor 904, an OVF manifest 906, an OVF certificate 908, one or more disk-image files 910-911, and one or more resource files 912-914. The OVF package can be encoded and stored as a single file or as a set of files. The OVF descriptor 904 is an XML document 920 that includes a hierarchical set of elements, each demarcated by a beginning tag and an ending tag. The outermost, or highest-level, element is the envelope element, demarcated by tags 922 and 923. The next-level element includes a reference element 926 that includes references to all files that are part of the OVF package, a disk section 928 that contains meta information about the virtual disks included in the OVF package, a networks section 930 that includes meta information about the logical networks included in the OVF package, and a collection of virtual-machine configurations 932 which further includes hardware descriptions of each virtual machine 934. There are many additional hierarchical levels and elements within a typical OVF descriptor. The OVF descriptor is thus a self-describing XML file that describes the contents of an OVF package. The OVF manifest 906 is a list of cryptographic-hash-function-generated digests 936 of the entire OVF package and of the various components of the OVF package. The OVF certificate 908 is an authentication certificate 940 that includes a digest of the manifest and that is cryptographically signed. Disk image files, such as disk image file 910, are digital encodings of the contents of virtual disks and resource files 912 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 10:
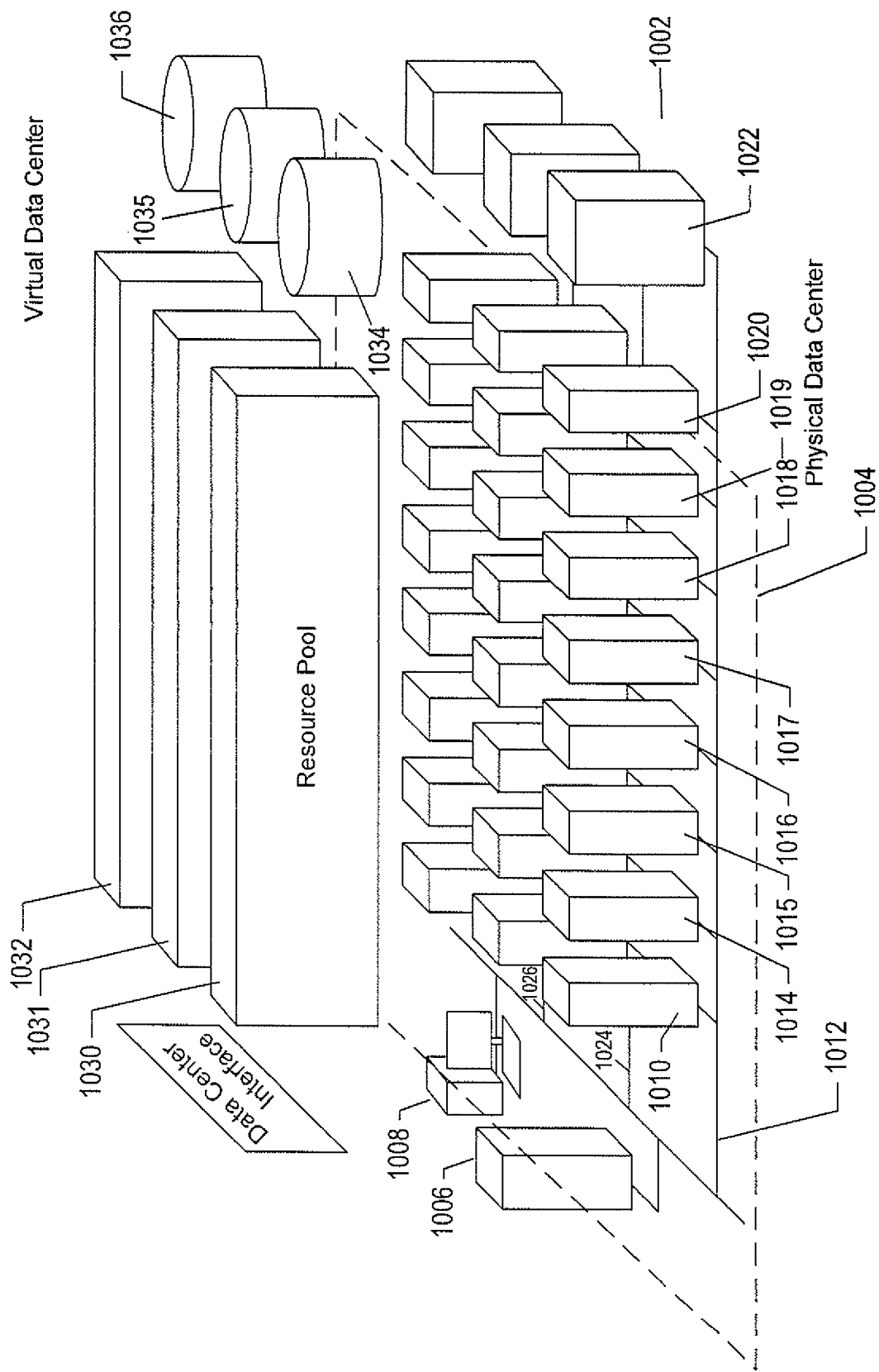
FIG. 10 illustrates virtual data centers provided as an abstraction of underlying physical-data-center hardware components.

FIG. 10 illustrates virtual data centers provided as an abstraction of underlying physical-data-center hardware components. In FIG. 10, a physical data center 1002 is shown below a virtual-interface plane 1004. The physical data center consists of a virtual-infrastructure management server ("VI-management-server") 1006 and any of various different computers, such as PCs 1008, on which a virtual-data-center management interface may be displayed to system administrators and other users. The physical data center additionally includes generally large numbers of server computers, such as server computer 1010, that are coupled together by local area networks, such as local area network 1012 that directly interconnects server computer 1010 and 1014-1020 and a mass-storage array 1022. The physical data center shown in FIG. 10 includes three local area networks 1012, 1024, and 1026 that each directly interconnects a bank of eight servers and a mass-storage array. The individual server computers, such as server computer 1010, each includes a virtualization layer and runs multiple virtual machines. Different physical data centers may include many different types of computers, networks, data-storage systems and devices connected according to many different types of connection topologies. The virtual-data-center abstraction layer 1004, a logical abstraction layer shown by a plane in FIG. 10, abstracts the physical data center to a virtual data center comprising one or more resource pools, such as resource pools 1030-1032, one or more virtual data stores, such as virtual data stores 1034-1036, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 11:
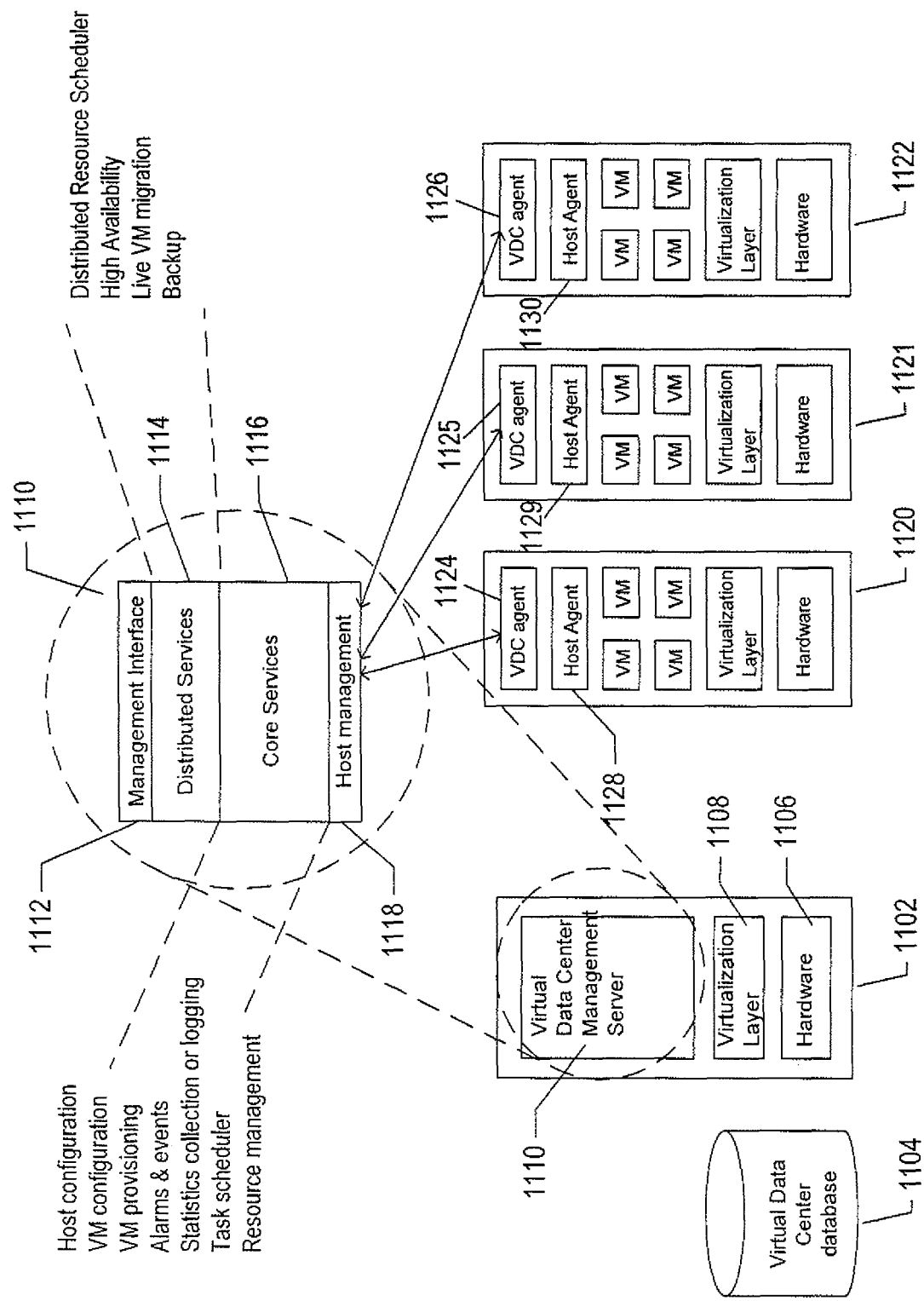
FIG. 11 illustrates virtual-machine components of a VI-management-server and physical servers of a physical data center above which a virtual-data-center interface is provided by the VI-management-server.

FIG. 11 illustrates virtual-machine components of a VI-management-server and physical servers of a physical data center above which a virtual-data-center interface is provided by the VI-management-server. The VI-management-server 1102 and a virtual-data-center database 1104 comprise the physical components of the management component of the virtual data center. The VI-management-server 1102 includes a hardware layer 1106 and virtualization layer 1108, and runs a virtual-data-center management-server virtual machine 1110 above the virtualization layer. Although shown as a single server in FIG. 11, the VI-management-server ("VI management server") may include two or more physical server computers that support multiple VI-management-server virtual appliances. The virtual machine 1110 includes a management-interface component 1112, distributed services 1114, core services 1116, and a host-management interface 1118. The management interface is accessed from any of various computers, such as the PC 1008 shown in FIG. 10. The management interface allows the virtual-data-center administrator to configure a virtual data center, provision virtual machines, collect statistics and view log files for the virtual data center, and to carry out other, similar management tasks. The host-management interface 1118 interfaces to virtual-data-center agents 1124, 1125, and 1126 that execute as virtual machines within each of the physical servers of the physical data center that is abstracted to a virtual data center by the VI management server.

The distributed services 1114 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 1120-1122 also includes a host-agent virtual machine 1128-1130 through which the virtualization layer can be accessed via a virtual-infrastructure application programming interface ("API"). This interface allows a remote administrator or user to manage an individual server through the infrastructure API. The virtual-data-center agents 1124-1126 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 12:
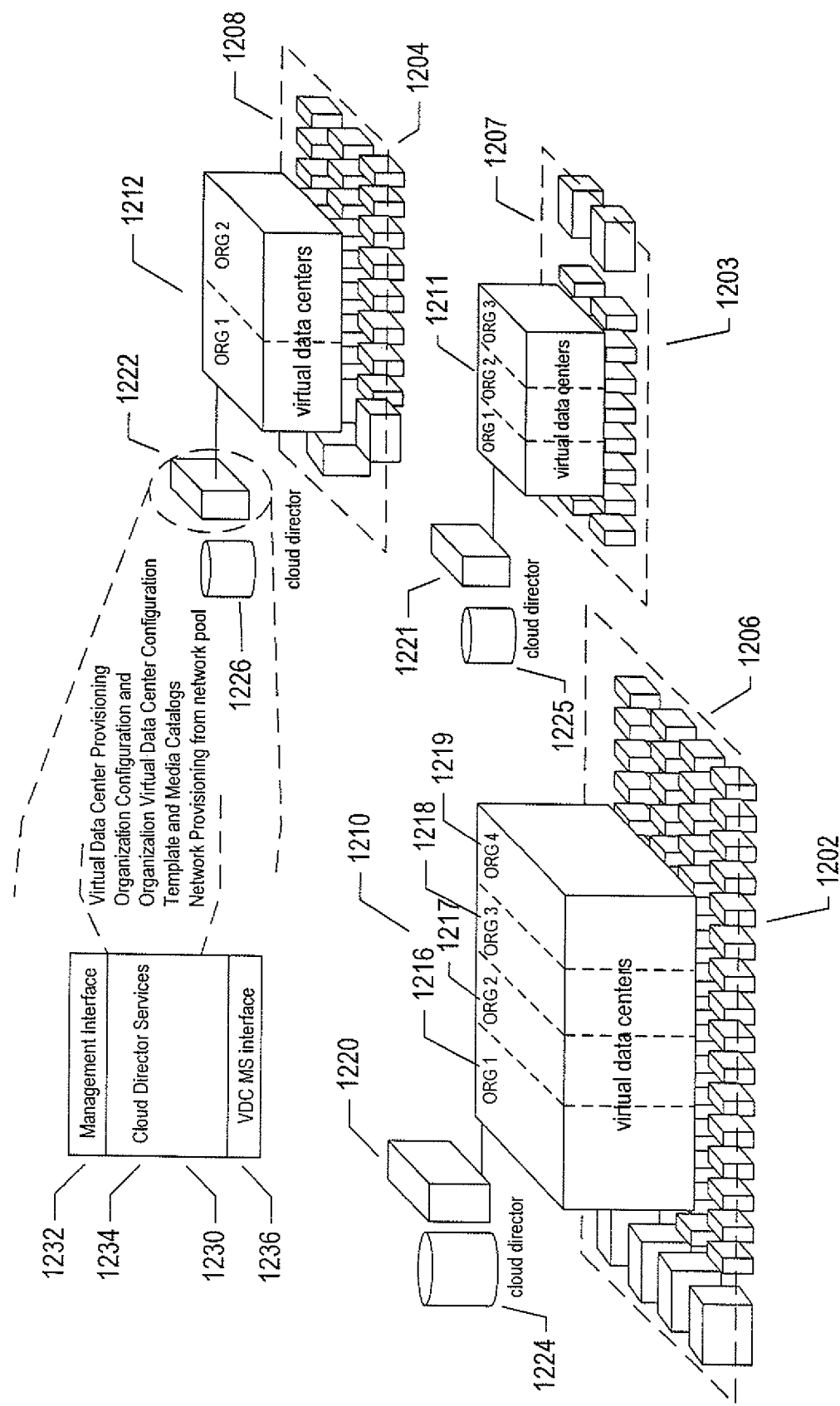
FIG. 12 illustrates a cloud-director level of abstraction.

FIG. 12 illustrates a cloud-director level of abstraction. In FIG. 12, three different physical data centers 1202-1204 are shown below planes representing the cloud-director layer of abstraction 1206-1208. Above the planes representing the cloud-director level of abstraction, multi-tenant virtual data centers 1210-1212 are shown. The resources of these multi-tenant virtual data centers are securely partitioned in order to provide secure virtual data centers to multiple tenants, or cloud-services-accessing organizations. For example, a cloud-services-provider virtual data center 1210 is partitioned into four different tenant-associated virtual-data centers within a multi-tenant virtual data center for four different tenants 1216-1219. Each multi-tenant virtual data center is managed by a cloud director comprising one or more cloud-director servers 1220-1222 and associated cloud-director databases 1224-1226. Each cloud-director server or servers runs a cloud-director virtual appliance 1230 that includes a cloud-director management interface 1232, a set of cloud-director services 1234, and a virtual-data-center management-server interface 1236. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 10 and 12, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 13:
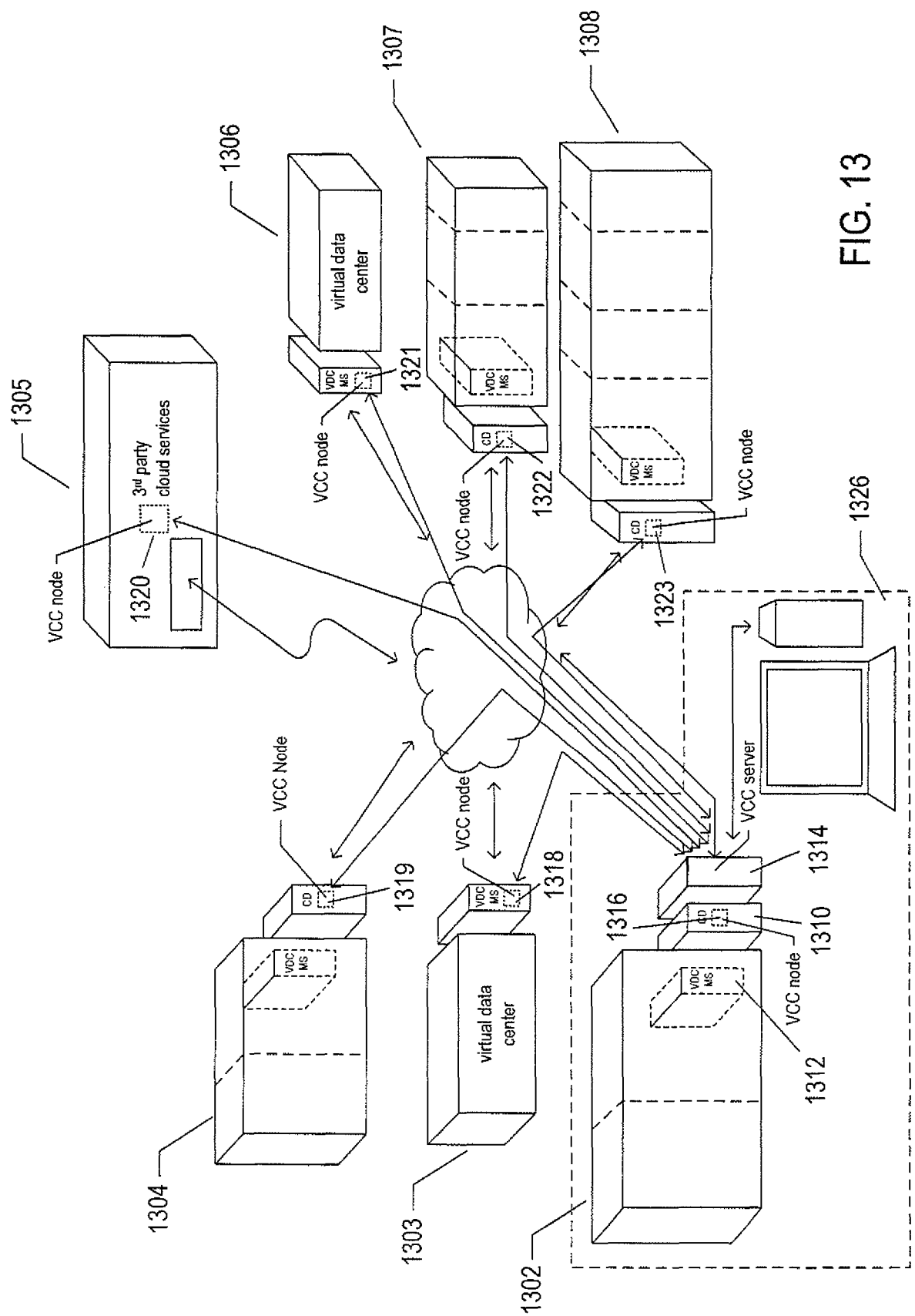
FIG. 13 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 13 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 13, seven different cloud-computing facilities are illustrated 1302-1308. Cloud-computing facility 1302 is a private multi-tenant cloud with a cloud director 1310 that interfaces to a VI management server 1312 to provide a multi-tenant private cloud comprising multiple tenant-associated virtual data centers. The remaining cloud-computing facilities 1303-1308 may be either public or private cloud-computing facilities and may be single-tenant virtual data centers, such as virtual data centers 1303 and 1306, multi-tenant virtual data centers, such as multi-tenant virtual data centers 1304 and 1307-1308, or any of various different kinds of third-party cloud-services facilities, such as third-party cloud-services facility 1305. An additional component, the VCC server 1314, acting as a controller is included in the private cloud-computing facility 1302 and interfaces to a VCC node 1316 that runs as a virtual appliance within the cloud director 1310. A VCC server may also run as a virtual appliance within a VI management server that manages a single-tenant private cloud. The VCC server 1314 additionally interfaces, through the Internet, to VCC node virtual appliances executing within remote VI management servers, remote cloud directors, or within the third-party cloud services 1318-1323. The VCC server provides a VCC server interface that can be displayed on a local or remote terminal, PC, or other computer system 1326 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Distributed-Search Engine

The current document is directed to a distributed resource-exchange system that employs a distributed-search subsystem to identify potential resource exchanges and select, from the identified potential resource exchanges, resource exchanges that best meet specified requirements and constraints. The distributed-search subsystem provides an auction-based method for matching of resource providers to resource users within a very large, distributed aggregation of virtual and physical data centers owned and managed by a large number of different organization. The distributed-search subsystem, however, is a general searching subsystem that can be used for many additional distributed-search operations.

Distributed searches are initiated by distributed-search participants, which may be any type of processor-controlled device that supports access to a distributed-search application programming interface ("API") or graphical user interface ("UI"). In a described implementation, the distributed-search subsystem comprises one or more local instances and one or more distributed-search engines. In the described implementation, local instances execute as web-application plug-ins within one or more virtual machines of a management subsystem. However, many alternative implementations are possible, including standalone applications and even hardware appliances. The local instances support the distributed-search API and/or UI, store local-instance data to support the distributed-search API and/or UI, and exchange request messages and response messages with the one or more distributed-search engines to initiate distributed searches, add attributes to a set of centrally stored attributes, and manage operation of the distributed-search subsystem. The one or more distributed-search engines communicate with local instances, centrally store various types of distributed-search-subsystem data, and carry out distributed searches on behalf of requesting local instances, maintaining an active search context for each search.

Entities for which searches are carried out can be of many different types, from information and data to hardware components and subsystems, automated services, products, remote computer systems connected to the distributed computer system, human users of those systems, and various types of computers, information, devices, and information accessible to the remote computer systems. The entities are characterized by attribute/value pairs. For example, a computational resource might be characterized by the attribute/value pairs: memory/2 GB; processor_bandwidth/1.2 GHz; network_bandwidth/100 MB\31 sec. Search results may include the values for one or more attributes as well as identifying information for providers, network addresses, and additional information.

Searches are parameterized by attribute/value pairs. These parameters may specify a scope for the search, minimum requirements for successful responses, search termination conditions, and many other operational parameters that allow searches to accurately tailored to user and participant needs. Participants may also be characterized by attribute/value pairs. For example, participants may be characterized by ratings that reflect past performance in supplying requested products and services.

Figure 14A:
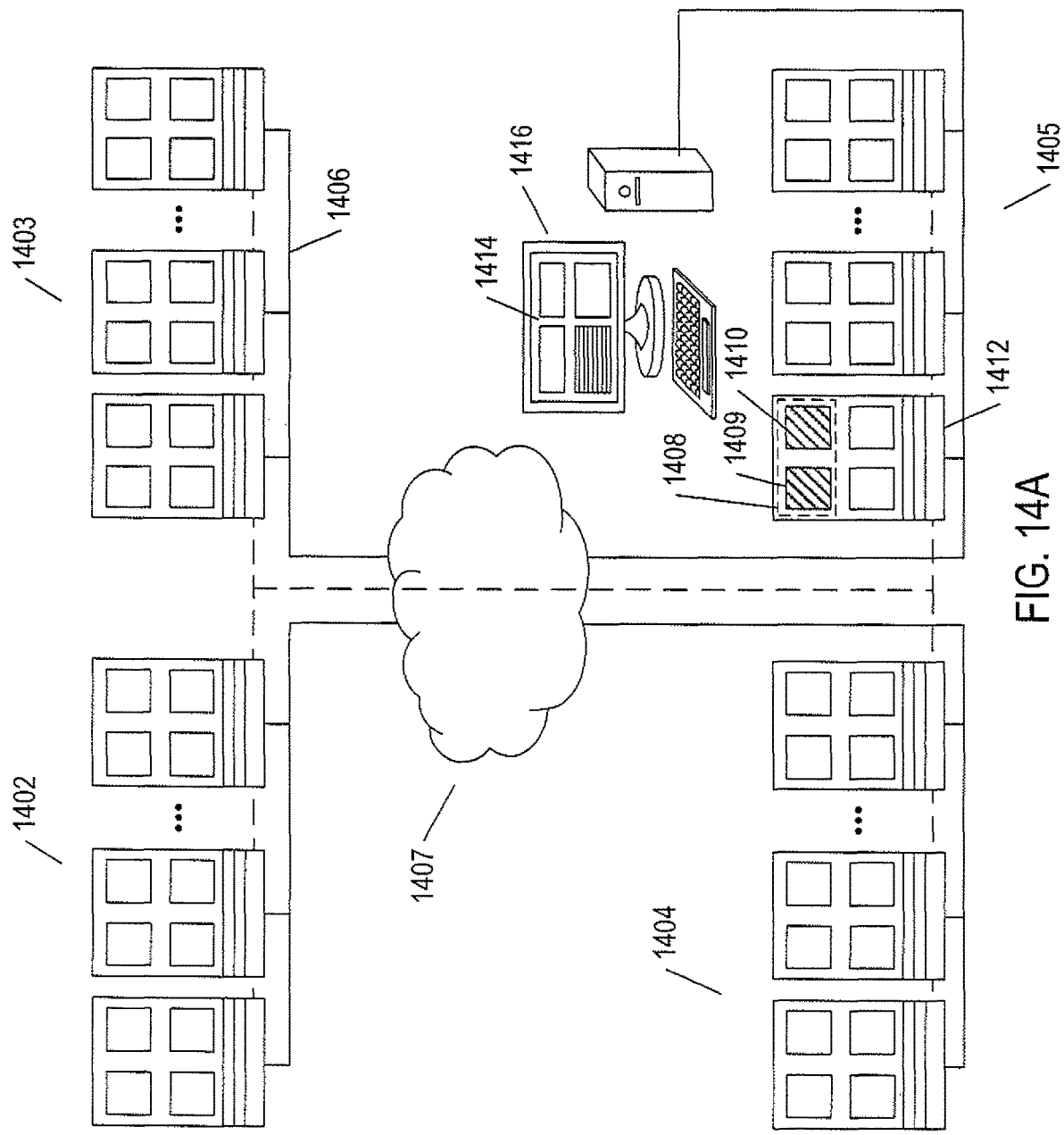
FIGS. 14A-C illustrate components and general operation of the distributed-search methods and subsystems.
Figure 14B:
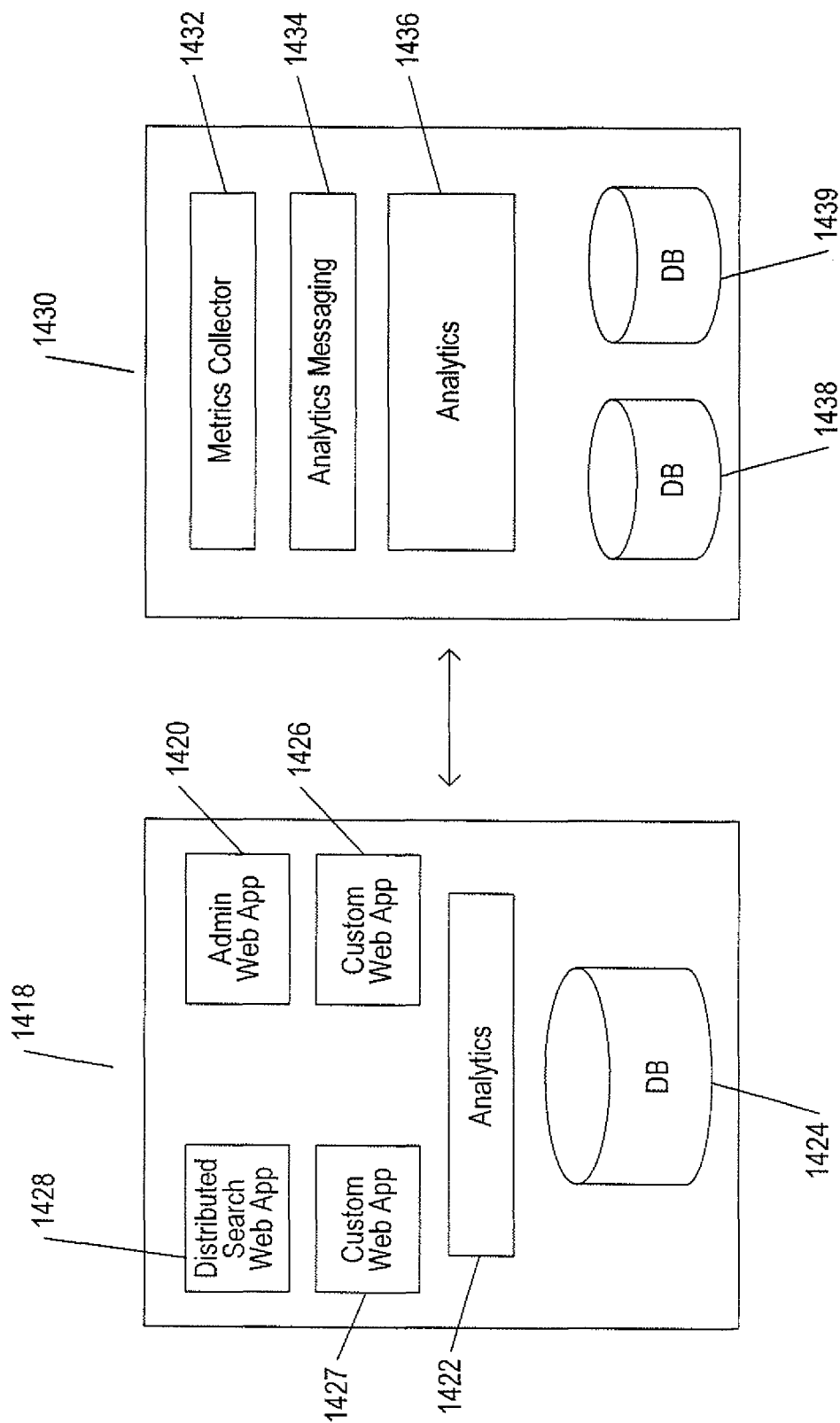
Figure 14C:
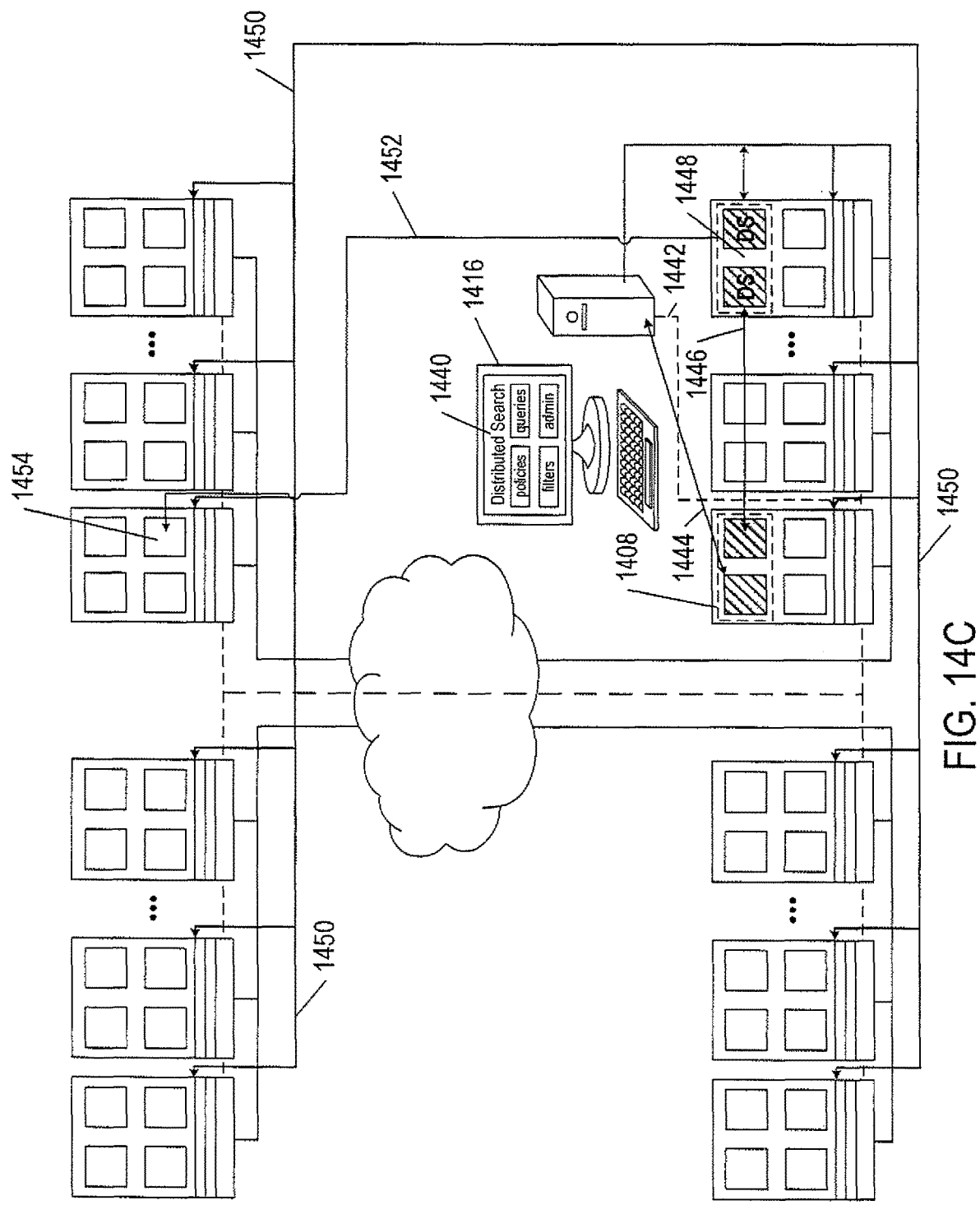

FIGS. 14A-C illustrate components and general operation of the distributed-search methods and subsystems. FIG. 14A uses illustration conventions, which are next described, that are subsequently used in FIG. 14C. A large distributed computer system is represented, in FIGS. 14A and 14C, by four sets 1402-1405 of computers, each set representing a virtualized-server cluster, virtual data center, or group of virtual data centers. In large distributed computer systems, there may be tens, hundreds, or more server clusters and virtual data centers linked together by many layers of internal and external communications systems. In FIGS. 14A and 11C, local internal communications are represented by interconnecting lines or channels, such as local network 1406 within server cluster or virtual data center 1403, and one or more wide-area networks or other external communications systems are represented by cloud 1407. The distributed-computer-system representation used in FIGS. 14A-C is abstracted to provide for concise and simple illustration of the currently disclosed distributed-search methods and subsystems.

In the example distributed computer system shown in FIGS. 14A and 14C, a management subsystem is implemented as a multi-tiered application 1408 including two or more virtual machines 1409-1410 within a management server 1412 of a server cluster or virtual data center 1405. The management subsystem displays a management user interface 1414 on one or more management consoles 1416 used by system managers or administrators to manage operation of a server cluster or virtual data center. Each server cluster or virtual data center, such as server clusters or virtual data centers 1402-1404, may also include a management subsystem, such as the management subsystem 1408-1410 within server cluster or virtual data center 1405. In certain implementations, a management subsystem may span two or more server clusters or virtual data centers.

The management subsystem provides a comprehensive server cluster or virtual data center management interface to system administrators. Through the management user interface, system administrators specify operational parameters that control facilities that store, manage, and deploy multi-tiered application and VM templates, facilities that provide for high-availability virtual-machine execution, tools for migrating executing VMs among servers and execution environments, VM replication, and data backup and recovery services.

FIG. 14B illustrates one implementation of a high-level architecture of the management subsystem 1408-1410 discussed above with reference to FIG. 14A. In the management subsystem, a first virtual machine 1418 is responsible for providing the management user interface via an administrator web application 1420, as well as compiling and processing certain types of analytical data 1422 that are stored in a local database 1424. In addition, the first virtual machine runs numerous custom web applications 1426-1427 that provide additional functionalities accessible through the management user interface. The first virtual machine also provides an execution environment for a distributed-search web application 1428 that represents a local instance of the distributed-search subsystem within a server cluster, virtual data center, or some other set of computational resources within the distributed computer system. A second virtual machine 1430 is primarily concerned with collecting metrics 1432 from various types of components, subcomponents, servers, network-storage appliances, and other components of the distributed computing system via analytics messaging 1434 and then analyzing the collected metrics 1436 to provide continuous representations of the status and state of the distributed computer system, to automatically identify various types of events and problems that are addressed automatically, semi-automatically, or manually by system administrators, and to provide additional types of monitoring and analysis, the results of which are stored in several local databases 1438-1439.

As shown in FIG. 14C, the local instance of the distributed-search subsystem (1428 in FIG. 14B) is invoked, in one implementation, through the management user interface to provide a distributed-search user interface 1440 to a system administrator or, in other cases, to provide a distributed-search application programming interface ("API") to various automated management and computational-resource-distribution subsystems within the distributed computer system. Communication between the management subsystem 1408 and the system console 1416 is provided, in one implementation, over a secure virtual management network within the distributed computer system, represented in FIGS. 14A and 14C by dashed lines, such as dashed line 1442. The distributed-search user interface 1440 provides facilities for the creation and storage of search policies, filters, and search queries, further discussed below. The distributed-search user interface also provides various types of administration operations and functionalities. A user launches searches through the distributed-search user interface and automated subsystems launches searches through a distributed-search API, both provided by a local instance of the distributed-search subsystem. A search initiated by specifying filters, policies, and search-result evaluation criteria previously created and stored through the distributed-search user interface or distributed-search API.

A search is initiated by the transmission of a search-initiation request, from the distributed-search user interface or through a remote call to the distributed-search API 1444, to a local instance of the distributed-search subsystem within the management subsystem 1408. The local instance of the distributed-search subsystem then prepares a search-request message that is transmitted 1446 to a distributed-search engine 1448, in one implementation implemented as a multi-tiered application containing one or more distributed-search-engine virtual machines that runs within a server or other computer system within the distributed computer system. The distributed-search engine transmits dynamic-attribute-value requests to each of a set of target participants within the distributed computing system, as represented by arrows emanating from the distributed-search engine 1448 and directed to each of a particular component or layer within the computer systems of the distributed computer system. The transmission may occur over a period of time in which batches of dynamic-attribute-value requests are transmitted at intervals, to avoid overloading communications subsystems. The set of target participants is obtained by using filters included within the search request to evaluate centrally stored static attribute values for entities within the distributed computer system, as discussed, in detail, below. Initial filtering avoids transmission of messages to entities incapable of satisfying search-request criteria. Note that the target participants may be any type or class of distributed-computing-system component or subsystem that can support execution of functionality that receives dynamic-attribute-value-request messages from a distributed-search engine. In certain cases, the target participants are components of management subsystems, such as local instances of the distributed-search subsystem (1428 in FIG. 14B). However, target participants may also be virtualization layers, operating systems, virtual machines, applications, or even various types of hardware components that are implemented to include an ability to receive attribute-value-request messages and respond to the received messages. Finally, the distributed-search engine 1448 receives responses from the target participants within the distributed computer system and continuously evaluates the responses to maintain a small set of best responses. In many cases, there may be significant periods of time between reception of a dynamic-attribute-value request by a target participant and sending of a response by the target participant. When termination criteria for the search are satisfied, and the search is therefore terminated, the set of best responses to the transmitted dynamic-attribute-value-request messages are first verified, by a message exchange with each target participant that furnished the response message, and are then transmitted 1452 from the distributed-search engine to one or more search-result recipients 1454 specified in the initial search request. A search-result recipient may be the local instance of the distributed-search subsystem that initiated the distributed search, but may alternatively be any other component or entity or set of components or entities of the distributed computer system that supports reception of a distributed search-results message.

Figure 15A:
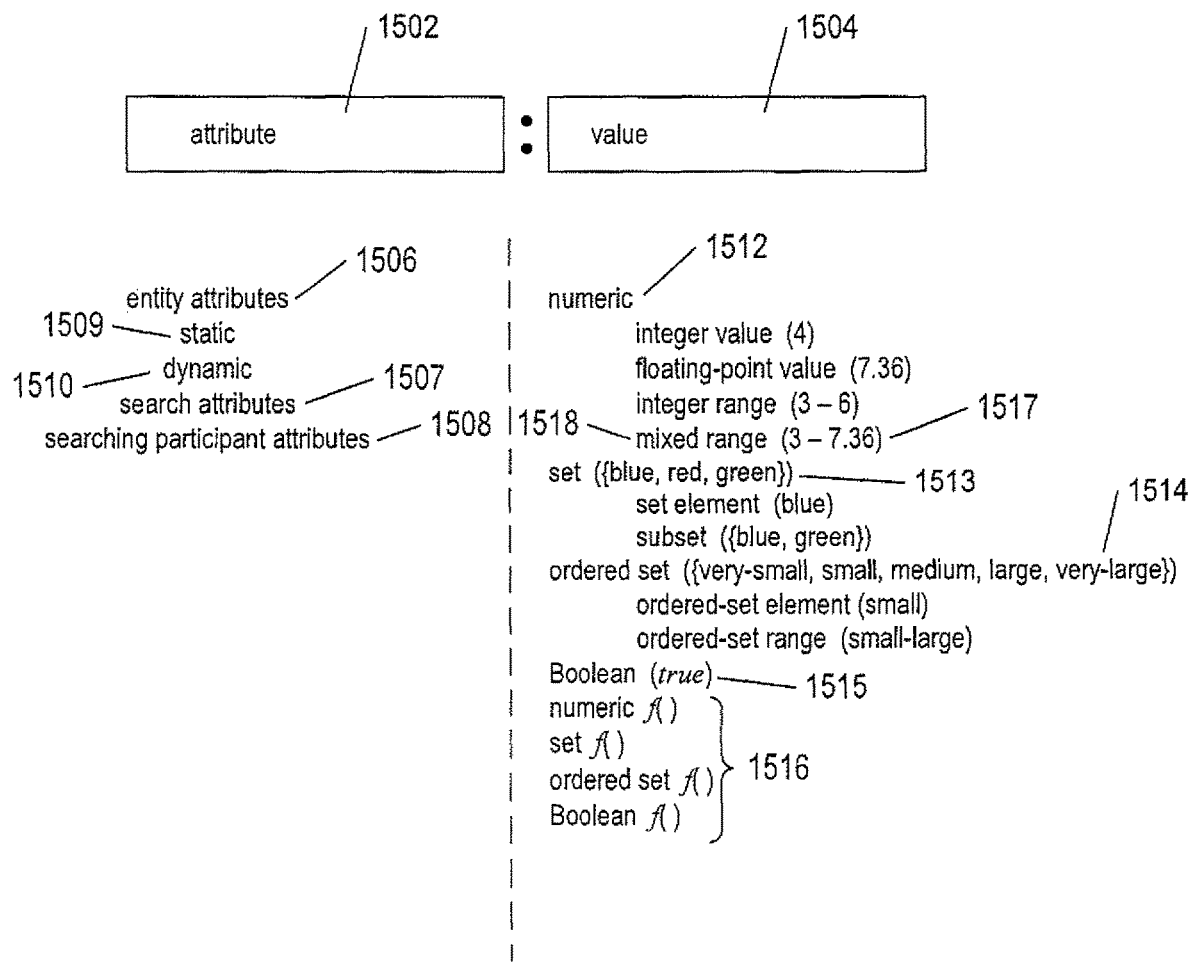
Figure 15B:
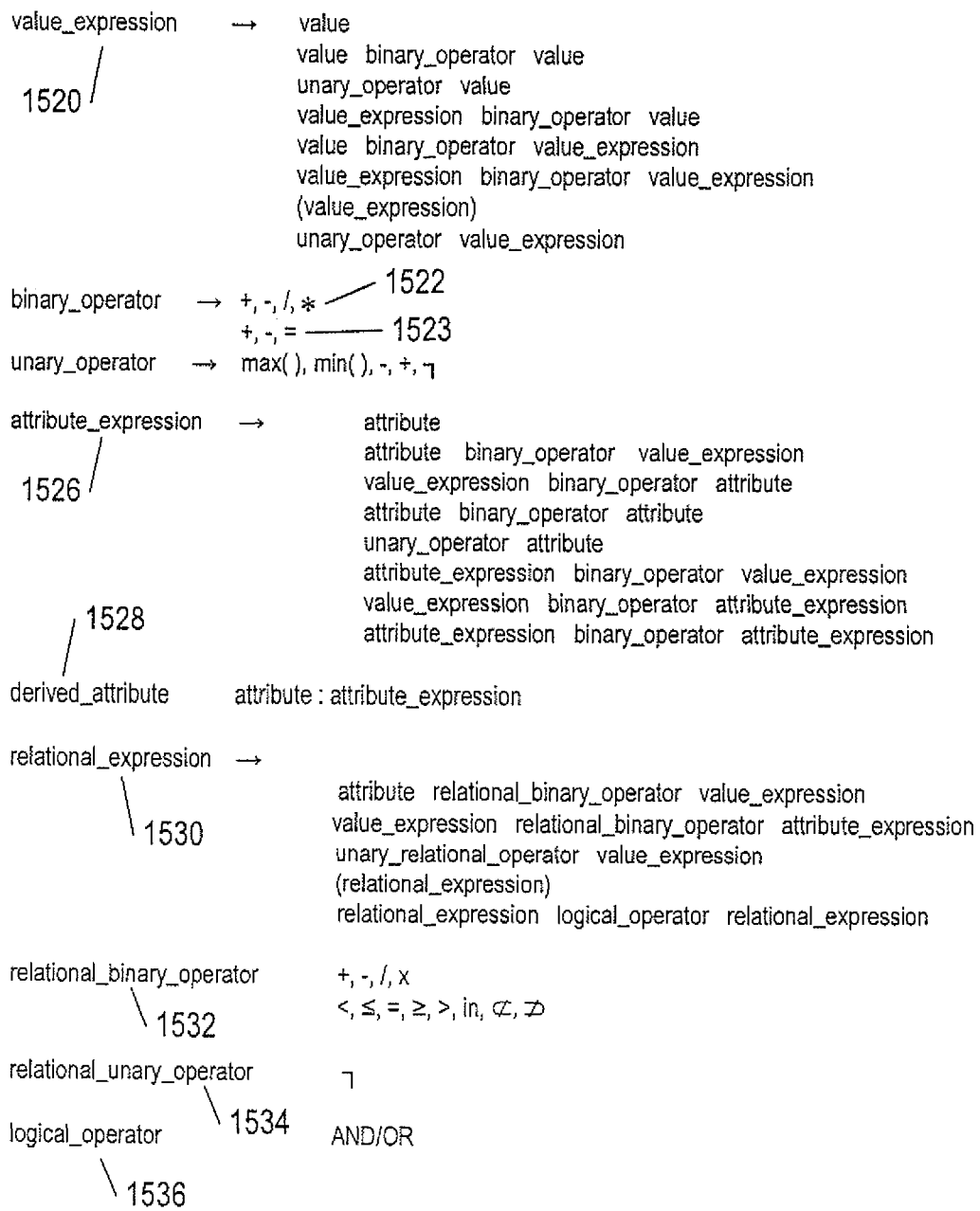

FIGS. 15A-C illustrate certain of the information and data entities used within the currently disclosed distributed-search methods and subsystems. The distributed search is used to identify entities managed by, contained within, or accessible to distributed-search participants. These entities are characterized by attribute/value pairs. An entity may be a participant, a service, information, distributed-computer-system components, remote computers connected through communications media with the distributed computer system, remote-computer users, or any of many other types of entities that can be characterized by attribute values and that are desired to be identified through distributed searches.

FIG. 15A illustrates an attribute/value pair. The attribute 1502 is an alphanumeric string that identifies a particular attribute within a universal set of attributes used by the distributed-search methods and subsystems. Attributes are, in many implementations, centrally stored and managed by one or more distributed-search engines. An attribute is instantiated by being associated with one or more any of the above-mentioned types of entities. Instantiated attributes are associated with values. In this respect, an attribute is similar to a variable used in programming-language statements. The variable has a name, is instantiated within a particular scope comprising the routines from which it is visible, and an instantiated variable can store any of various different values within the value domain of the variable.

In the currently disclosed distributed-search methods and subsystems, three types of attributes are generally encountered: (1) entity attributes 1506, which are associated with entities that are identified by searches; (2) search attributes 1507, which identify parameters for a given distributed search; and (3) search-participant attributes 1508, which characterize a participant, generally a participant initiating a distributed search. Entity attributes 1506 fall into two classes: (1) static entity attributes 1509, which are entity attributes that, when instantiated, have either constant values or have values that are only infrequently changed and can therefore be pre-fetched and stored by the distributed-search engine in advance of being used during the initiation of distributed searches; and (2) dynamic entity attributes 1510, which are frequently modified and are therefore retrieved, at search time, by transmitting dynamic-attribute-value-request messages to target participants. The value 1504 currently associated with an instantiated attribute 1502 in an attribute/value pair is generally represented by an alphanumeric string. Attribute values can be numeric 1512, elements of a set 1513, elements of an ordered set 1514, Boolean values 1515, or generalized calls to functions or procedures that return numeric, set, ordered-set, or Boolean values 1526. A value may be one of a single element of a set, a subset of a set, single numeric values, or numeric-value ranges. In FIG. 15A, examples of the various different types of values are given in parentheses, such as the example range "[3-7.36]" 1517 provided for the mixed-range subtype 1518 of the numeric 1512 value type.

FIG. 15B shows certain derived types of information and data used by the distributed-search methods and subsystems to which the current application is directed. Values may be combined in value expressions 1520. These are familiar arithmetic and set expressions that include binary arithmetic operators 1522 and binary set operators 1523 as well as various types of arithmetic and set unary operators 1524. Value expressions can be considered to be expressions equivalent to constant values. Similarly, attributes may be combined in attribute expressions 1526 which are equivalent to expressions in programming languages that include variables. When the attributes in an attribute expression are replaced by specific values with which they are associated, the attribute expression is equivalent to a constant value. A derived attribute 1528 is an attribute defined in terms of other attributes. Value expressions can be combined by common relational operators to produce relational value expressions 1530 using relational binary operators 1532, relational unary operators 1534, and logical operators 1536.

FIG. 15C illustrates additional data and information types used in the distributed-search methods and subsystems to which the current application is directed. A filter 1540 is a relational expression that specifies a value or range of values for an attribute. A policy 1542 comprises one or more filters. A search-evaluation expression 1544 is used to evaluate returned dynamic-attribute values from participant search-request responders in order to compute a score for a response, as discussed, in detail, below. A search-evaluation expression comprises one or more evaluators. An evaluator 1546 is either a simple evaluator or a weight/simple-evaluator pair. A simple evaluator 1548 is a minimum-positive attribute or a floor/minimum-positive-attribute pair. A minimum-positive attribute is an attribute having values selected from a numeric or ordered-set value domain that map to a set of numerically increasing values, generally beginning with the value "0." As the value increases, the desirability or fitness of the attribute and its associated value decreases. For example, an attribute "price" may have values in the range [0, maximum price], with lower prices more desirable than higher prices and the price value 0, otherwise referred to as "free," being most desirable. In general, an attribute that is not a minimally positive can be easily transformed into a derived, minimum-positive-attribute. For example, the attribute "expected lifetime" can be transformed into the derived attribute "early expiration" by: early_expiration:MAXIMUM_LIFETIME-expected_lifetime. A weight is a numeric multiplier and a floor is a numeric or ordered-set value. Weights are used to adjust the relative importance of attributes in search-evaluation expression and a floor is used to set a lowest-meaningful value of an attribute to a value greater than κ, for numeric attributes, or to an ordered-set value greater than the minimum value in the ordered set. A search 1552 is either a search-evaluation expression or a search-evaluation expression and one or more policies.

Figure 16A:
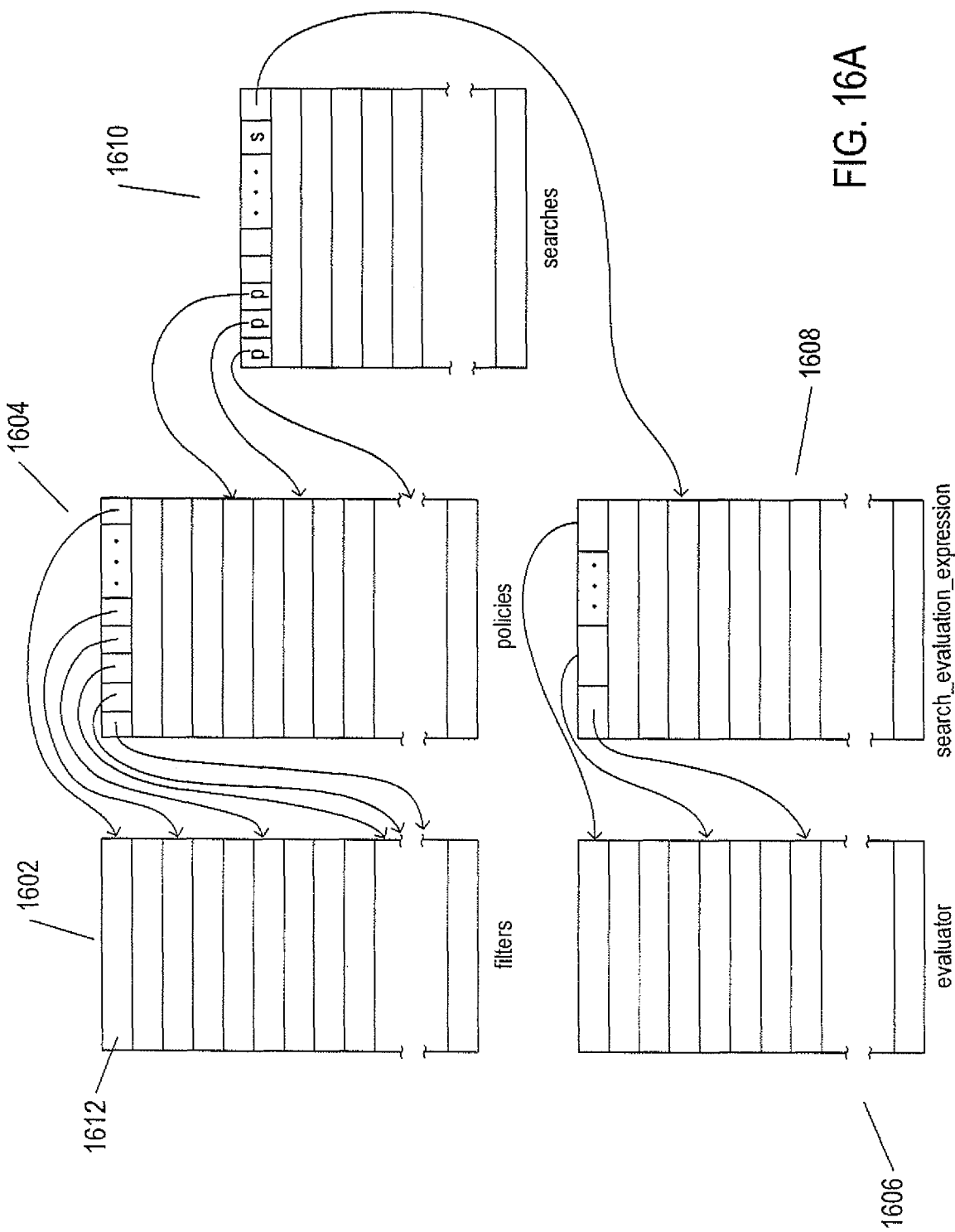
FIGS. 16A-B illustrate certain types of data maintained and used within local instances of the distributed-search subsystem and within a distributed-search engine.
Figure 16B:
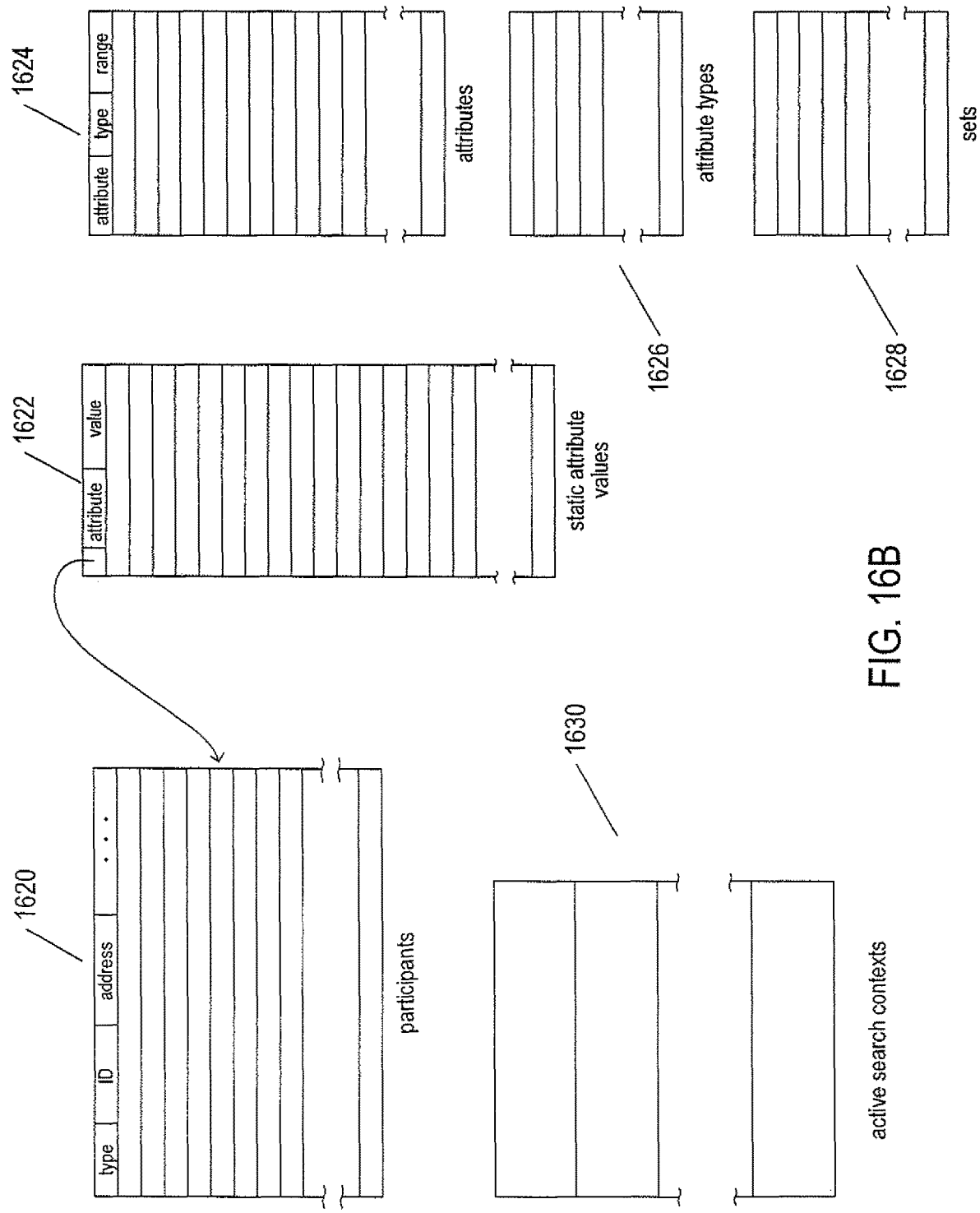

FIGS. 16A-B illustrate certain types of data maintained and used within local instances of the distributed-search subsystem and within a distributed-search engine. As shown in FIG. 16A, a local instance of the distributed-search subsystem stores one or more filters 1602, one or more policies 1604, each policy comprising one or more filters, one or more evaluators 1606, one or more search-evaluation expressions 1608, each search-evaluation expression comprising one or more evaluators, and one or more searches 1610, each search comprising a search-evaluation expression and zero, one, or more policies. In FIG. 16A, each row, such as row 1612, within a set of information entities, such as the set of filters 1602, represents a single information entity of the type of the entity set. The various types of information entities may be stored in relational database tables, including singly or multiply indexed relational database tables, or in any of many other different types of data-storage objects and systems.

Using similar illustration conventions as used in FIG. 16A, FIG. 16B shows the types of information entities stored within the distributed-search engine. The information-entity sets include a set of participants 1620, a set of continuously collected static-attribute/value pairs associated with participants 1622, a set of attributes 1624 and a set of attribute types 1626 which define the attributes that can be used in filters and profiles, a set of sets 1628 from which set values and subsets are selected for set-valued attributes, and a set of active search contexts 1630, each active search context representing a distributed search currently being executed by the distributed-search subsystem.

Figure 17:
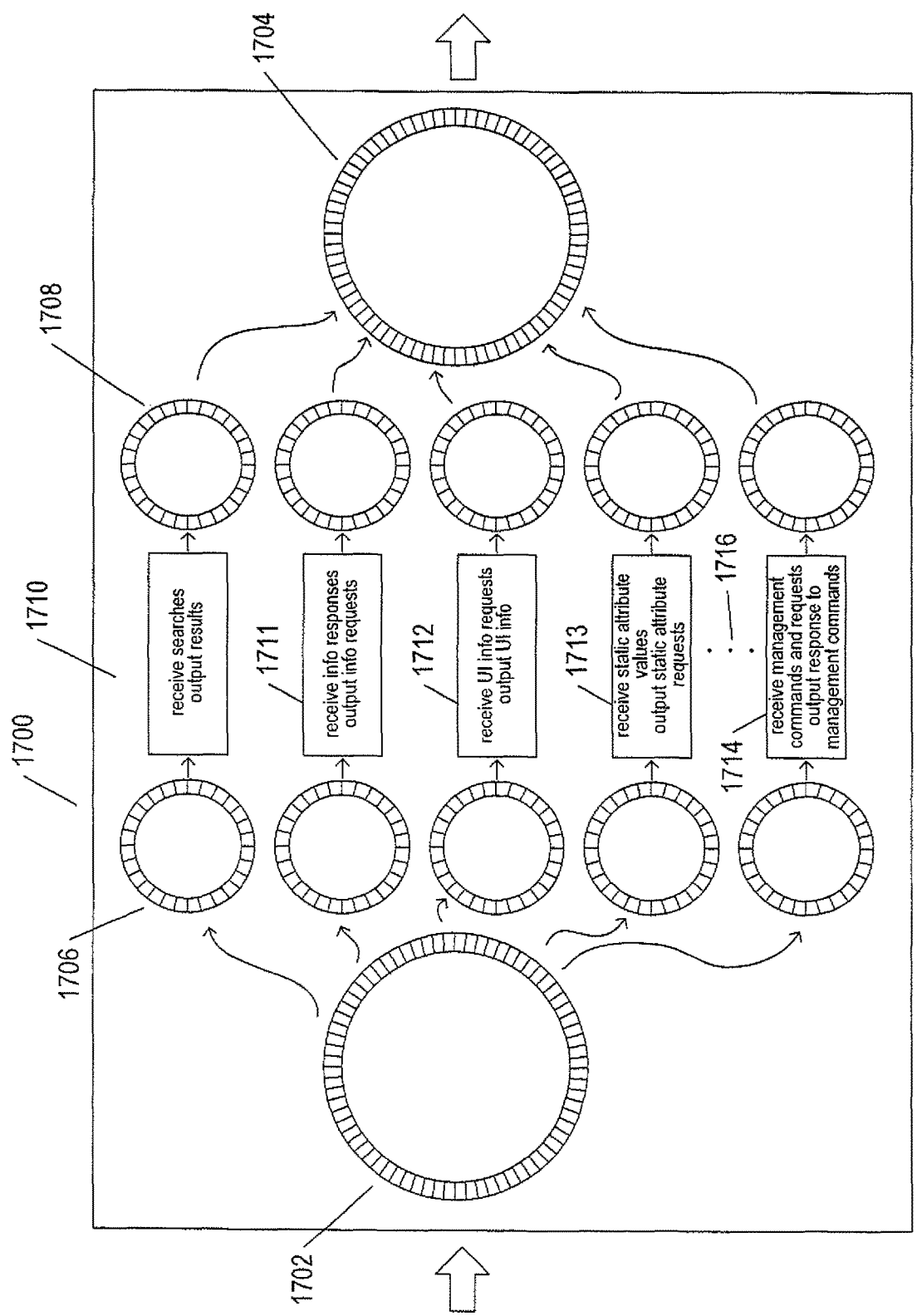
FIG. 17 is a high-level diagram of the distributed-search engine.

FIG. 17 is a high-level diagram of the distributed-search engine. The distributed-search engine receives incoming messages from one or more communications subsystems in an input queue 1702 and outputs messages to an output queue 1704 from which they are extracted and transmitted by the one or more communications subsystems. There are many different types of messages received and transmitted by the distributed-search engine. Different types of messages can be thought of as being distributed from the input queue 1702 to input queues for specific message types, such as input queue 1706 for search requests. Similarly, specific types of output messages are output to specific output queues, such as output queue 1708, from which they are input to the general output queue 1704 for transmission. Various different types of controllers or logic modules 1710-1714 process particular types of input messages and generate particular types of output messages. For example, controller 1710 receives search requests from distributed-search participants and outputs results corresponding to the search requests. Controller 1711 outputs information requests, such as dynamic attribute-value requests, and receives responses to those information requests. Controller 1712 receives UI information requests from local instances of the distributed-search subsystem and outputs responses to those requests. For example, a local instance of the distributed-search subsystem may request a current list of the different types of attributes that can be used to construct filters, policies, and search-evaluation expressions. Controller 1713 outputs static-attribute requests to distributed-search participants and receives response to those requests. Controller 1714 receives management commands and requests from local instances of the distributed-search subsystem and outputs responses to the received commands and requests. Ellipses 1716 indicate that a distributed-search engine may include additional types of controllers that receive and output additional specific types of messages.

Figure 18:
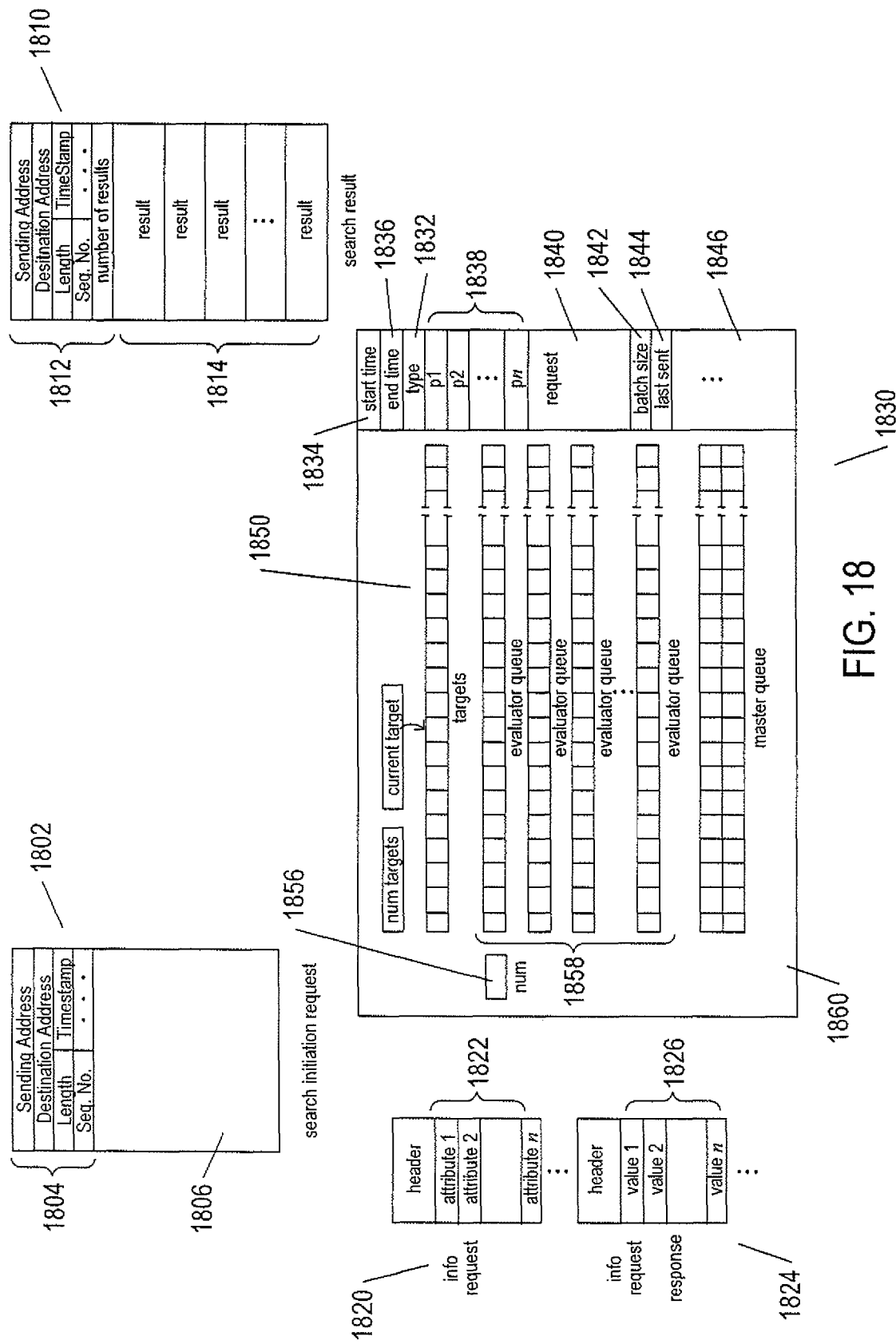
FIG. 18 illustrates various messages and data structures used during execution of a distributed search by the currently disclosed distributed-search subsystem, including an active search context, a search request, a search-request response, and information requests and responses.

FIG. 18 illustrates various messages and data structures used during execution of a distributed search by the currently disclosed distributed-search subsystem, including an active search context, a search request, a search-request response, and information requests and responses. A search-initiation-request message 1802 includes header information 1804 as well as a search-initiation request 1806 that includes a search-evaluation expression and zero, one, or more policies. A search-result message 1810 also includes a header 1812 and one or more search results 1814. Search results identify entities and include attribute/value pairs that characterize the entities. An information request 1820 is sent by the distributed-search engine to target participants requesting current values for a set of dynamic attributes 1822 specified in the information-request message. A response to the information-request message 1824 includes the requested dynamic-attribute values 1826.

An active search context 1830 is a complex data structure maintained by the distributed-search engine for each distributed search currently being executed by the distributed-search engine. In one implementation, an active search context includes an indication of the type of search 1832, a start time for the search 1834, an end time for the search 1836, and a number of additional search parameters 1838. The active search context may store the search-initiation-request message 1840 that initiated the search. The active search context may additionally include a batch size 1842, indicating the number of information requests to be sent in each batch of transmitted information requests and an indication of the time at which the last batch of information-request messages was sent 1844. Ellipses 1846 indicate that many additional parameters and information entities may be stored within an active search context. The active search context may also include a list of target participants 1850 to which information requests need to be directed. These may be participant addresses, expressions from which sets of participant addresses may be computed, or other types of information that can be used to generate addresses for target participants during execution of a distributed search. In addition, the active search context includes an indication of the number of evaluators in the search-evaluation expression 1856, a set of evaluator queues 1858, and a master queue 1860. The evaluator queues maintain an ordered set of returned dynamic-attribute values corresponding to the dynamic attribute associated each evaluator in the search-evaluation expression. The master queue 1860 maintains dynamic-attribute values, scores, and other information for the participants with the best-evaluated responses so far received. Operation of the evaluator queues and master queue is discussed, in great detail, below.

Figure 19A:
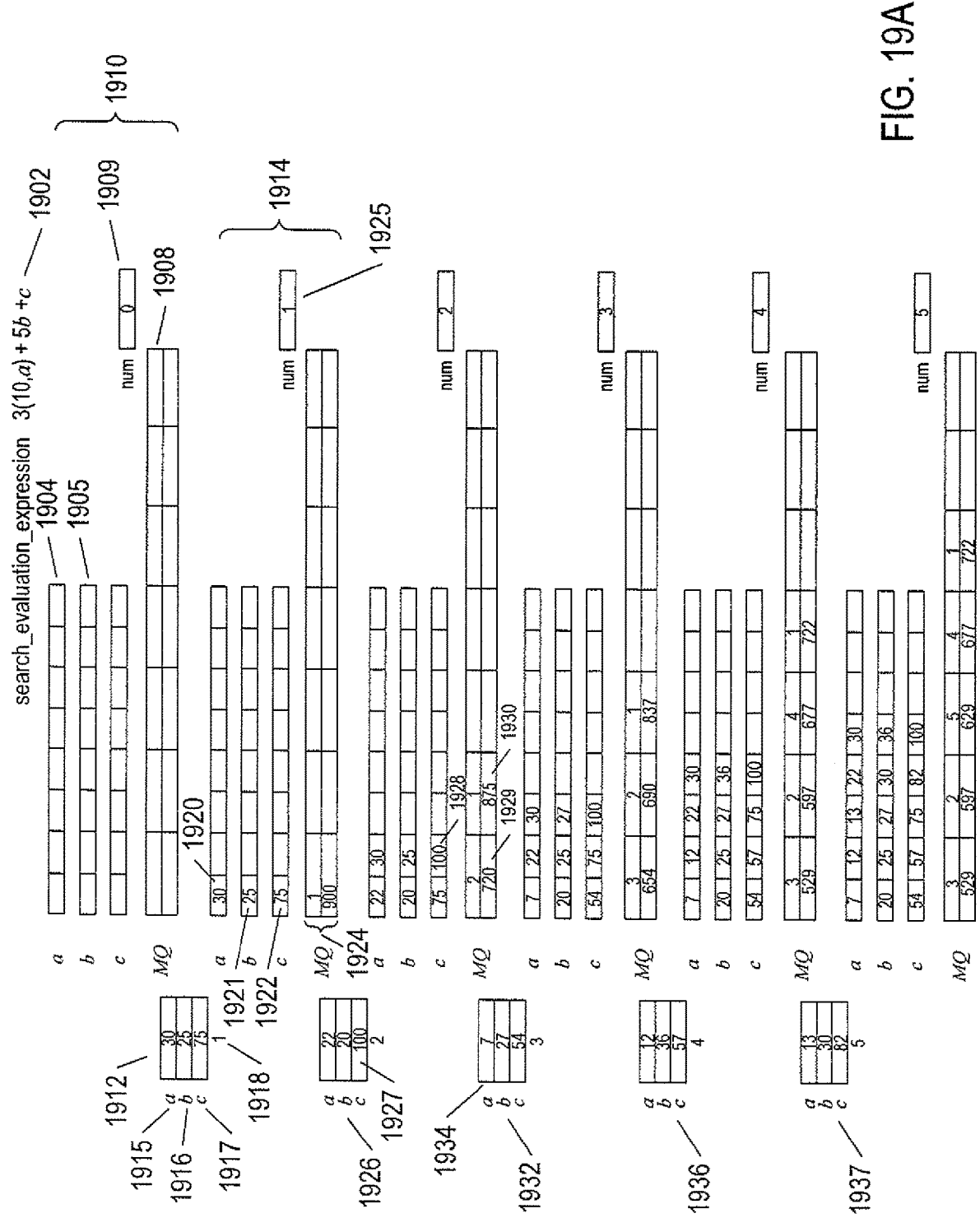
Figure 19B:
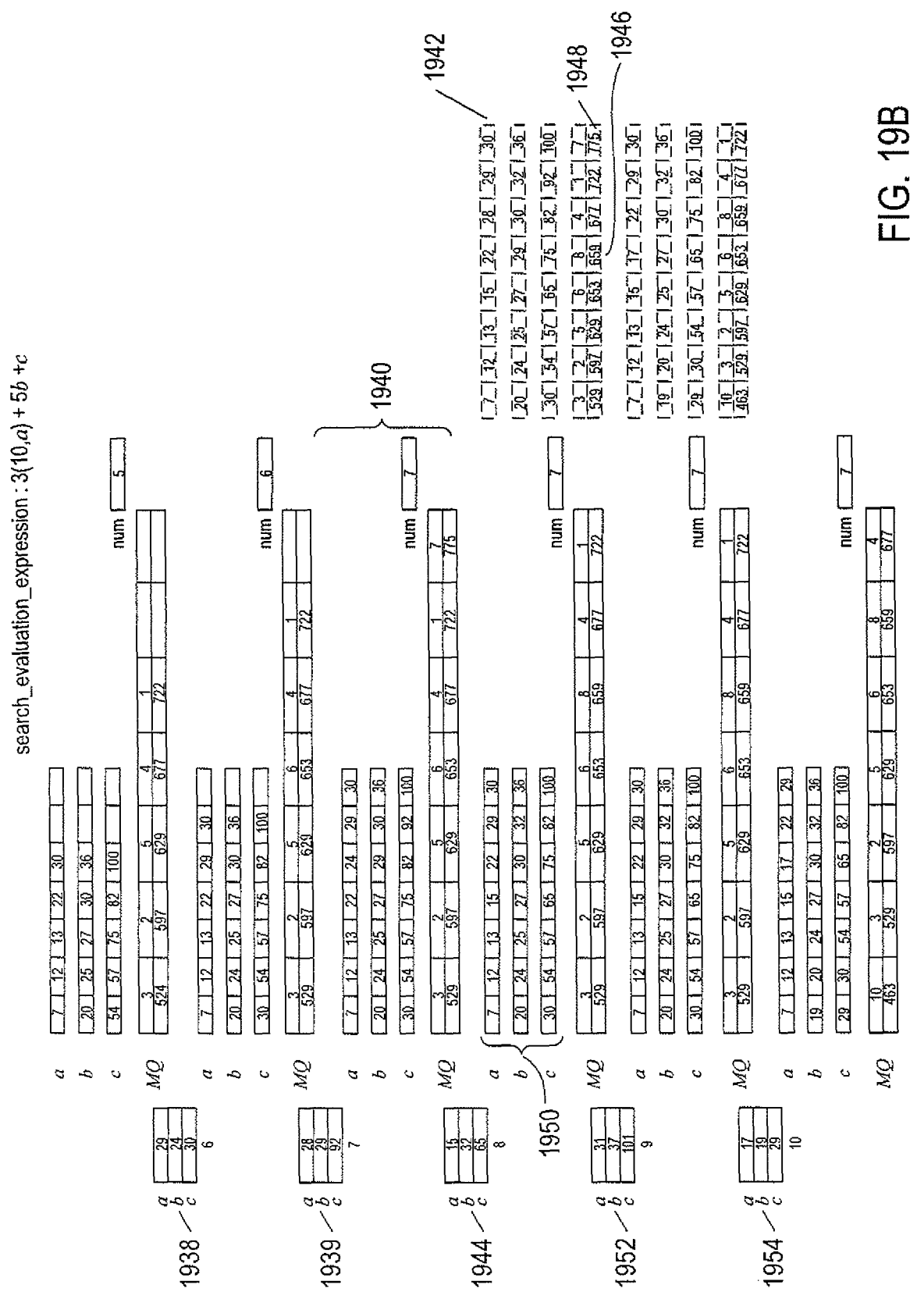

FIGS. 19A-B illustrate operation of the evaluator queues and master queue within an active search context. In this example, a dynamic-attribute-value-request message, a type of information-request message, is transmitted to target participants to obtain current values for each of 3 attributes a, b, and c. The search-evaluation expression 1902 associated with the distributed search is: $3(10,a)+5b+c$. The "+" operators indicate that a score is computed by adding values computed for each evaluator. The first evaluator, $3(10,a)$, has a weight equal to 3, a floor equal to 10, and is computed from the current value of attribute a. The second evaluator $5b$ has a weight of 5 and is computed from the current value of attribute b. The third evaluator is simply the value of attribute c. The search-evaluation expression is used to compute scores for each received response message, with lower scores more favorable than higher scores. Three evaluator queues 1904-1906 store, in sorted order, the values for attributes a, b, and c for the participant responses stored in the master queue MQ 1908. The number of stored responses is indicated in the variable num 1909. In FIGS. 19A-B, the state of the evaluator queues and the master queue are indicated before and after reception of each of a series of responses to dynamic-attribute-value-request messages. Initially, the queues are empty 1910. After a first response 1912 is received, an entry is placed in each queue, resulting in the queue state 1914. The first response message 1912 includes numeric values for the three attributes a, b, and c 1915, 1916, and 1917. It is also associated with an identifier, or ID 1918. In this example, the IDs are simple monotonically increasing integers starting with "1."

Next, processing of the first response message 1912 is described. The three attribute values 1915-1917 are entered into their respective queues 1920-1922. Because the queues are initially empty, they become the first entries in the queues and are therefore in sorted order. Then, a score is computed using the search-evaluation expression 1902. First, if a returned value is less than the floor in the evaluator associated with the attribute value, an initial evaluator score is set to the floor value. Otherwise, the initial evaluator score is set to the value returned in the response message. Then, a percentage or ratio is computed for each initial evaluator score and the maximum value in the queue in which the associated attribute value was inserted. The ratio is multiplied by 100 to generate an intermediate evaluator score in the range [0, 100]. Then, the intermediate evaluator score is multiplied by the weight to produce a final evaluator score. The three evaluator scores are then added to produce the final score for the response message. In the case of the first response message 1912, all of the returned attribute values are the maximum values in the queues. Therefore, the score is computed as:

$$(3\times((30\div30)\times100))+(5\times((25\div25)\times100))+((75\div75)\times100)=900$$

This score is entered, in association with the identifier for the response message "1," into the master queue as the first entry 1924. There is now one entry in the master queue and each evaluator queue, so the variable num now has the value "1" 1925. Of course, this is merely one way to compute a score from the search-evaluation expression and returned attribute values. Many other types of score computations can be used. For example, the rank of an attribute value in an evaluator queue can be used in addition to, or in place of, the percentage of the maximum value in the queue to compute the intermediate evaluator score. The raw computed ratios of values to max values in queues can be used, rather than percentages. Exponentials and logarithms can be employed to generate non-linear scoring methods. Evaluator scores may be combined by operations other than addition. However, the currently described method has proven to provide good results for certain multi-attribute search results.

A second response message 1926 is then received, and the same operations are performed. Because the values in the evaluator queues are sorted in ascending order, and because the value "100" for attribute c in the second response message 1927 is greater than the value "75" for attribute c in the first response message 1917, the value "100" is now at the end of the evaluator queue 1928 for attribute c. The scores for the first and second messages are now recomputed as:

$$(3\times((30\div30)\times100))+(5\times((25\div25)\times100))+((75\div100)\times 100)=875$$

$$(3\times((22\div30)\times100))+(5\times((20\div25)\times100))+((100\div100)\times 100)=720$$

In the illustrated queue states, the master queue is kept sorted, in ascending order, so the score and identifier for the second response message occupies the first position 1929 in the master queue and the identifier and score for the second response message now occupies the second position 1930 in the master queue. Again, the lower the score, the more desirable the response. As will be seen, below, the active search context is designed to retain a set of the lowest-scored response messages, alternatively referred to as "most favorably scored response messages," received during the course of the distributed search.

A third response message 1932 is then received, and the same operations are performed. In this case, the value for attribute a, "7," 1934 is lower than the floor "10" for the first evaluator, so the value "10" is used instead of the value "7" in computing the evaluator score associated with attribute a. The scores for all three messages are recomputed as:

$$(3\times((30\div30)\times100))+(5\times((25\div27)\times100))+((75\div100)\times 100)=837$$

$$(3\times((22\div30)\times100))+(5\times((20\div27)\times100))+((100\div100)\times 100)=690$$

$$(3\times((10\div30)\times100))+(5\times((27\div27)\times100))+((54\div100)\times 100)=654$$

In this example, the master queue is kept sorted, in ascending order, so the score and identifier for the second response message occupies the first position 1929 in the master queue and the identifier and score for the second response message now occupies the second position 1930 in the master queue.

Four more response messages 1936-1939 are received, resulting in the queue state 1940 shown in FIG. 19B. At this point, the evaluator queues and the master queue are full. From now on, any newly received response message added to the master queue along with individual attribute values added to the evaluator queues, will involve discarding an entry from each queue. This only occurs when the score computed for the newly received response message is lower than one of the scores in the master queue. As more and more responses are received, the likelihood that any next received response will be entered into the evaluator and master queues quickly decreases to a relatively low value for most types of distributed searches. The operations now become slightly more complex. First, as shown in a scratch-pad representation 1942 of the evaluator and master queues, there is an additional entry in each queue that can temporarily accommodate the attribute values and score for a newly received message. The scores are computed based on all of the entries, including those for the newly arrived response, and then the entries for the response with the highest score are deleted. Newly arrived response 1944 with ID equal to "8" ends up with a score "658," placing it towards the middle 1946 of the scratch-pad master queue. The score for response message "7" 1948 is now highest, and therefore the entries for that response message are deleted from the queues to produce queue state 1950.

The ninth response message 1952 arrives with each attribute value greater than the current maximum value in the respective evaluator queue. As a result, no new scores need be computed, since there is no possibility that a score computed for the ninth response message could be lower than any of the scores currently residing in the master queue. The ninth response is thus immediately rejected and the queue state 1954 remains unchanged.

A Distributed Resource-Exchange System that Aggregates a Large Number of Data Centers to Create a Distributed, Multi-Organization Cloud-Computing and Resource-Sharing Facility FIGS. 20A-E illustrate the concept of resource exchange among cloud-computing facilities, data centers, and other computing facilities. FIGS. 20A-D all use similar illustration conventions, next described with reference to FIG. 20A.

Figure 20A:
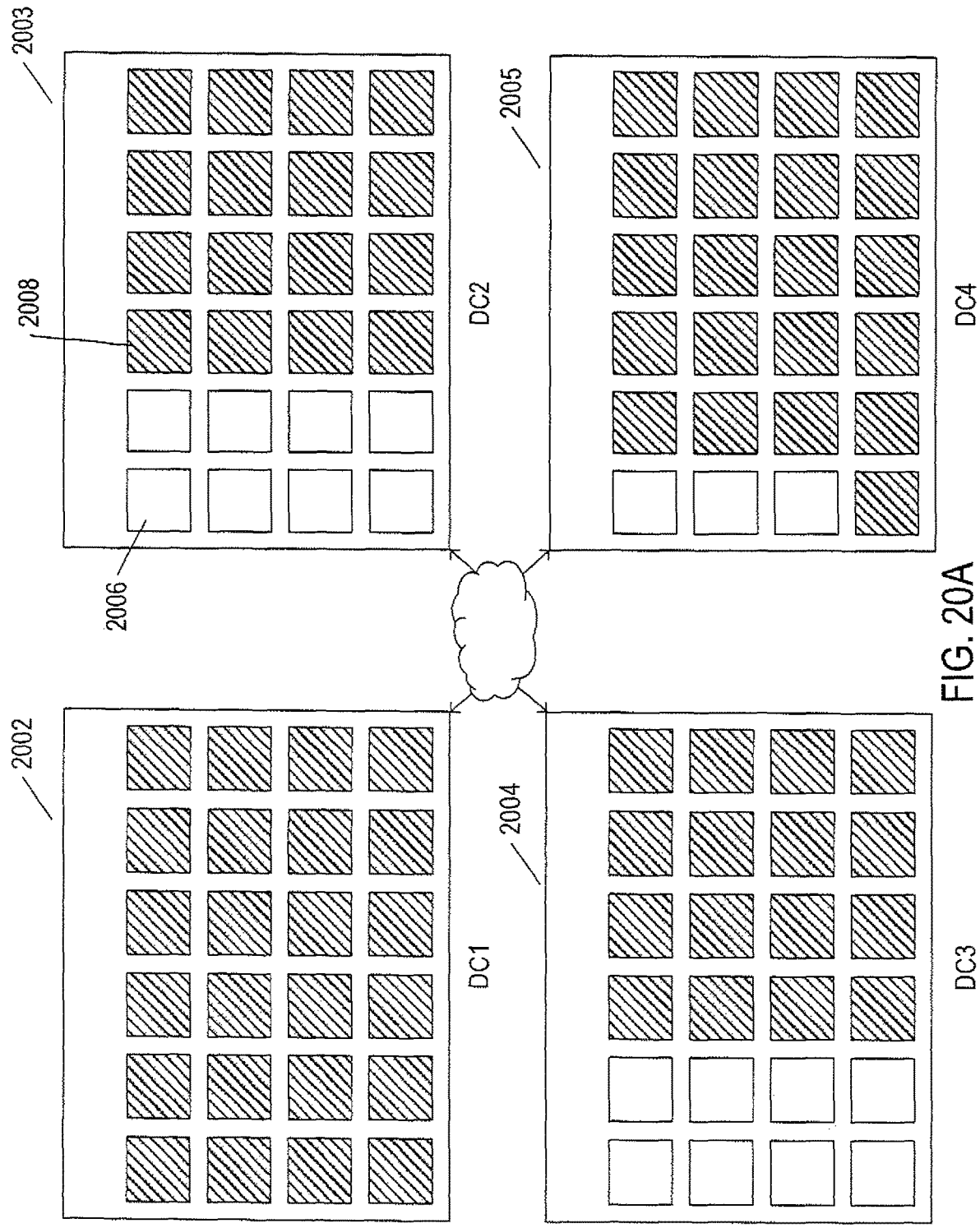

FIG. 20A shows abstract representations of four different computing facilities 2002-2005. In each large rectangle representing each computing facility, smaller squares represent a capacity for hosting a VM. Squares without cross-hatching, such as square 2006, represent a currently unused capacity for hosting a VM and cross-hatched squares, such as square 2008, represent a currently in-use capacity for hosting a VM. Of course, real-world computing facilities generally have the resources and capacities to host hundreds, thousands, tens of thousands, or more VMs, but, for current concept-illustration purposes, the 24-VM-hosting capacity of each illustrated computing facility 2002-2005 is sufficient. It should be noted that, in the current document, the computational resources used to host a VM are used as an example of a resource that can be exchanged between computing facilities. The computational resources used to host a container is another example of a resource that can be exchanged between computing facilities. Virtual machines and containers are both examples of computational-resources-consuming entities that can be hosted by computing facilities.

As shown in FIG. 20A, the computing facility DC1 2002 has no spare or unused VM hosting capacity. Computing facilities DC2 2003 and DC3 2004 each have unused capacity for hosting eight additional VMs while computing facility DC4 has unused capacity for hosting three additional VMs. Unused capacity can arise within a computing facility for many reasons. A computing facility may have been expanded to accommodate a planned project or division, but the project or division may not yet need the expanded computational resources or may have been cancelled. In many cases, computational-facility administrators may maintain additional, spare capacity to be able to instantly respond to increased demand from internal users or from remote clients of internally hosted web services and applications. In some cases, the owners and/or managers of a computational facility may have configured the computational facility for providing computational resources as a service to remote clients. The amount of unused capacity within a given computational facility may fluctuate widely and over very short time spans, in certain operational states, or may remain fairly stable, over days, weeks, or months. Currently, for computing facilities other than those specifically established to provide resources as a service, there are few methodologies and media for safely and conveniently making unused capacity available to remote systems and users.

The distributed resource-exchange system facilitates leasing or donating unused computational resources, such as capacity for hosting VMs, by computing facilities to remote computing facilities and users. The distributed resource-exchange system provides a type of automated computational-resource brokerage that brokers exchange of computational resources among participant computing facilities, allowing computational resources to be conveniently, securely, and rationally shared among many different computing facilities owned and managed by many different participant organizations. At a high-level perspective, the automated computational-resource brokerage is a computational-facility-aggregation optimization subsystem that allows for applying computational resources to tasks that need them across a potentially enormous number of discrete computing facilities owned and managed by many different organizations. The distributed resource-exchange system provides efficient brokerage through automation, through use of the above-discussed methods and systems for distributed search, and through use of efficient services provided by virtualization layers with computing facilities, including virtual management networks, secure virtual internal data centers, and secure VM migration services provided by virtualization layers. The automated computational-resource brokerage is convenient and easy to use for administrators, managers, and other users of commutating facilities seeking to sell, donate, or otherwise provide local resources to remote computing-facility resource consumers because of simplified user interfaces, because of predefined attributes, filters, profiles, and easily accessible information about resource providers and resource consumers, and because of a wealth of automated methodologies that streamline searches for resources, transactions that provide resources for defined periods of time to resource consumers, collection of user feedback, and generation of rankings, ratings, and recommendations to facilitate future searchers for resources and resource-acquisition transactions. The automated computational-resource brokerage is rational because the brokerage provides a wealth of information to resource providers and resource consumers in order that participants are fully informed with regard to available resources and their attributes, and because this information is incorporated into automated methods and systems that allow the wealth of information to be constantly updated and to be used by automated distributed-search methods. The automated computational-resource brokerage provides secure remote hosting of VMs, secure data transmission and storage, secure internal and external network communications, and other security measures to ensure that resources provided by remote computing facilities are as secure, or nearly as secure, as local resources used by resource consumers.

Figure 20B:
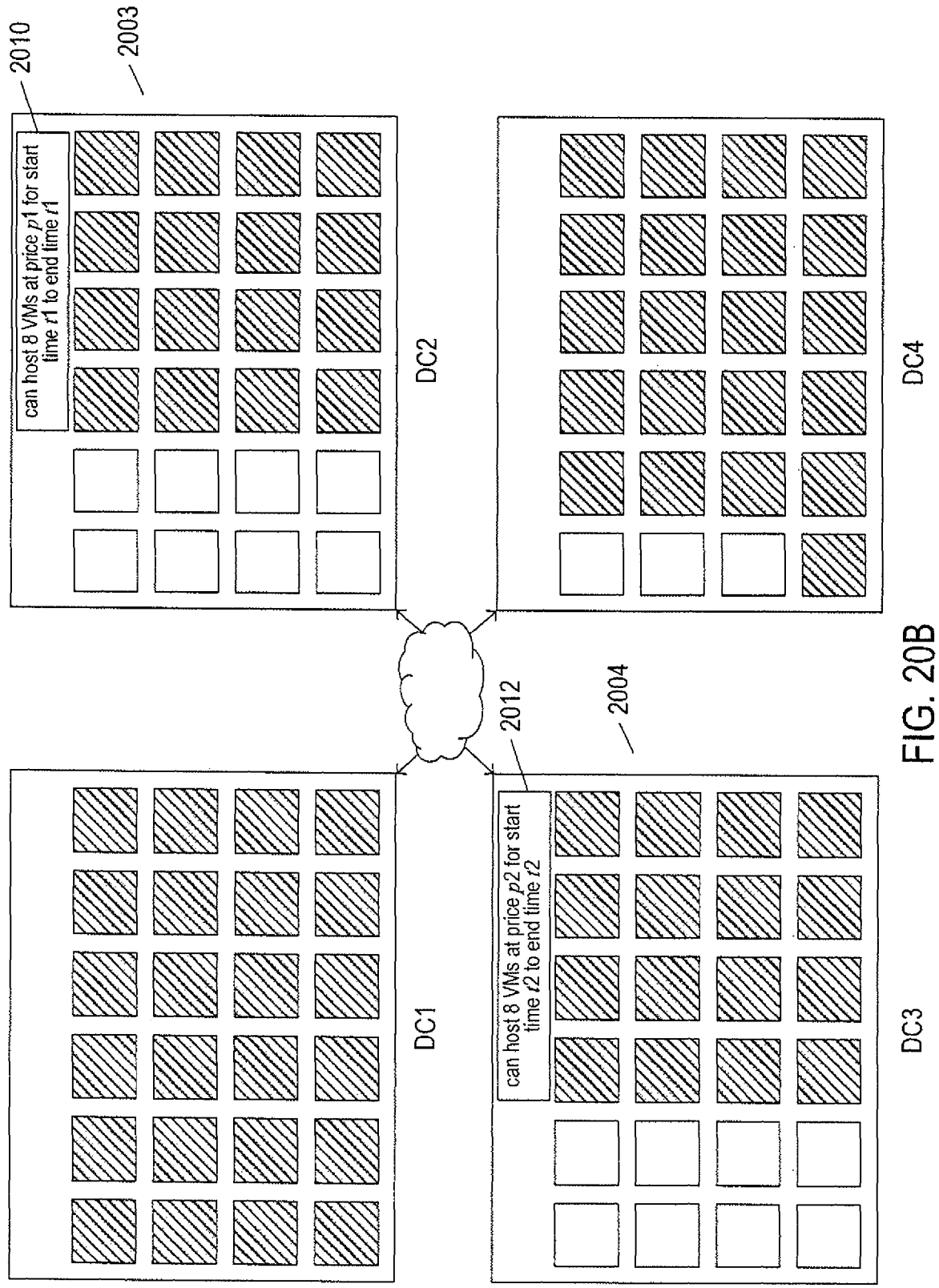

FIG. 20B illustrates an initial step in resource exchange. Computing facilities DC2 2003 and DC3 2004 have registered as participants with the automated computational-resource brokerage in order to make their spare VM-hosting capacity available to remote resource consumers. As shown in FIG. 20B, they have provided attribute values 2010 and 2012 to the automated computational-resource brokerage indicating that they are interested in selling VM-hosting capacity. As discussed above, certain of these attribute values are provided during registration, others are provided in response to static-attribute requests, and still others are provided in response to information-request messages. Attributes such as the current price for VM hosting and current hosting capacity are likely to be provided in response to information-request messages, while the types of hosting services and long-term hosting capacities may be provided in response to static-attribute requests. The fact that computing facilities DC2 and DC3 are automated-computational-resource-brokerage participants is obtained during registration with the automated brokerage.

Figure 20C:
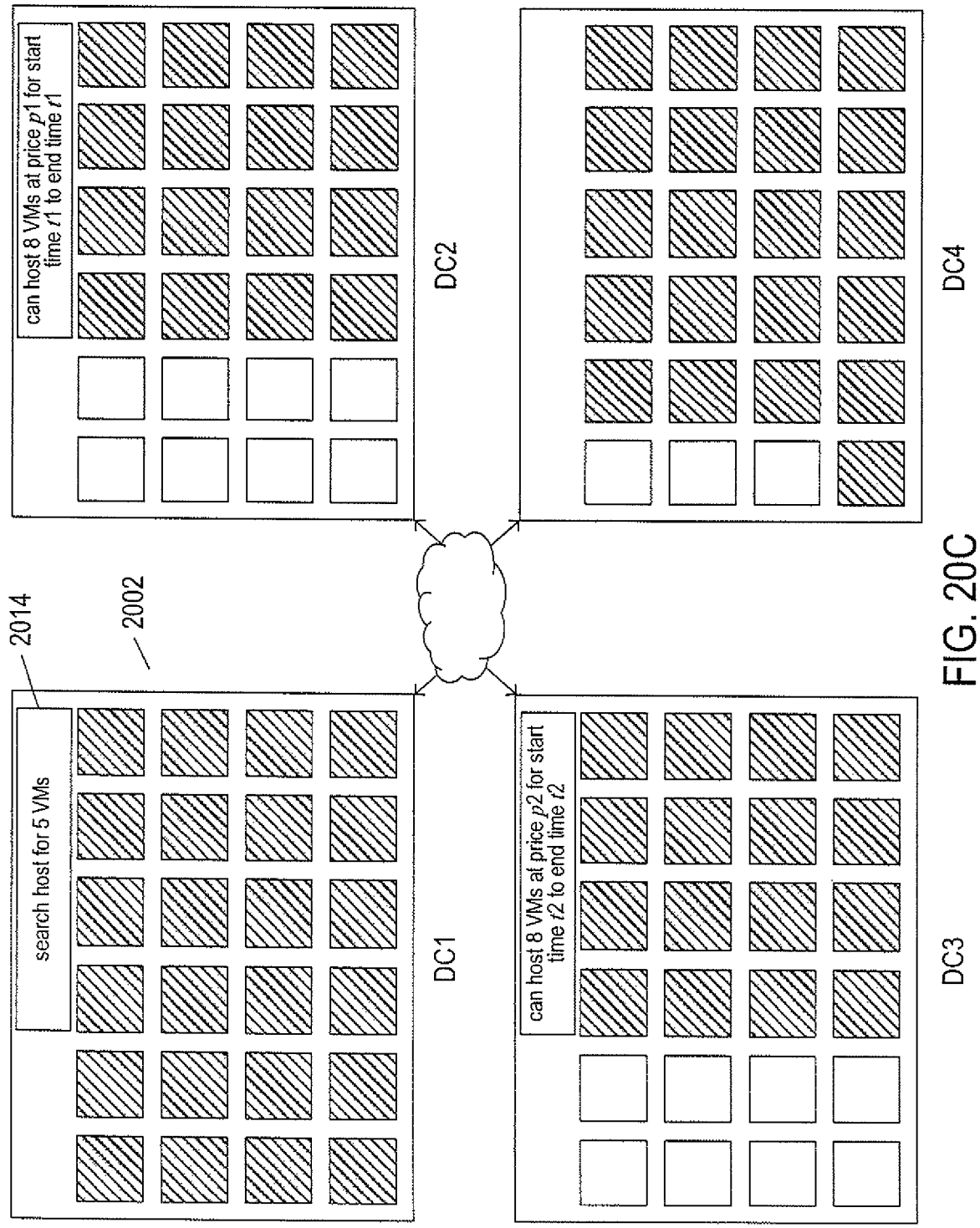

In FIG. 20C, the administrator of computing facility DC1 2003 realizes that all hosting capacity is currently in use within the computing facility. As a result, the administrator can either seek to physically expand the computing facility with new servers and other components or seek to obtain computational resources for remote providers, both for launching new VMs as well as for offloading currently executing VMs. As shown in FIG. 20C, the administrator has elected to register as a participant with the automated computational-resource brokerage and has initiated a search for one or more remote provider-participants to host five VMs 2014.

In FIG. 20D, the administrator of computing facility DC1 2002 has received search results 2016 from the automated computational-resource brokerage. The administrator, or automated resource-acquisition functionality within a local client instance of the automated computational-resource brokerage, can choose with which provider to transact for VM hosting, or can transact with both providers for hosting a different subset of the five VMs. Note that, during the time that the search was initiated, as discussed above with reference to FIG. 20C, and when initial information may have been returned from computing facility DC2 to computing facility DC1, several new VMs have been hosted by computing facility DC2. However, because the distributed search verifies respondents prior to returning search results, as discussed above, the search results 2016 accurately reflect the current hosting capacity of computing facility DC2.

Figure 20E:
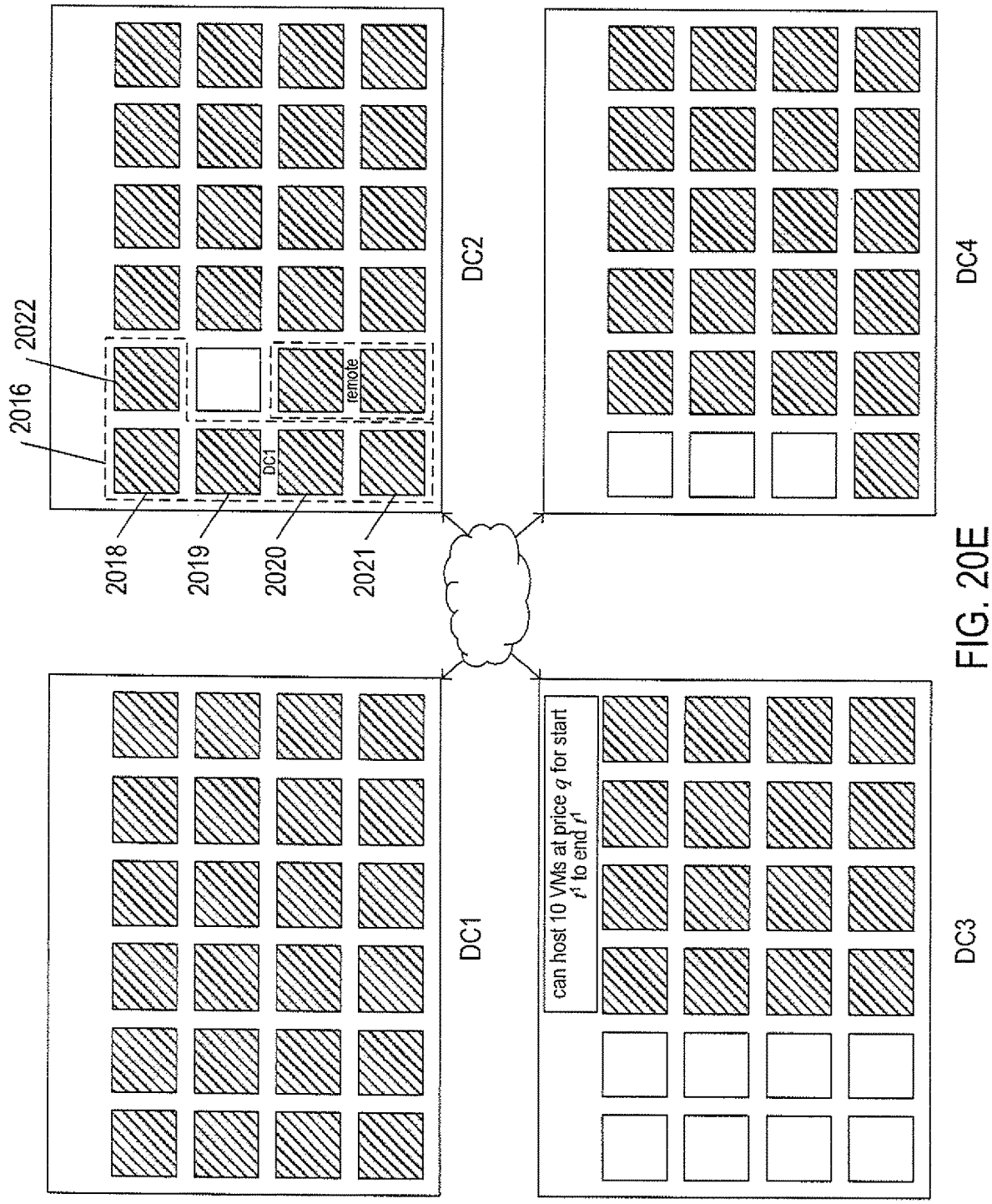

In FIG. 20E, the administrator of computing facility DC1, or automated resource-acquisition functionality within a local client instance of the automated computational-resource brokerage, has decided to transact for hosting the five VMs with computing facility DC2. As shown by the dashed lines 2016 that demarcate the 5 DC1 VMs 2018-2022 hosted by computing facility DC2, the VMs are hosted in a secure hosting partition so that neither the executing VMs nor the internal resources that they use within computing facility DC2 can be accessed or observed by DC2 entities or users. These 5 hosted VMs can be thought of as running within an extension of the DC1 computing facility.

Figure 21A:
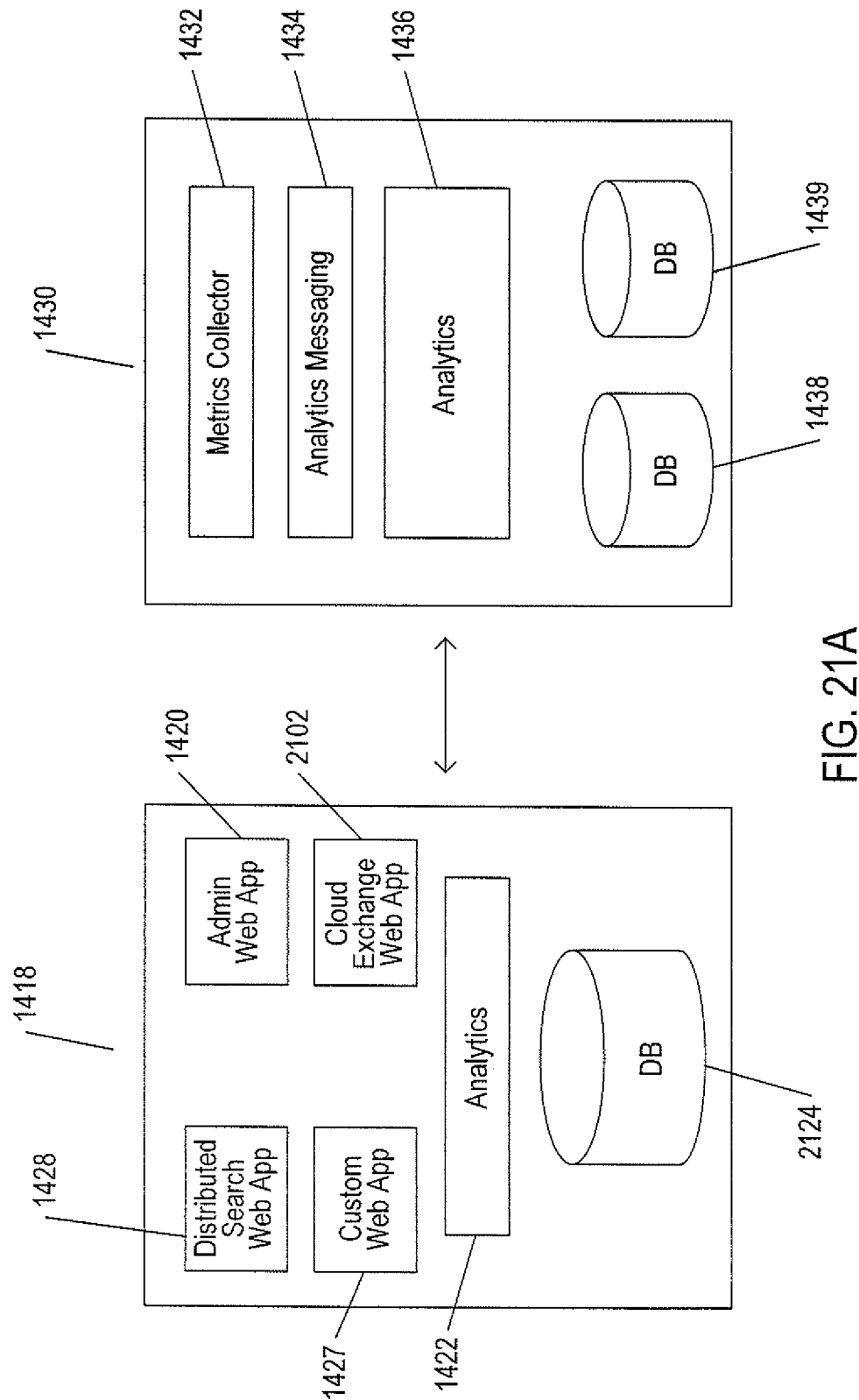
FIGS. 21A-B illustrate implementation of the automated computational-resource brokerage within multiple distributed computing facilities.
Figure 21B:
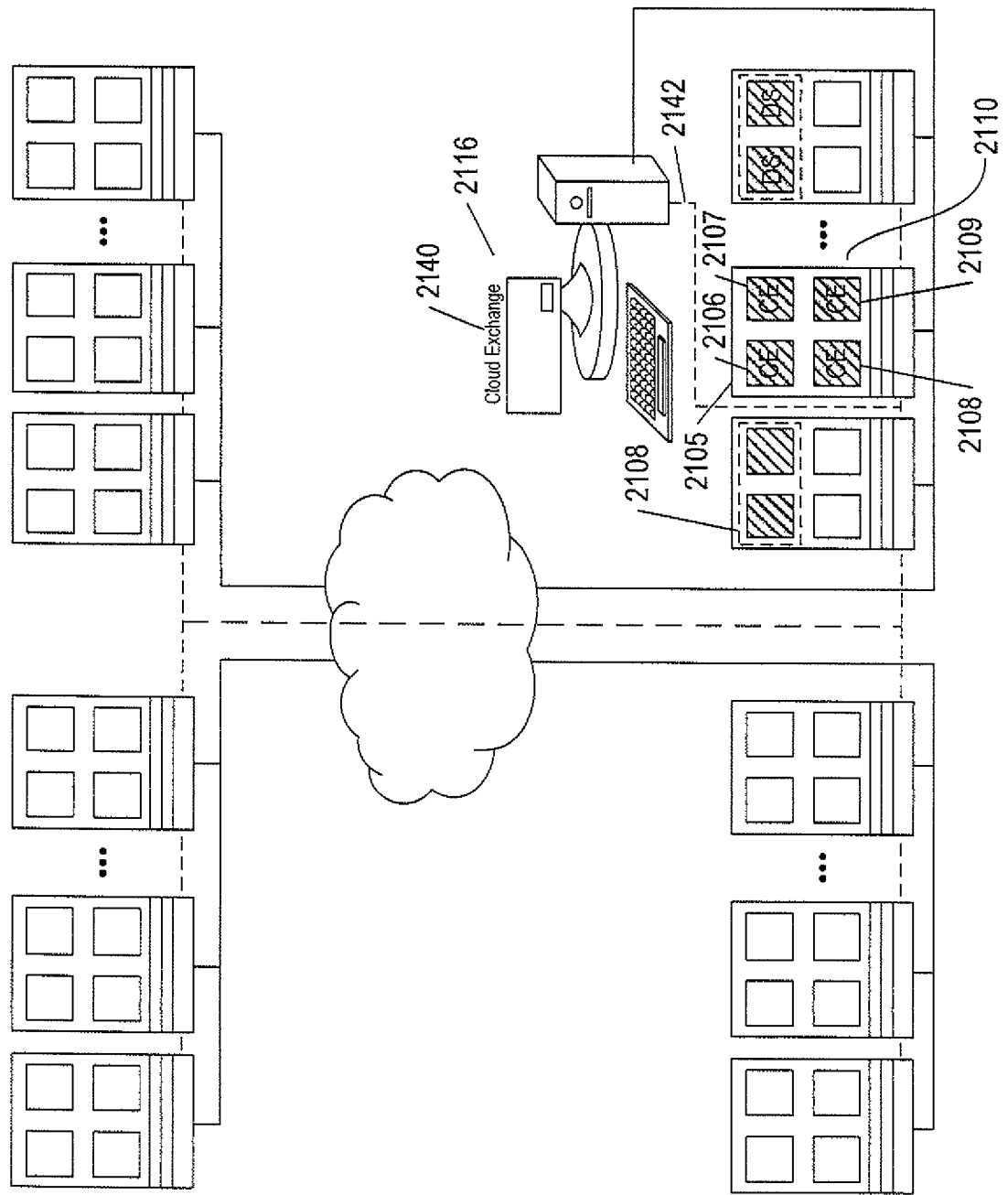

FIGS. 21A-B illustrate implementation of the automated computational-resource brokerage within multiple distributed computing facilities. The implementation of the computational-resource brokerage mirrors implementation of the distributed-search subsystem discussed above with reference to FIGS. 11B-C. The management subsystem is again shown, in FIG. 21A, using the same numeric labels used previously in FIG. 11B. In addition to the distributed-search web application 1128 that represents a local instance of the distributed-search subsystem within a server cluster, virtual data center, or some other set of computational resources within the distributed computer system, the management system provides an execution environment for a cloud-exchange web application 2102 that represents a local instance of the automated computational-resource brokerage within the server cluster. In certain implementations, the distributed-search web application 1128 may be incorporated within the cloud-exchange web application. The cloud-exchange web application 2102 provides a cloud-exchange UI (2104 in FIG. 21B) through which users can register as participants, update participant information, develop exchange policies and filters, set up automated resource-provision and resource-consumption agents within the automated computational-resource brokerage, and monitor exchanges, transactions, and other activities.

As shown in FIG. 21B, the local instance of the automated computational-resource brokerage, or cloud-exchange web application (2102 in FIG. 21A) exchanges requests and responses with a cloud-exchange engine 2105, in one implementation implemented as a multi-tiered application containing multiple cloud-exchange engine virtual machines 2106-2109 that run within a server 2110 or another computer system within the distributed computer system. The cloud-exchange engine maintains centralized attribute values and other data for the automated computational-resource brokerage, monitors transactions, carries out transactions for computational resources on behalf of participants, collects feedback and maintains ratings and/or rankings of participants, provides many default filters and policies, and carries out many additional functions that together comprise the automated computational-resource brokerage.

Figure 22:
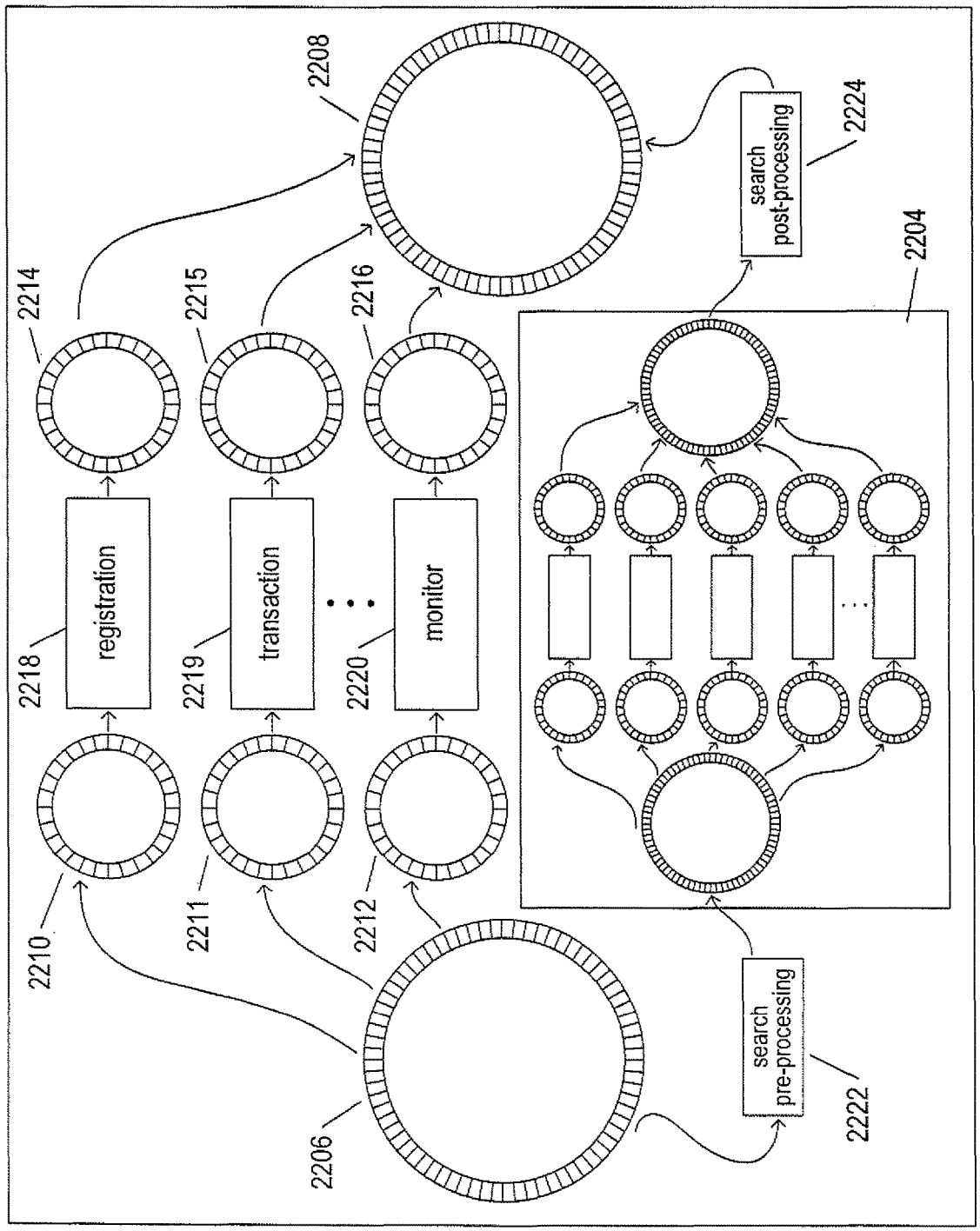
FIG. 22 illustrates the general implementation of the cloud-exchange engine (2105 in FIG. 21B).

FIG. 22 illustrates the general implementation of the cloud-exchange engine (2105 in FIG. 21B). The general implementation of the cloud-exchange engine 2202 mirrors that of the distributed-search engine 2204, discussed above with reference to FIG. 14. Incoming request and response messages are received in a general input queue 2206 and outgoing responses and requests are queued to a general output queue 2208. FIG. 14 is a high-level diagram of the distributed-search engine. There are many different types of messages received and transmitted by the cloud-exchange engine. Different types of messages can be thought of as being distributed from the input queue 2206 to input queues for specific message types, such as input queues 2210-2212. Similarly, specific types of output messages are output to specific output queues, such as output queue 2214-2216, from which they are input to the general output queue 2208 for transmission. Various different types of controllers or logic modules 2218-2220 process particular types of input messages and generate particular types of output messages. For example, controller 2218 receives registration requests and additional requests within registration dialogues and returns responses to those requests. Searches for resources, also considered to be requests for resource consumption or initiation of resource auctions, are processed by a search-pre-processing module 2222 before being input as search requests to the distributed-search engine. Search responses, or bids from resource-provider participants, are processed by a search-post-processing module 2224 before being returned to the resource-consumption participant that initiated the search or auction. Of course, many alternative implementations, including implementations that incorporate distributed-search logic directly within the cloud-exchange engine, are possible.

Resource-Exchange Life Cycle as Represented by a Resource-Exchange Context

In many implementations of the above-described resource-exchange system, each resource exchange involves a well-defined set of operations, or process, the current state of which is encoded in a resource-exchange context that is stored in memory by the resource-exchange system to facilitate execution of the operations and tracking and monitoring of the resource-exchange process. The well-defined set of operations, and the state changes associated with those operations, define the life cycle of a resource exchange within the resource-exchange system. Resource-exchange contexts are physical components of the resource-exchange system. Resource-exchange contexts persistently store policy information and state information that can be electronically accessed during resource-exchange-system operations. Resource-exchange contexts are also control components of resource-exchange system, organizing and driving the many different tasks carried out by many different resource-exchange-system components within many different computing facilities.

To facilitate understanding of the following discussion, terminology used to describe the resource-exchange system and resource-exchange-system components is next presented. The phrase "resource-exchange system" refers to a large number of computing facilities owned and managed by many different organizations that are partially aggregated to allow the computing facilities to share portions of their computational resources with other computing facilities. The phrase "resource-exchange context" refers to the information stored in memories and mass-storage devices of the resource-exchange system that encodes an indication of the current state of a particular resource exchange, a buy policy associated with the resource exchange, an active search context during at least an auction phase of the lifecycle of the resource exchange, and additional information. The phrase "resource exchange" is an exchange of a computational resource, provided for a specified time period by a resource-provider computing facility, for a fee, service, or computational resource provided by a resource-consumer computing facility. The cloud-exchange system is an automated computational-resource brokerage system, as discussed in the preceding section. The resource provider and the resource consumer, both computing-facility participants in a resource exchange, each includes a local cloud-exchange instance which provides a cloud-exchange UI and which carries out client-side tasks in support of a resource exchange that is managed by the cloud-exchange system.

The resource-exchange process can be generally subdivided into three distinct phases: (1) a pre-auction phase; (2) an auction phase; and (3) a post-auction phase. The pre-auction phase includes association of buy policies with sets of virtual machines, virtual-machine activation, and generation and sending of an initiation-request message from a resource consumer to the cloud-exchange system. The auction phase includes generating an active search context, generating a set of initial candidate resource providers, requesting of bids from the candidate resource providers, scoring and queuing returned bids, selecting final candidate resource providers, and verifying a selected resource provider by the cloud-exchange system. The post-auction phase includes migrating the one or more virtual machines to the computing facility for the selected resource provider or building the one or more virtual machines within the computing facility, establishing seamless data-link-layer ("L2") virtual-private-network ("VPN") networking from buyer to seller, and monitoring virtual-machine execution in order to detect and handle virtual-machine-execution termination, including initiating a financial transaction for compensating the resource provider for hosting one or more virtual machines.

Figure 23A:
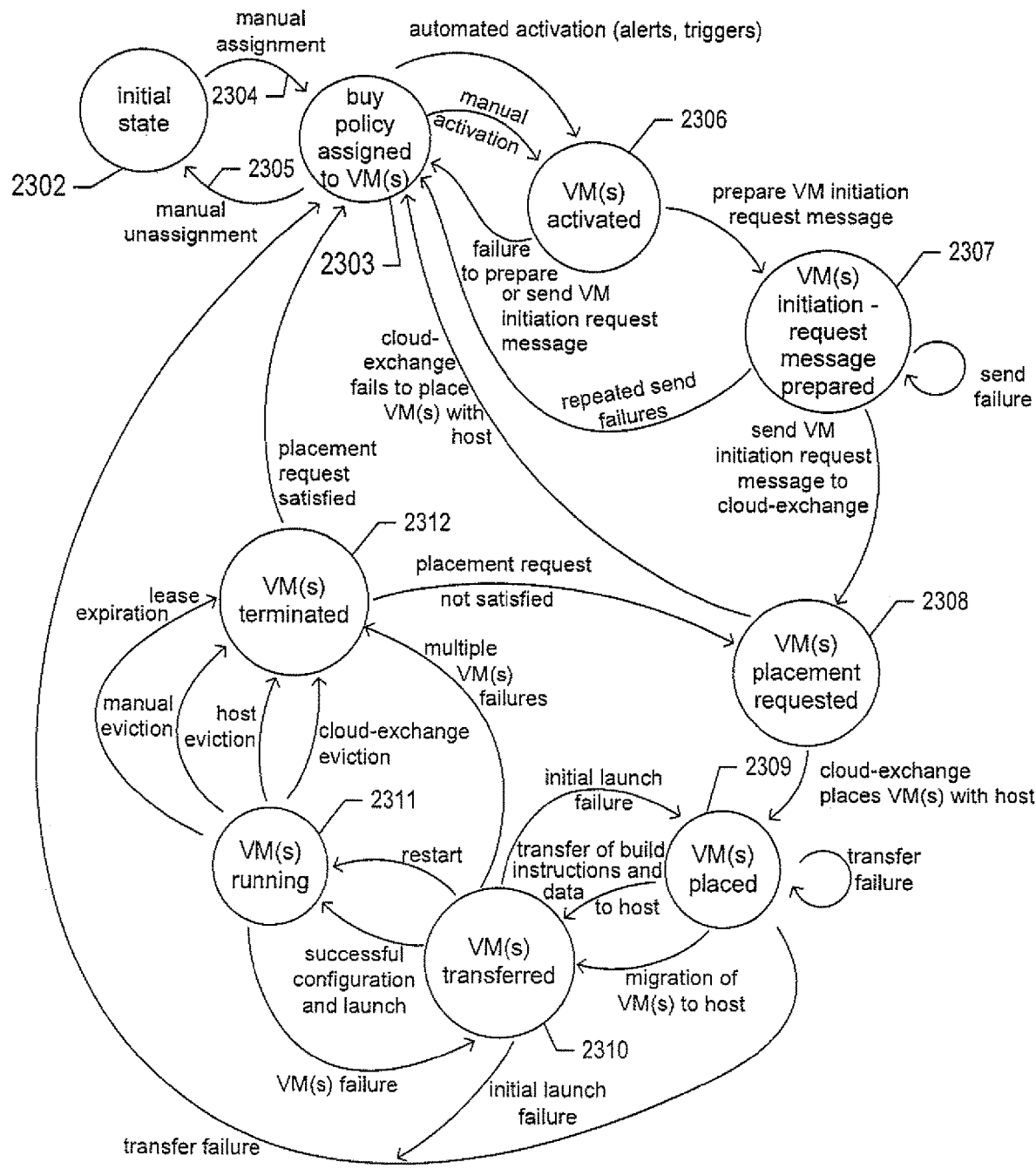
FIGS. 23A-C show the states associated with a resource exchange, and the transitions between the states, that define the VM placement and execution process for the described implementation of the cloud-exchange System and that define the lifecycle of a resource-exchange context and the particular resource exchange represented by the resource-exchange context.
Figure 23B:
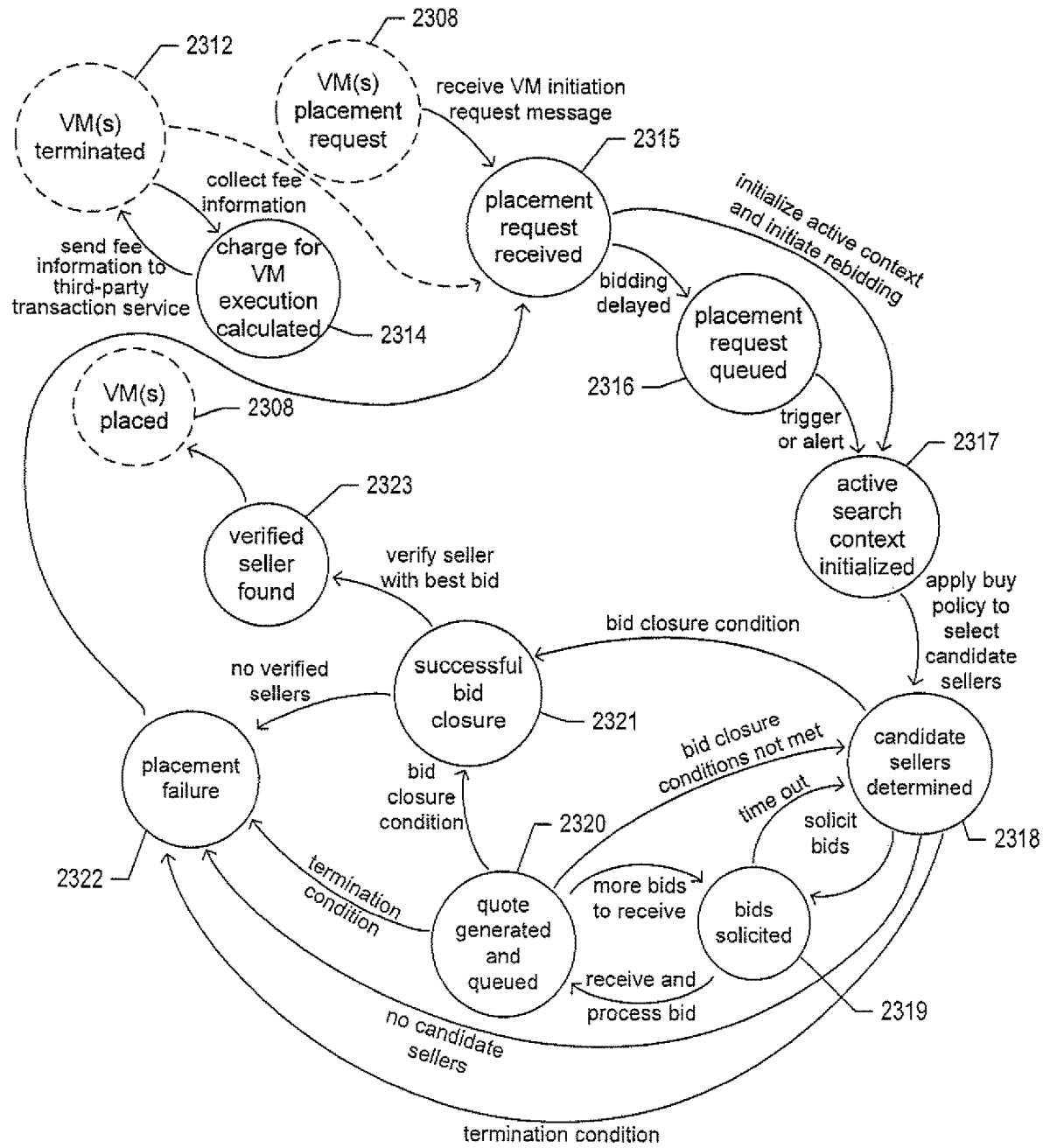
Figure 23C:
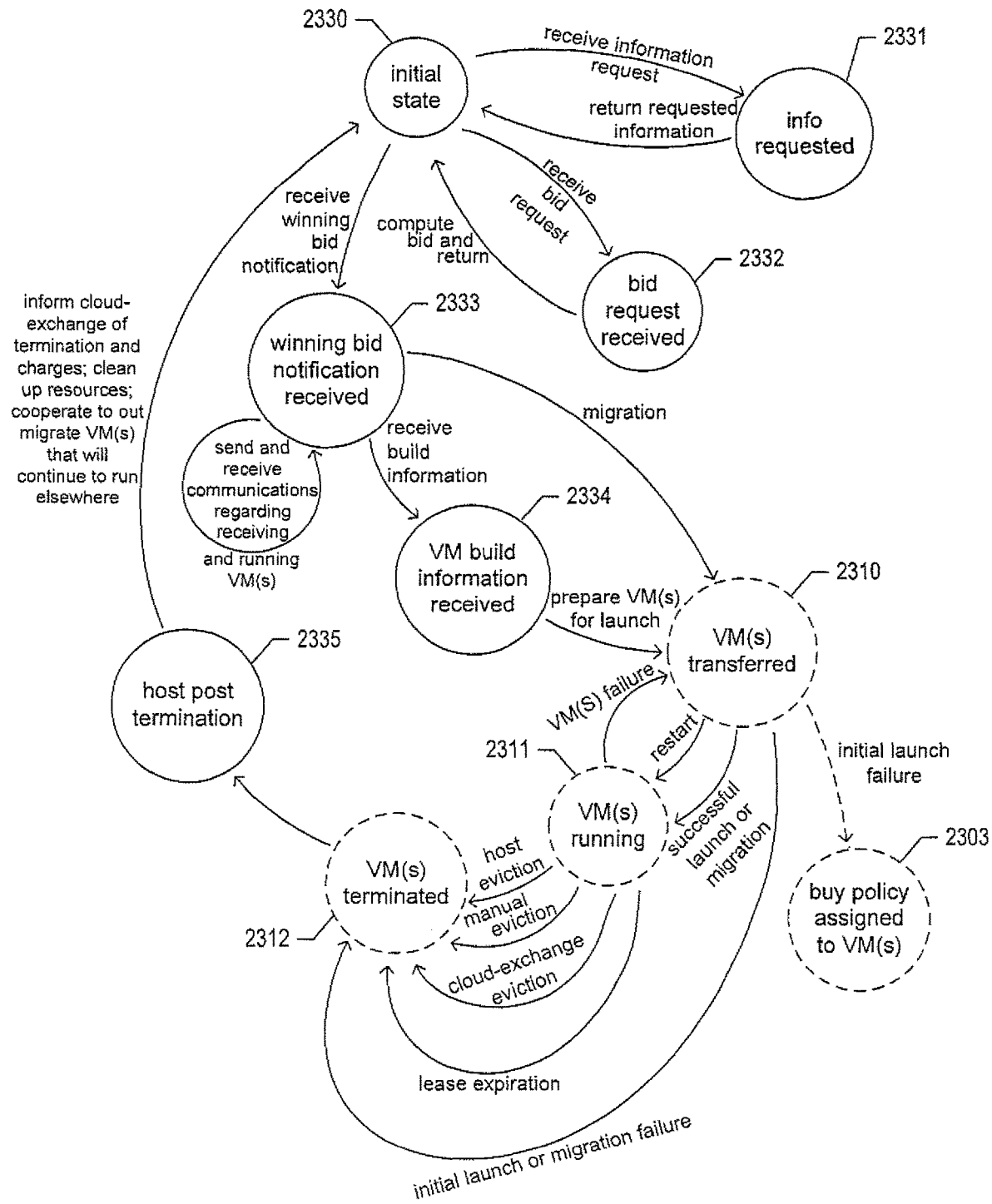

FIGS. 23A-C show the states associated with a resource exchange, and the transitions between the states, that define the VM placement and execution process for the described implementation of the cloud-exchange System and that define the lifecycle of a resource-exchange context and the particular resource exchange represented by the resource-exchange context. In FIGS. 23A-C, states are represented by labeled circles and state transitions are represented by curved arrows. A resource context, as discussed above, includes various types of stored information within the local cloud-exchange instances of resource consumers and resource providers as well as stored information within the cloud-exchange system. For much of the lifecycle of a resource exchange, an active search context stored within the cloud-exchange system is a significant component of the resource-exchange context. During all phases of the life cycle of the resource exchange, the current state of the resource exchange is continuously maintained within the resource-exchange context. The current state defines the remaining sequence of tasks that need to be completed by each of the participants in the resource exchange in order to successfully complete the resource exchange.

FIG. 23A a provides a resource-consumer-centric state-transition diagram for a particular resource exchange. The resource-exchange system is considered to be in an initial state 2302 preceding the resource exchange. In the initial state, many other resource exchanges may be in progress within the resource-exchange system. However, the currently discussed state-transition diagrams are intended to illustrate the lifecycle for a particular resource exchange independently from the many other resource exchanges and other events that may be concurrently and simultaneously occurring within the resource-exchange system. For simplicity of illustration, it is assumed that a particular resource exchange involves one or more virtual machines that execute together within a particular host. It is also possible for the virtual machines of a set of one or more virtual machines to be placed into two or more different hosts. However, in this case, each of the placements can be considered to be a separate resource exchange, with the process for each separate resource exchange generally described by the state-transition diagrams provided in FIGS. 23A-C.

The resource-exchange state transitions from the initial state to a buy-policy-assigned state 2303 as a result of manual assignment, by a system administrator or other employee of the organization managing a resource-consumer computing facility, of a buy-policy to one or more virtual machines. In certain implementations, this is carried out through a local cloud-exchange user interface. In one implementation, the virtual machines may be represented by icons that can be grouped together into folders or aggregations. Buy policies may be similarly represented by icons that can be dragged and dropped onto the folders or aggregations by mouse operations directed to the local user interface. The same user interface also allows a buy policy associated with a set of one or more virtual machines to be unassigned, resulting in transition from the buy-policy-assigned state 2303 back to the initial state 2302. These transitions are represented by curved arrows 2304-2305. In the following discussion, particular transitions between states are not numerically labeled, since the curved arrows representing transitions are annotated.

In the buy-policy-assigned state, a set of one or more virtual machines can be thought of as a potential resource exchange. An activation event promotes such potential resource exchanges to candidate-resource-exchange status, represented by the activated state 2306. Activation events generally fall into two broad categories of manual activation and automated activation. Manual activation involves interaction of a user with the UI provided by the local cloud-exchange instance within the resource-consumer computing facility or with a cloud-based UI containing virtual machine inventory data synchronized with the local cloud-exchange instance. Automated activation can occur due to alerts and triggers, electronic events that arise when certain additional events occur or when specified conditions arise within the resource-exchange system. The local cloud-exchange instance may be configured to generate, according to the buy-policy, alerts and/or triggers at specific points in time or when various different types of conditions obtain. As one example, an alert may be triggered when the available capacity for data storage or task execution within the computing facility falls below threshold levels. There are, of course, many different possible conditions or specifications that lead to automated triggers and alerts which, in turn, lead to activation of a buy-policy-assigned set of one or more virtual machines. Once a set of one or more virtual machines is activated, the local cloud-exchange instance prepares an initiation-request message for transmission to the cloud-exchange system, which is accompanied by a transition of the resource-exchange state to the initiation-request-message-prepared state 2307. The local cloud-exchange instance then sends the initiation-request message to the cloud-exchange system. When the initiation-request message is successfully sent, the state of the resource exchange transitions to the placement-requested state 2308. A failure to transmit the message returns the resource-exchange state to the initiation-request-message-prepared state, in which additional attempts to send the initiation-request message may be undertaken. After a sufficient number of failures, the resource-exchange state transitions back to the buy-policy-assigned state 2303, often with various types of error logging and error reporting to the local user interface. In alternative implementations, repeated send failures may result in a transition of the resource-exchange state back to the activated state 2306.

The next states in FIG. 23A, described below, are again shown in FIG. 23B. The transitions between these states involve process steps carried out primarily by the cloud-exchange system and a resource-provider system selected to host the set of one or more VMs. Nonetheless, the local cloud-exchange instance within the resource-consumer computing facility is aware of these state transitions, in many implementations.

The resource-exchange state transitions from the placement-requested state 2308 to the placed state 2309 once the cloud-exchange system places the one or more virtual machines with a selected host computing facility, or resource provider. Once the set of one or more virtual machines has been placed, a successful transfer of build instructions or a successful migration of the one or more virtual machines from the resource-consumer computing facility to the host results in a transition of the resource-exchange state to the transferred state 2310. However, a failure to transfer the build data or to migrate the set of one or more virtual machines results in a transition of the resource-exchange state to the buy-policy-assigned state 2303, in one implementation. In alternative implementations, transitions to other states are possible when, for example, the cloud-exchange system is able to recover from such transfer failures by placing the one or more virtual machines with another host. From the transferred state 2310, the resource-exchange state transitions to the running state 2311 when the one or more virtual machines are successfully configured and launched within the host system. Of course, during a hot migration, the configuration and launching step is merged with the migration step. Execution failure of the one or more virtual machines returns the resource-exchange state to the transferred state 2310. A successful launch of execution or re-start of execution of the one or more VMs returns the resource-exchange state to the running state 2311. Multiple execution failures may result in a transition from the transferred state to the terminated state 2312. In the running state 2311, the one or more virtual machines continue to execute until expiration of the current lease, the occurrence of a resource-consumer eviction, a host eviction, or a cloud-exchange eviction, or the occurrence of other types of execution-termination events. When the original placement request has not yet been satisfied, the resource-exchange state transitions from the terminated state back to the placement-requested state 2308 from which the cloud-exchange system can again place of the one or more virtual machines with a host for continued execution. When the initial placement request is satisfied, the resource-exchange state transitions back to the buy-policy-assigned state 2303.

FIG. 23B provides a cloud-exchange-system-centric resource-exchange state-transition diagram. This state-transition diagram includes three states already shown in FIG. 23A and discussed above. These three states are shown in with dashed circles rather than solid circles. When execution of the one or more virtual machines terminates, and the resource exchange is therefore currently in the terminated state 2312, the resource-exchange state briefly transitions to the charge-for-VM-execution-calculated state 2314 when the cloud-exchange system collects the information for the terminated execution of the one or more virtual machines and computes a charge for the terminated execution. The resource-exchange state transitions back to the terminated state 2312 once the cloud-exchange system sends the fee information and calculated fee to a third-party transaction service. The third-party transaction service carries out the financial transactions needed for transfer of the calculated fee from the resource consumer to the resource provider. There are many different types and modes for these transaction services. The calculated fees may be automatically withdrawn from deposit accounts, in certain cases, or the third-party transaction service may forward electronic or paper bills to the organization that manages the resource- and consumer computing facility. When an initiation-request message has been received by the cloud-exchange system, and the resource-exchange state is in the placement-requested state 2308, the resource-exchange state transitions to the placement-request-received state 2315. When initiation of an auction is delayed, according to the buy-policy associated with the set of one or more virtual machines or because of bandwidth limitations within the cloud-exchange system, the resource-exchange state transitions to the placement-request-queued state 2316. Otherwise, the resource-exchange state transitions to the active-context-initialized state 2317 when the cloud-exchange system uses the information transferred in the initiation-request message, along with information stored within the cloud-exchange system, to prepare an active search context for the placement request. The occurrence of a trigger or alert results in a transition from the placement-request-queued state 2316 to the active-search-context-initialized state 2317. The resource-exchange state transitions from the active-search-context-initialized state 2317 to the candidate-sellers-determined state 2318 when the cloud-exchange system applies buy-policy filters and other information to select an initial candidate set of resource providers. In certain cases, additional information may be solicited by the cloud-exchange system from resource providers to facilitate selection of the initial candidate resource-providers set. Once an initial set of candidate resource providers has been determined, the resource-exchange state transitions, in one implementation, to the bids-solicited state 2319 following transmission, by the cloud-exchange system, of bid solicitations to each of the initial candidate resource providers. When, after a reasonable period of time, one or more of the candidate resource providers has not responded to the bid solicitation, the resource-exchange state may transition back to the candidate-sellers-determined state 2318 in order for additional bid solicitations to be sent out by the cloud-exchange system to non-responding candidate resource providers. In the bids-solicited state 2319, the cloud-exchange system transitions to the quote-generated-and-queued state 2320 upon receiving and processing each bid before returning to the bids-solicited state 2319 to await further bids, when bids have not been received from all candidate resource providers. When the final bid has been received, and a quote generated and queued for the bid, and when bid-closure conditions have been met, the resource-exchange state transitions to the successful-bid-closure state 2321. When, however, one of various different types of termination conditions have instead arisen, the resource-exchange state transitions to the placement-failure state 2322. Otherwise, the resource-exchange state may transition back to the candidate-sellers-determined state 2318 for an immediate or a delayed subsequent round of bid solicitations. When no final candidate resource providers have been obtained following a maximum number of bid-solicitation attempts, or when one of many different types of termination conditions obtain, the resource-exchange state transitions from the candidate-sellers-determined state 2318 to the placement-failure state 2322. When a bid-closure condition obtains while the resource-exchange state is the candidate-sellers-determined state 2318, the resource-exchange state transitions to the successful-bid-closure state 2321. In a second, often more efficient implementation, the bids are generated by the cloud-exchange engine automatically, on behalf of in which case the bids-solicited state 2319 and the quote-generated-and-queued state 2320 are merged with the candidate-sellers-determined state 2318. In this second implementation, the cloud-exchange engine automatically bids on behalf of the identified candidate sellers and transitions to successful-bid-closure state 2321 or placement-failure state 2322. When the cloud-exchange system is able to successively verify one of the final candidate resource providers, the resource-exchange state transitions to the verified-seller-found state 2323. Otherwise, a transition to the placement-failure state 2322 occurs. From the verified-seller-found state 2323, the resource-exchange state transitions to the previously described placed state 2309. The resource-exchange state transitions from the placement-failure state 2322 to the previously described placement-request-received state 2315.

Of course, in each particular implementation of the resource-exchange system, there may be many additional states and state transitions. The currently described state-transition diagrams are intended to show those states and state transitions that are common to the reasonably large fraction of the various possible implementations of the resource-exchange system.

FIG. 23C provides a resource-provider-centric resource-exchange state-transition diagram. The resource provider is shown to inhabit an initial state 2330. When the resource provider receives an information request, the resource-exchange state transitions to the information-requested state 2331 and then returns back to the initial state when the requested information is returned to the cloud-exchange system. Similarly, when the resource provider system receives a bid request, the resource-exchange state transitions briefly to the bid-request-received state 2332 before returning to the initial state following a transmission of a computed bid request back to the cloud-exchange system. When the resource-provider system receives a winning-bid notification from the cloud-exchange System, the resource-exchange state transitions to the winning-bid-notification-received state 2333. In the winning-bid-notification-received state, the resource-provider computing facility exchanges communications with the cloud-exchange system and the local cloud-exchange instance within the resource consumer to coordinate the transfer of virtual-machine build information or migration of virtual machines to the resource provider. When the virtual machine is built by the resource provider, the resource-exchange state transitions to the build-information-received state 2334 and then to the previously described transferred state 2310 once the one or more virtual machines have been prepared for launch. The resource-exchange state transitions from the winning-bid-notification-received state 2333 to the transferred state 2310 directly when the one or more virtual machines are migrated to the resource provider. States 2310-2312 and 2303 are again shown in FIG. 23C, for completeness, but are not again described. Following termination of the execution of the one or more virtual machines, the resource-exchange state transitions to the host-post-termination state 2335. In the host-post-termination state, the resource provider exchanges communications with the cloud-exchange system to inform the cloud-exchange system of the execution termination and of the accrued fees for hosting the one or more virtual machines, cooperates with other entities to migrate the one or more virtual machines to another computing facility, in the case that the one or more virtual machines will continue to execute following lease termination or eviction, and cleans up local resources allocated for executing the one or more virtual machines within the resource-provider computing facility. The transition to the host-post-termination state may be initiated by a cloud-exchange lease-expiration scheduler which continuously monitors active resource exchanges to detect lease terminations.

Note that the resource-exchange state is generally a combination of two or more of the states, discussed above with reference to FIGS. 23A-C, each inhabited by one or more of the resource consumer, the cloud-exchange system, and one or more resource providers. For example, the resource-exchange state may temporarily be a combination of the host-post-termination state 2335, the placement-request-receive state 2315, and the buy-policy-assigned state 2303. Note also that certain of the operations performed to affect state transitions may vary, depending on the history of state transitions for a particular resource exchange. As one example, an active search context needs only to be allocated the first time a resource exchange transitions from the placement-request-receive state 2315 to the active-search-context-initialize state 2317.

Automatic Resource-Price Calibration and Resource-Price Recalibration

Figure 24A:
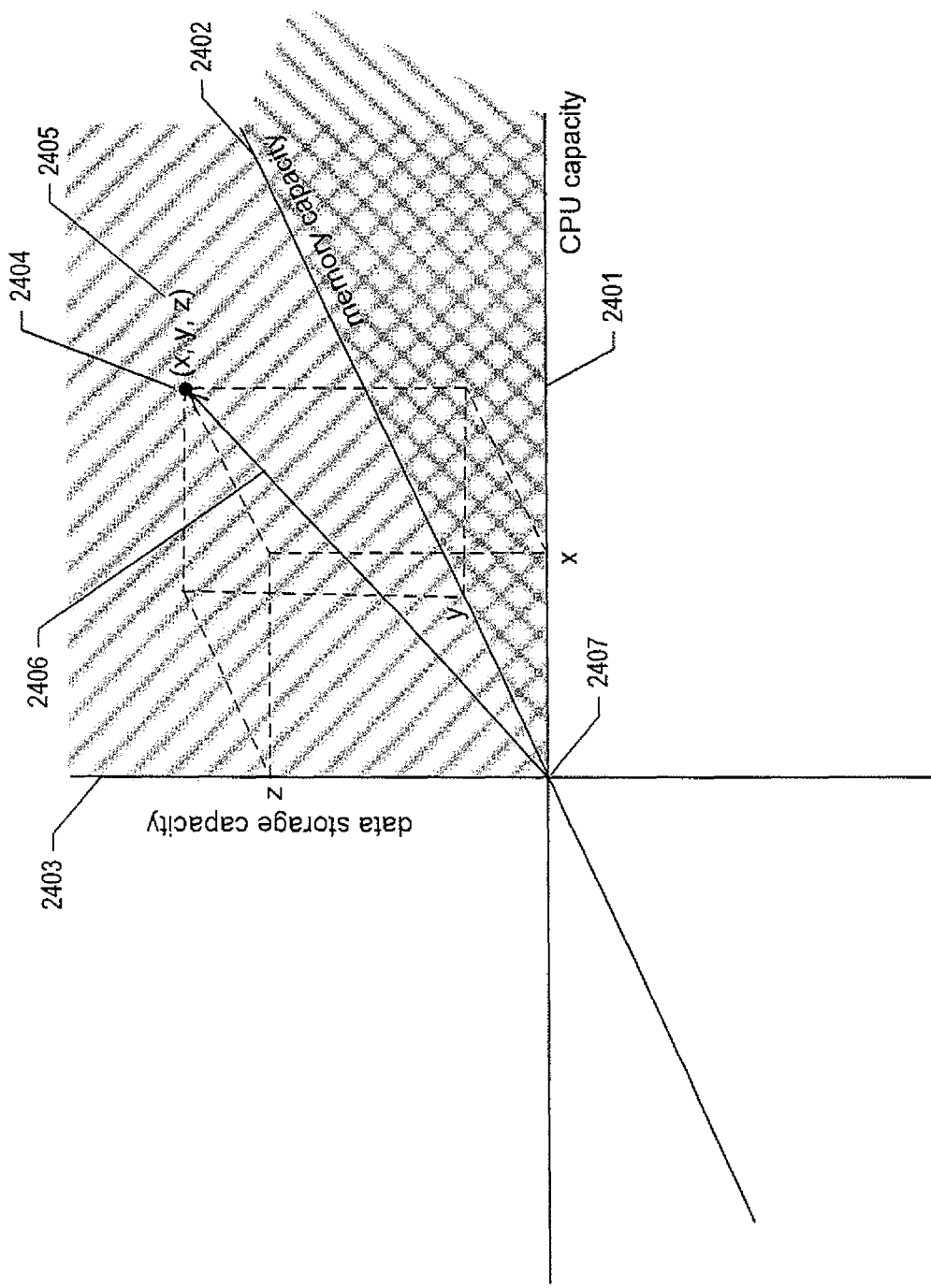
FIGS. 24A-E illustrate a pricing-calibration problem domain addressed by the currently disclosed methods and systems.

FIGS. 24A-E illustrate a pricing-calibration problem domain addressed by the currently disclosed methods and systems. FIG. 24A shows a three-dimensional plot that represents three resources allocated by a resource-provider computing facility to a cloud-exchange system for hosting virtual machines on behalf of resource-consumer computing facilities. The three-dimensional plot includes three resource axes: (1) a CPU-capacity axis 2401, a memory-capacity axis 2402, and a data-storage-capacity axis 2403. These three axes correspond to the traditional x, y, and z axes of a three-dimensional Cartesian coordinate system. The amounts of the three resources allocated by the resource-provider computing facility to the cloud-exchange system, below referred to as "allocated resource capacities," is represented by a point 2404 in the resource-capacity space with coordinates (x, y, z) 2105. The allocated resource capacities are alternatively represented by the vector 2406 from the origin 2407 to point 2404. The allocated resource capacities include x units of CPU, y units of memory, and z units of data storage.

Figure 24B:
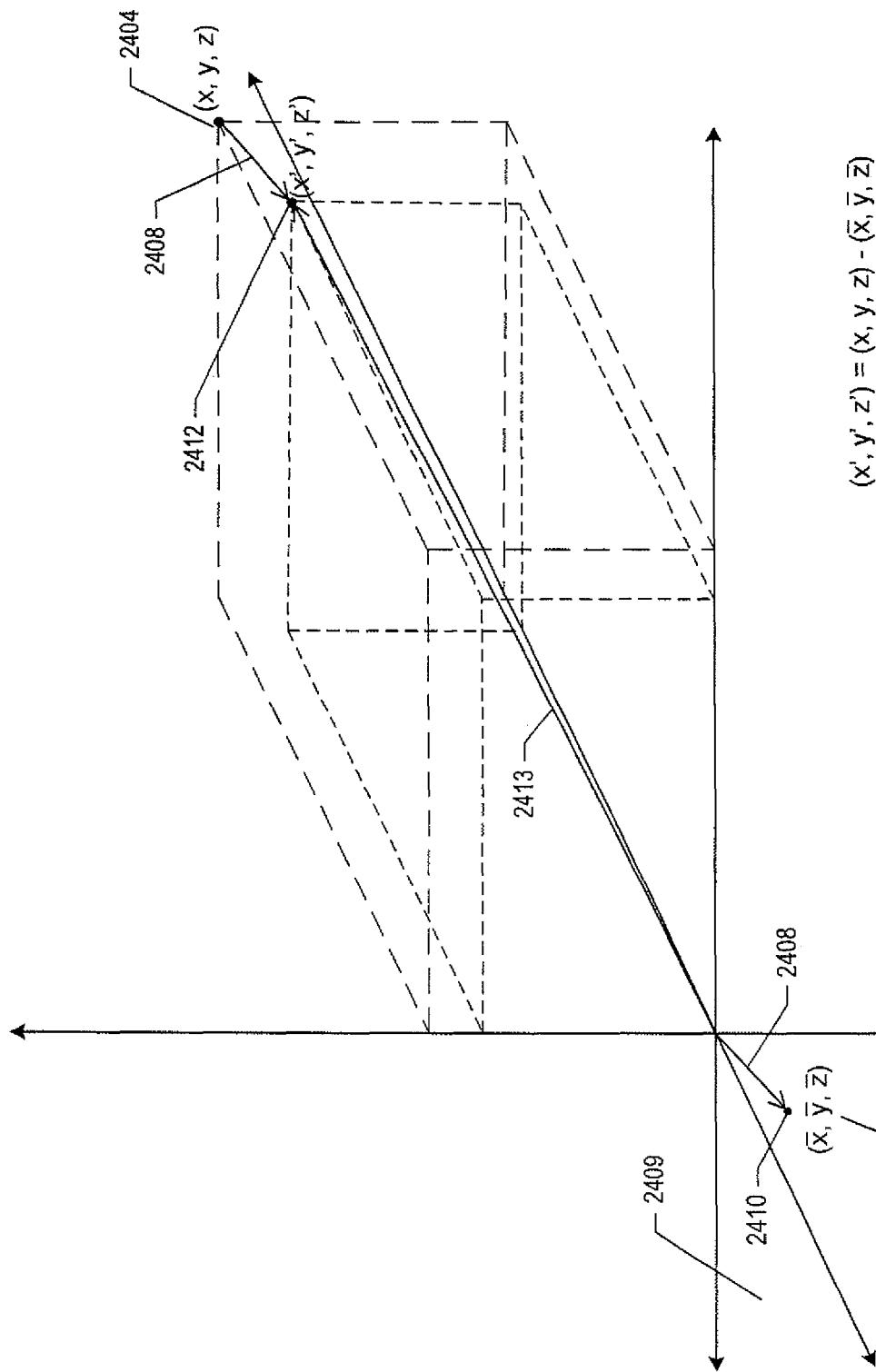

FIG. 24B shows, with reference to the three-dimensional plot introduced in FIG. 24A, consumption of resources resulting from hosting, by the resource-provider computing facility, a virtual machine or a set of virtual machines on behalf of a resource-consumer computing system. In FIG. 24B, the amounts of the three resources consumed by one or a set of virtual machines hosted by the resource-provider computer system is represented by the small vector 2408. Note that this vector is contained within the octant of the three-dimensional resource-consumption space 2409 in which all of the coordinates of points have negative values. Thus, the point 2410, which alternatively represents the consumption of resources represented by vector 2408, has coordinates $(\bar{x},\bar{y},\bar{z})$ 2411, where the bars over the symbols represent negatively valued coordinates. The point 2404 representing the initial resource-capacity allocations 2404 is again plotted in FIG. 24B. Placing the tail of vector 2408 on this point locates a new point 2412 with coordinates (x', y', z') that represents the remaining three resource capacities following hosting of the one or more virtual machines on behalf of the resource-consumer computing system. The point 2412 can also be considered to be a new vector 2413 that represents the remaining resource capacities. This new vector is the vector sum of vector 2406 shown in FIG. 24A and vector 2408.

Figure 24C:
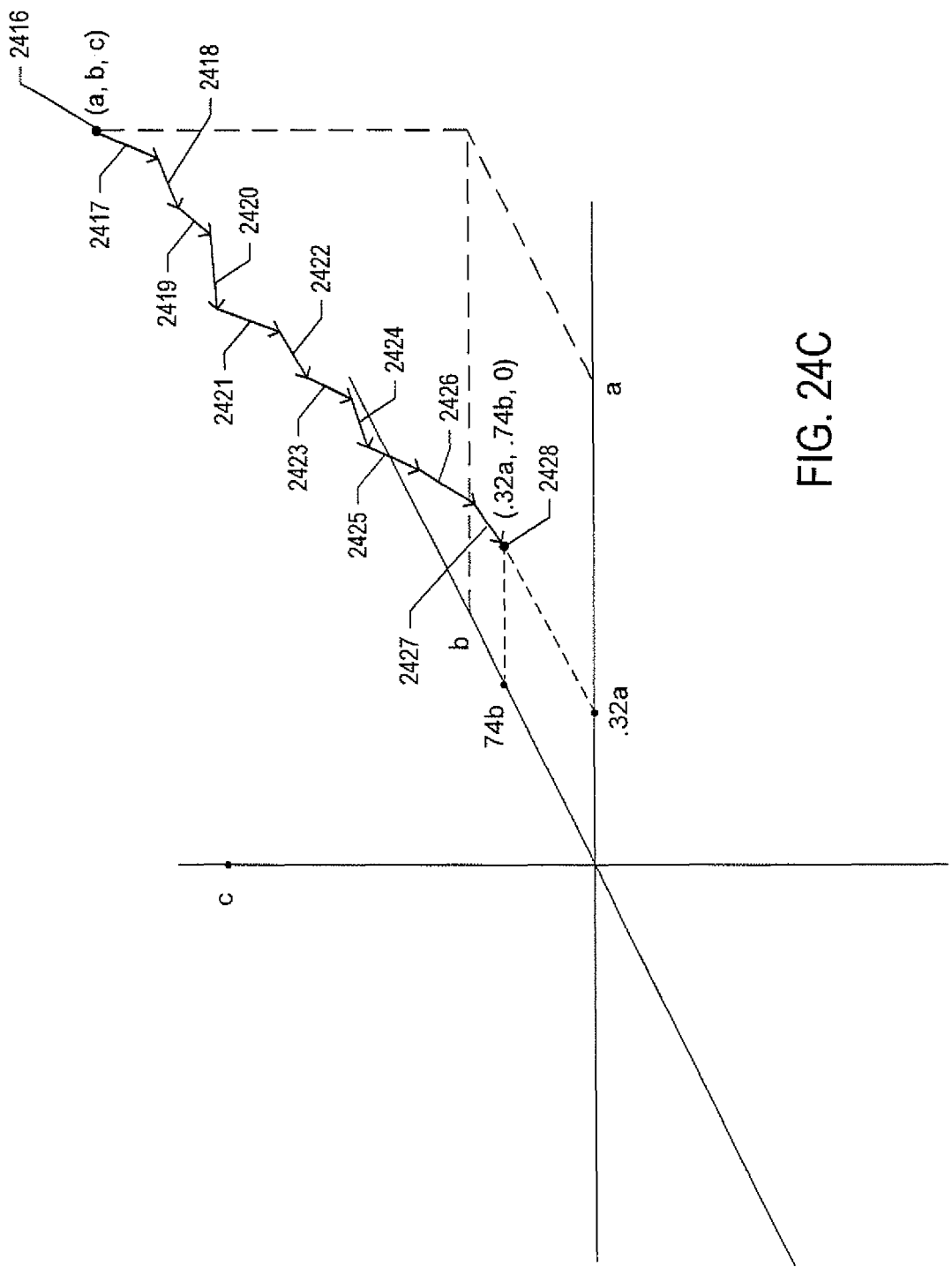

FIG. 24C illustrates a series of resource-capacity allocations from the resource pool of the resource provider as the resource provider executes a corresponding series of hosting transactions. In this figure, resources are more abstractly represented by the symbols a, b, and c, as they are in subsequent figures. The initial resource capacity for resources a, b, and c is represented by point 2416. The decrease in the resource capacities of the resource pool with each hosting transaction is represented by a small vector, such as small vector 2417. With each hosting transaction, the remaining resource capacities for the three resources a, b, and c continue to decrease down a chain of small vectors 2417-2427. At point 2428, the third coordinate has the value 0, indicating that there is no more resource-c capacity remaining in the pool of resources allocated for the cloud-exchange system by the resource-provider computing system. However, 32% of the initial allocation of resource a and 74% of the initial allocation of resource b remain in the resource pool. Because hosting of a virtual machine or set of virtual machines generally requires some amount of each of the resources, prices of which are factored into hosting fees and buyer and seller policies, when one of the resources is depleted, as at point 2428, no further hosting transactions can be carried out by the resource exchange system on behalf of the resource provider. Thus, point 2428 represents a non-optimal terminal condition for hosting VMs by resource-provider computer system. The unused resource capacities represent lost hosting fees and idle resources. The chain of hosting-transaction resource consumptions 2417-2427 represents a non-optimal set of hosting transactions, since significant capacities of resources a and b remain in the resource pool allocated to the cloud-exchange system, but they are unusable, and will remain so until resource c again becomes available. It is this problem of unused and unusable resource allocations to the resource pool that is addressed by the currently disclosed methods and systems.

Figure 24D:
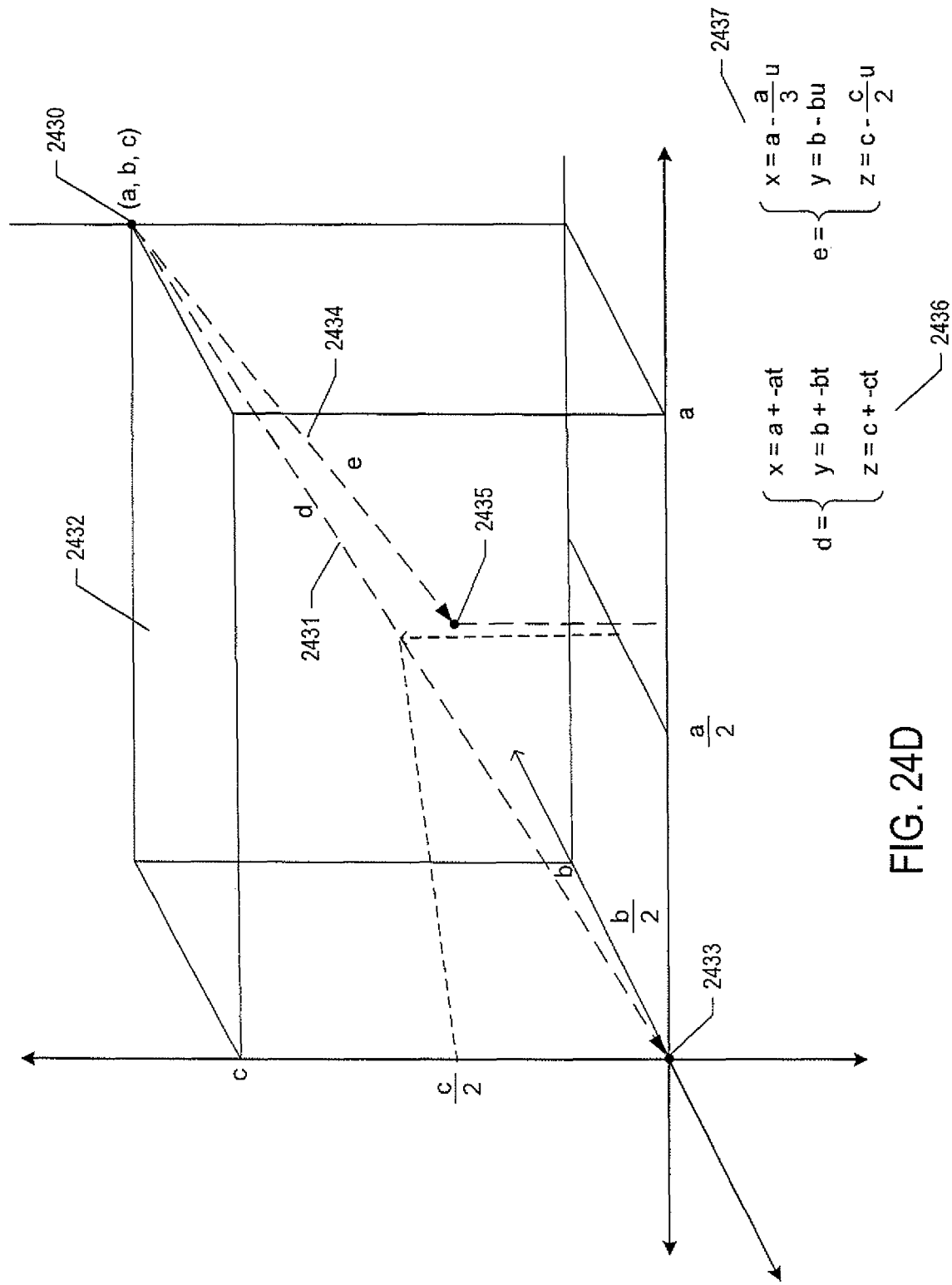

FIG. 24D illustrates a rationale for optimal hosting transactions that proportionally consume resources from a resource pool allocated to the cloud-exchange system by a resource-provider computer system. Point 2430 represents the initial allocations of resources a, b, and c to the cloud-exchange system. The optimal path of resource consumption resulting from an optimal sequence of hosting transactions would follow a path in resource-consumption space represented by the body diagonal d 2431 of the rectangular volume 2432 with proximal, lower-left corner at the origin 2433 and with distal, upper-right corner at the initial resource allocation point 2430. Any path of resource-consumption vectors that ends up at the origin 2433 would be optimal. However, in order to achieve an optimal path, at each point representing the current remaining resource capacities within the resource pool, resource consumption along the vector from that point to the origin is desirable to avoid a path such as that shown in FIG. 24C, A problem with automated hosting transactions is that the average number of resource units for each resource requested in a hosting request have different proportions to one another than the number of resource units allocated by a resource-provider computing facility to the resource pool that is provided to the cloud-exchange system to support hosting of external virtual machines by the resource provider. In other words, the proportions of the resources in the resource pool do not necessarily reflect the proportionate demand for resources in hosting requests. As shown in FIG. 24D, a set of hosting requests that request average amounts of resources generally tend to follow a path e 2434 having a different direction from the optimal path d 2431. As a result, instead of reaching the origin 2433, these paths end at points, such as point 2435, that lie on one of the bc, ab, and ac planes. A point on any of these three planes represents exhaustion of one resource while there is remaining capacity in the pool for the other two resources. Expressions 2436 and 2437 provide parametric representations of line d and line e that include the optimal and non-optimal resource paths d and e.

Figure 24E:
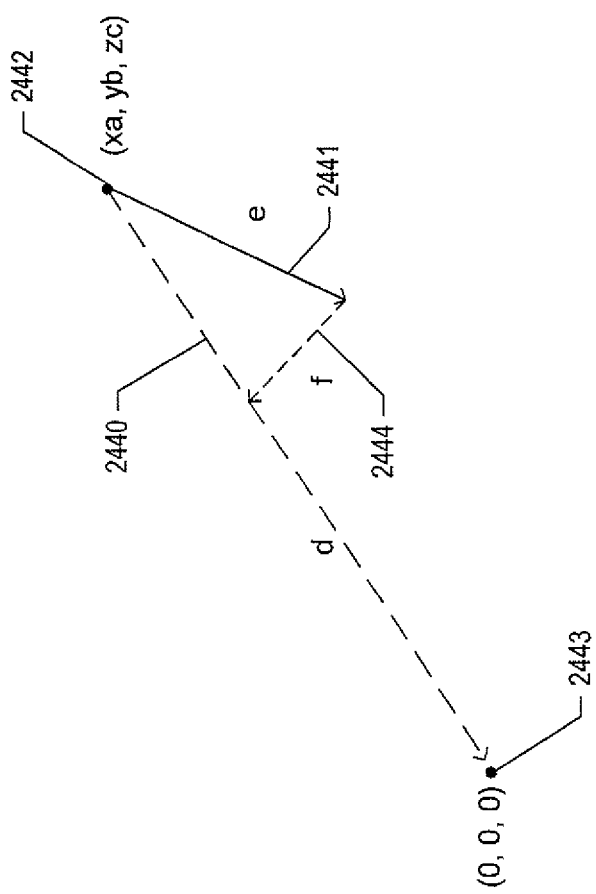

FIG. 24E illustrates an approach taken by many of the currently disclosed methods and systems to force hosting requests and resource consumption resulting from successful hosting transaction towards a desired, optimal path ending at the origin. In FIG. 24E, a line segment d 2440 and a line segment e 2441 are shown emanating from point 2442, which represents the remaining resource capacities for resources in the resource pool. The direction of line segment d is fixed by the two endpoints that include point 2442 and the origin 2443 and the direction of line segment e 2441 is the same as the direction of line segment e 2434 discussed above with reference to FIG. 24D. For optimal resource consumption, it would be desirable for a resource-consumption vector to lie along line segment d, but the expected hosting transaction would consume resources that would lead to a resource-consumption vector lying in the direction of line segment e. Therefore, the cloud-exchange system needs to apply a force f, represented by vector 2444, to the resource-consuming computing systems and the cloud-exchange system to force the resource-consumption behavior of hosting transactions towards a direction that would place the resource-consumption vector parallel to line segment d.

There are a variety of different ways that the cloud-exchange system might attempt to generate a force f, discussed above with reference to FIG. 24E. In one approach, the cloud-exchange system would filter candidate resource-provider computer systems during resource-provider selection for a hosting request in order that the remaining resource capacities of the selected candidate resource-provider computer systems roughly proportionally correspond to the amounts of resources requested in the hosting request. However, this approach would likely greatly reduce the number of candidate resource providers for each hosting request and would lead to exceedingly non-optimal hosting sequences with respect to other criteria, such as maximizing hosting fees and matching resource providers with resource consumers based on the many different possible criteria used to compute distributed-search scores. The current methods and systems employ a different strategy. These methods and systems attempt to modify pricing of resources by the resource-provider computing system in order to attract hosting requests with requested resource proportions that mirror the remaining resource capacities of the resources in the resource-providers resource pool. By discounting prices of resources in the greater supply then expected to be consumed and increasing the prices of resources that would be expected to be prematurely exhausted, the cloud-exchange system can steer hosting requests towards a desired resource-consumption trajectory leading towards concurrent exhaustion of all resources and therefore to full use of the resources allocated by the resource-provider computer system to the resource pool.

Figure 25A:
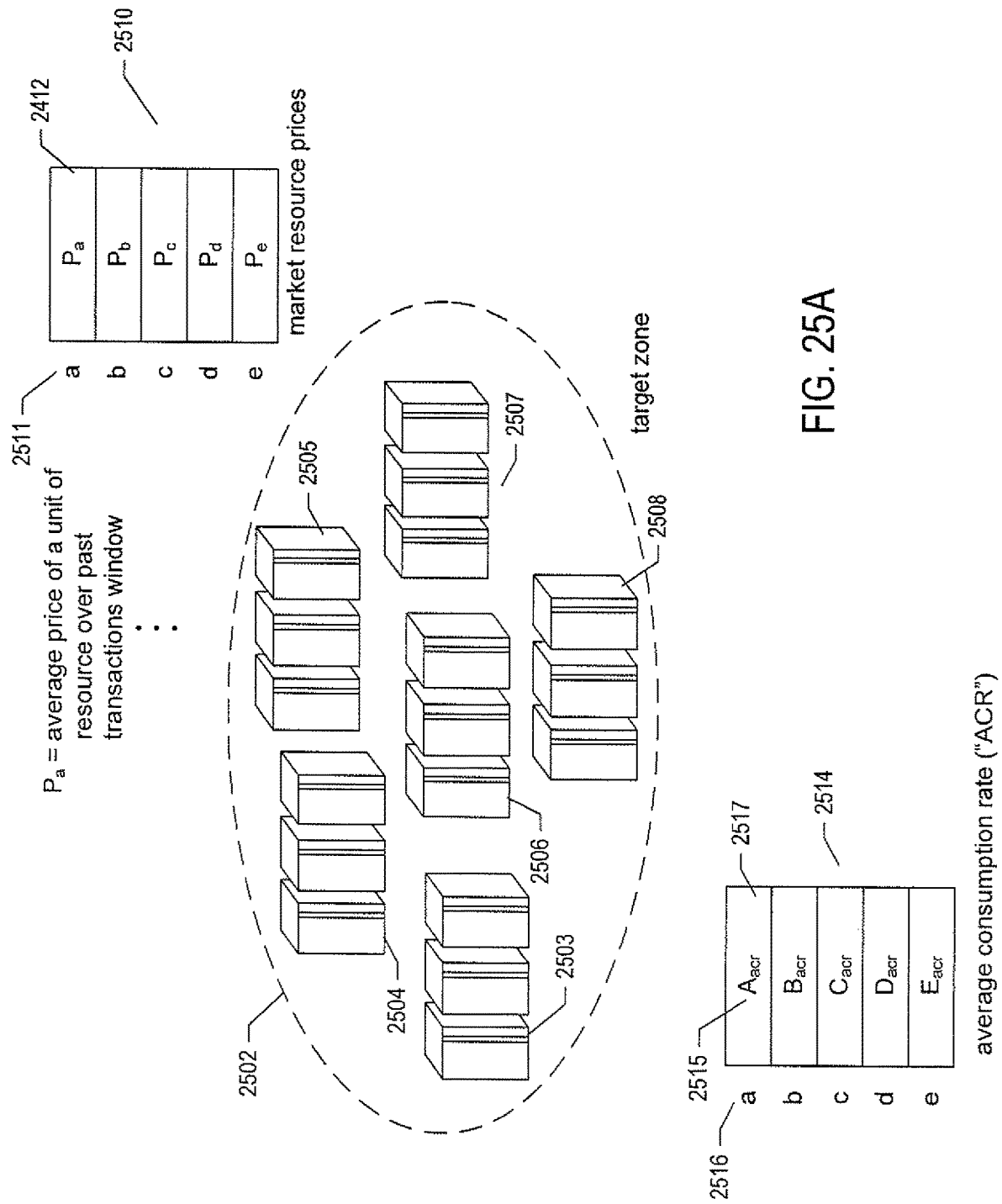

FIGS. 25A-E illustrate an automated-initial-pricing strategy for resource-provider resources that attempts to force hosting requests towards requested-resource proportions that mirror the proportions of resource capacities in the resource pool provided by the resource provider to the cloud-exchange system. Automated initial pricing of resources by the cloud-exchange system uses various types of information collected by the cloud-exchange system. FIG. 25A illustrates a portion of this information related to a target zone that includes a resource provider for which initial resource pricing is to be undertaken by the cloud-exchange system. In the middle of FIG. 25A, a dashed ellipse 2502 enclosing a number of cloud-exchange-participant computing facilities 2503-2508 represents a target zone for a particular resource-provider computing facility. A target zone may be defined in many different ways. For example, a target zone may be defined by a geographical area that includes the resource-provider computing facility. Alternatively, a target zone may be defined as the resource-provider computing facilities having a network latency with respect to a particular computer system less than or equal to a maximum desired network latency. Many different criteria may be used to define a target zone in different implementations and in accordance with different types of resource-provider-computing-facility pricing parameters.

Once a target zone is defined, the cloud-exchange system can determine a great deal of information with respect to resource pricing and resource consumption within the target zone. For example, the cloud-exchange system can use various stored information collected over the course of carrying out hosting transactions on behalf of resource providers and resource consumers to compute an average market price per unit for each of the resources factored into hosting prices. In FIG. 25A, and in subsequent figures, values related to resources are shown in tables, such as table 2510 in FIG. 25A. The five different types of resources factored into hosting prices, in certain implementations, are represented by the lower-case letters a, b, c, d, and e. These symbolic representations of resources serve as indexes or labels for table entries. For example, in the market-resourceprices table 2510, the average market price for a unit of resource a 2511 is $P_a$ 2512. The cloud-exchange system computes the average price-per-unit of a resource based on the pricing of resources used in a window of a fixed number of the most recent hosting transactions carried out by the cloud-exchange system on behalf of resource-provider computing systems within the target zone. Alternatively, the average may be taken over the hosting transactions within the target zone over a most recent time window. The average-consumption-rate ("ACR") table 2514 includes indications of the average consumption rate for each of the resources a, b, c, d, and e. For example, the average consumption rate $A_{acr}$ 2515 for resource a 2516 is stored in the first entry 2517 in the ACR table. The average consumption rate for resources is determined by the cloud-exchange system based on the stored information about resource consumption within the trading zone during the most recent time window. In the currently described implementation, the average consumption rate for a resource is determined as the average number of units of a particular resource consumed by hosted virtual machines within resource-provider computing facilities of the trading zone per day. A portion of this information is made available to the cloud-exchange system through management servers associated with the cloud-exchange-participant computing facilities within the trading zone, and other portions of this information is provided by cloud-exchange agents that probe resource consumption on participant computing facilities. In certain cases, portions of the resource-consumption data are generated by analysis and inference by analysis subsystems within the cloud-exchange system.

Figure 25B:
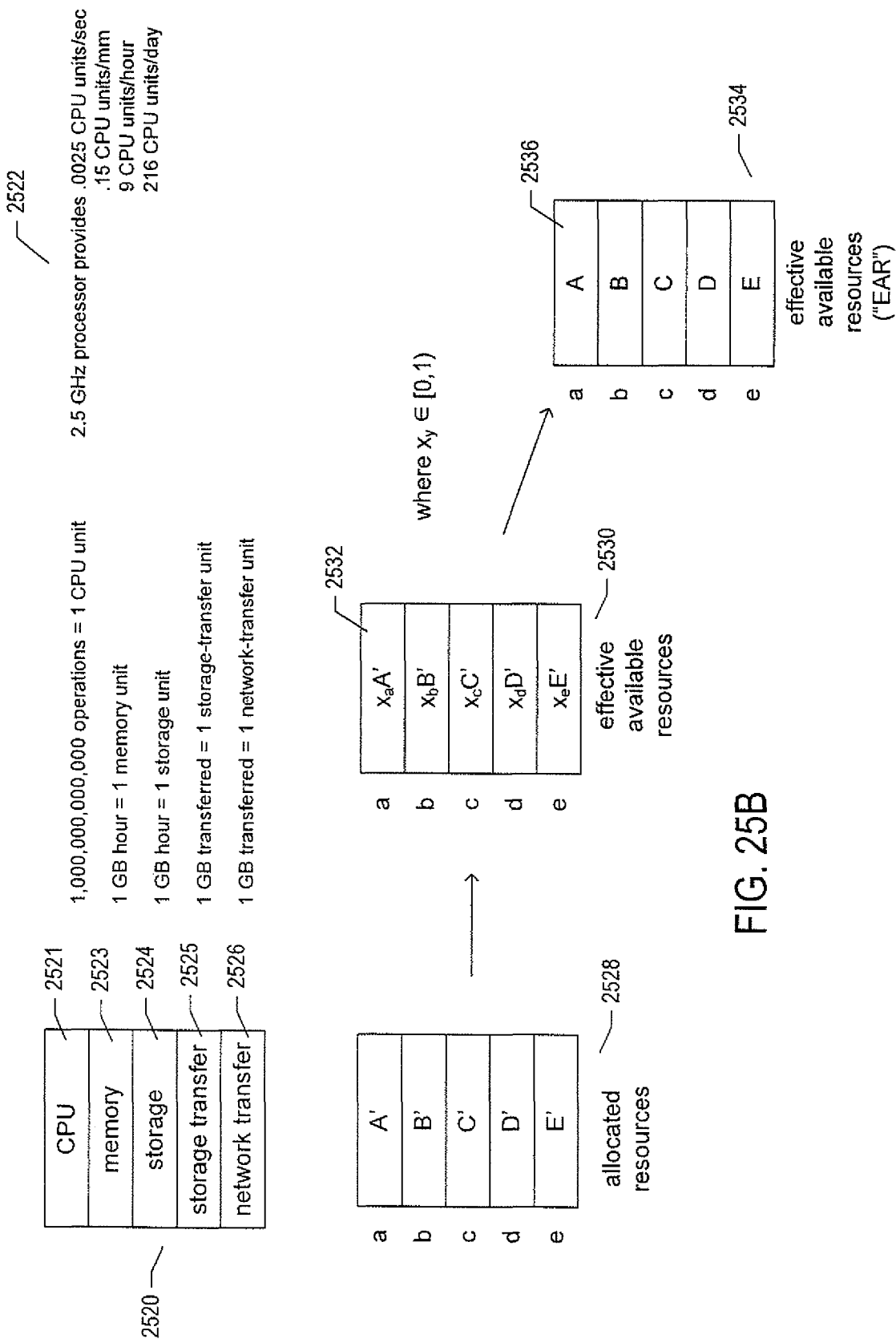

FIG. 25B illustrates data compiled by the cloud-exchange system for the resource-provider computer facility for which resource pricing is to be computed. At the top of FIG. 25B, a table-like feature 2520 indicates the resources used in a described implementation of the cloud-exchange system for VM-hosting pricing. These correspond to resources a, b, c, d, and e used in this and subsequent figures. Resource a is CPU 2521, expressed in units of 1,000,000,000,000 operations. As shown 2522 to the right in FIG. 25B, a 2.5 GHz processor provides 216 CPU units per day. Resource b is memory 2523 in units of 1 GB of memory used for an hour. Resource c is data storage 2524, in units of 1 GB of data stored for an hour. Resource d is storage transfer 2525, and is expressed in units of 1 GB of data transferred to, or retrieved from, mass-storage devices. Resource e is network transfer 2526, expressed in units of 1 GB of data transferred to, or received from, the network. The allocated-resources table 2528 includes the number of units per day of each resource allocated by the resource provider to a resource pool provided to the cloud-exchange system. However, the effective available resources shown in the effective-available-resources table 2530 are typically fractions or non-integer multiples of the resource units per day allocated to the resource pool. For various reasons, it is desirable to allocate, from the resource pool, only up to some threshold fraction of the allocated resources, to allow for hosted VMS to temporarily exceed the resource allocations. In addition, for certain types of resources, the actual effective amount of the resource with respect to hosted VM's may be greater than the amount of resource allocated to the resource pool by the resource provider. Thus, combining various thresholds and other considerations, each type of resource is associated with a particular multiplier value that, when used to multiply the allocated resources, produces an effective-available-resource value in units of the resource per day. For example, the number of units per day of resource a allocated to the resource pool may be A', and multiplying this value by $x_a$ 2532 produces the effective available amount of resource a in units per day. In the following discussion, it is assumed that these calculations are performed to produce an effective-available-resources ("EAR") table 2534 in which the effective available amount of each resource in units per day is represented by a single-upper-case letter, such as the letter A 2536 representing the amount of resource a available for hosting a VMs.

Figure 25C:
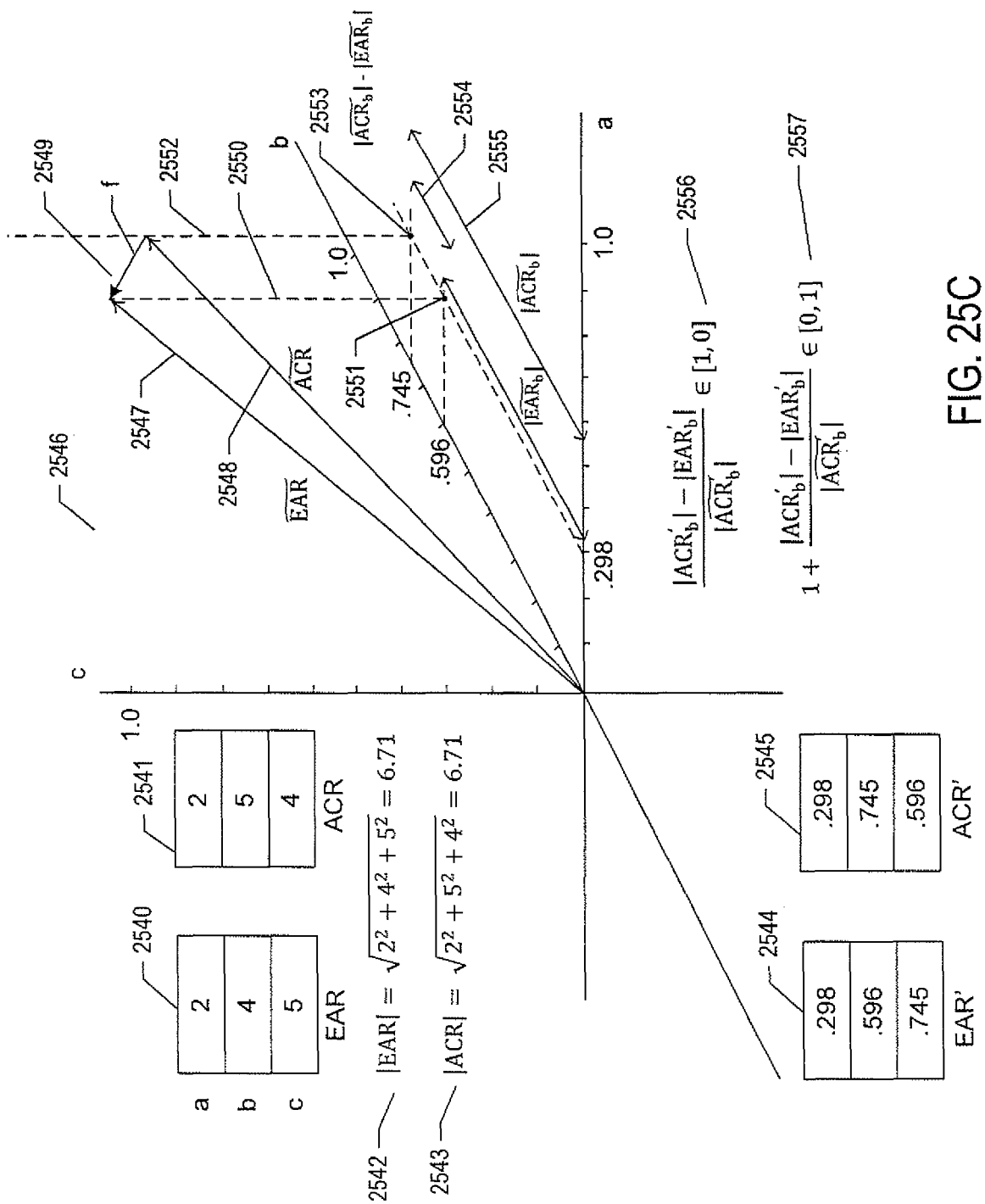

FIG. 25C illustrates how adjustments to market rates for resources are made in order to establish initial resource pricing for a resource provider that will tend to attract hosting requests that request amount of resources in proportions that mirror the proportionate remaining capacities of the resources within the resource pool of the resource provider. In the example shown in FIG. 25C, only three resources a, b, and c are considered so that the computation can be illustrated as a vector calculation. An example EAR table 2540 and an example ACR table 2541 are shown in the upper left-hand portion of FIG. 25C. The entries in these tables can be alternatively considered to be the components of three-dimensional vectors. In a first step, the length of the two vectors corresponding to the EAR and ACR tables, referred to as the EAR and ACR vectors, are computed 2542 and 2543. Then, the EAR and ACR vectors are normalized to produce vectors EAR' 2544 and ACR' 2545 by dividing the value for each component of the unnormalized vector by the length of the unnomialized vector. Normalized vectors have a length, or magnitude, of 1. In the three-dimensional plot 2546 shown in FIG. 25C, the EAR vector 2547 and the ACR vector 2548 are plotted. As discussed above, it is desirable to compute a force vector f 2549 that would tend to force the ACR vector towards the EAR vector. In fact, vector addition of the ACR and f vectors produces the EAR vector. The components of the vector f 2549 can be straightforwardly computed by subtracting the ACR vector from the EAR vector. However, for initial resource pricing, price reductions and price increases of resources with respect to market prices are used to generate a force in the direction of the vector f. Computing the price reductions and price increases can be carried out, as shown in FIG. 25C for resource b, for each resource, in turn. In the plot 2546 shown in FIG. 25C, a first dashed line 2550 is dropped from the head of the EAR vector 2547 down to the ab plane in a direction perpendicular to the ab plane. The a and b coordinates for the point 2551 at the intersection of this dashed perpendicular line 2550 and the ab plane has the same a and b coordinates (0.298, 0.596) as the EAR vector 2547. A second perpendicular line 2552 that passes through the head of the ACR vector 2548 intersects the ab plane at point 2553 with the same a and b coordinates (0.298, 0.745) as the ACR vector. Clearly, in order to generate a price-induced force in the direction of force vector f 2549, the price of resource b needs to increase. The difference between the b coordinates of the ACR and EAR vectors, represented by line segment 2554, divided by the b coordinate of the ACR vector 2555, represents a proportional increase in price for the resource b needed to steer hosting requests towards the direction of the EAR vector. Thus, the proportional increase in price is represented by the first ratio 2556 shown in FIG. 25C and the price that should be used as the initial price for resource b is computed as 1 plus this ratio, as shown in the expression 2557. Similar price reductions or price increases can be computed separately for each of the other resources.

Figure 25D:
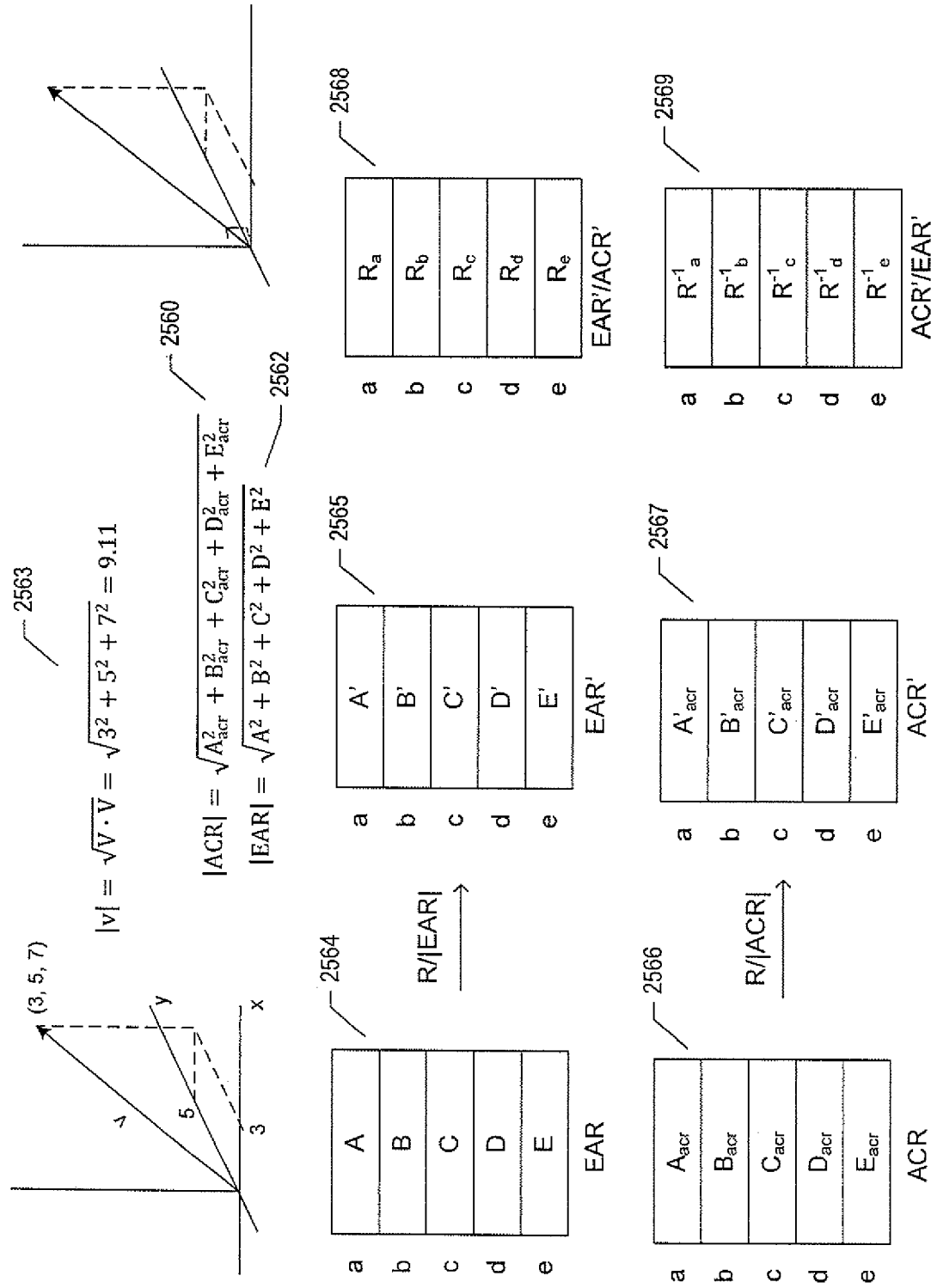

FIGS. 25D-E illustrate computation of the resource pricing based on the above-discussed information stored in the market-resource-prices table (2510 in FIG. 25A), the ACR table (2514 in FIG. 25A), and the EAR table (2534 in FIG. 25B). First, the magnitudes of the ACR and EAR vectors are computed 2560 and 2562. This calculation is essentially computing the length of the vectors via the dot product 2563. Then, the components of the EAR vector 2564 are divided by the length of the EAR vector to produce a normalized EAR' vector 2565 and the components of the ACR vector 2566 are divided by the length of the ACR vector to produce a normalized ACR' vector 2567. A vector of ratios 2568 is computed by dividing each component of the normalized EAR' vector by the corresponding component of the normalized ACR' vector and a table of inverse ratios 2569 is prepared by inverting the ratios in the table of ratios 2568. Of course, in an actual implementation, rather than preparing tables of components, needed components can be computed on an as-needed basis.

Using the information in the tables shown in FIG. 25D, the price adjustments for resource-provider resources with respect to the market prices can be computed. The price adjustment for resource x 2570, where x is one of the resources a, b, c, d, or e, is computed by the three-part expression 2571. When the EAR'/ACR' ratio $R_x$ is less than 1, the price adjustment, Price_Adjustment$_x$, is $1+(1-R_x)$ (maxIncrease). The maxIncrease term represents the maximum increase in price above market price that is permitted for an initial resource pricing. It should be noted that only relatively minor price adjustments need to be made, since hosting requests are channeled to the resource provider by the distributed search engine as a result of distributed searches, with candidate resource providers selected generally either by hosting price alone or by a set of criteria that include hosting price as a significant component. Similarly, when the EAR'/ACR' ratio is greater than 1, the price adjustment, Price_Adjustment$_x$, is $1-(1-R_x^{-1})$ (maxDecrease). The term maxDecrease represents the maximum decrease in price that is allowed for initial resource pricing. When the EAR'/ACR' ratio is equal to 1, the price adjustment, Price_Adjustment$_x$, is set to 1. Then, as shown in expression 2572, the price for resource x, Price$_x$, is computed as the price adjustment for resource x, Price_Adjustment$_x$, times the market price for resource x, $P_x$. As shown in expression 2573, the adjusted or initial price for a resource x, computed by the process described above, falls within a range bounded by $(1-\text{maxDecrease})P_x$ and $(1+\text{maxIncrease})P_x$.

Figure 26B:
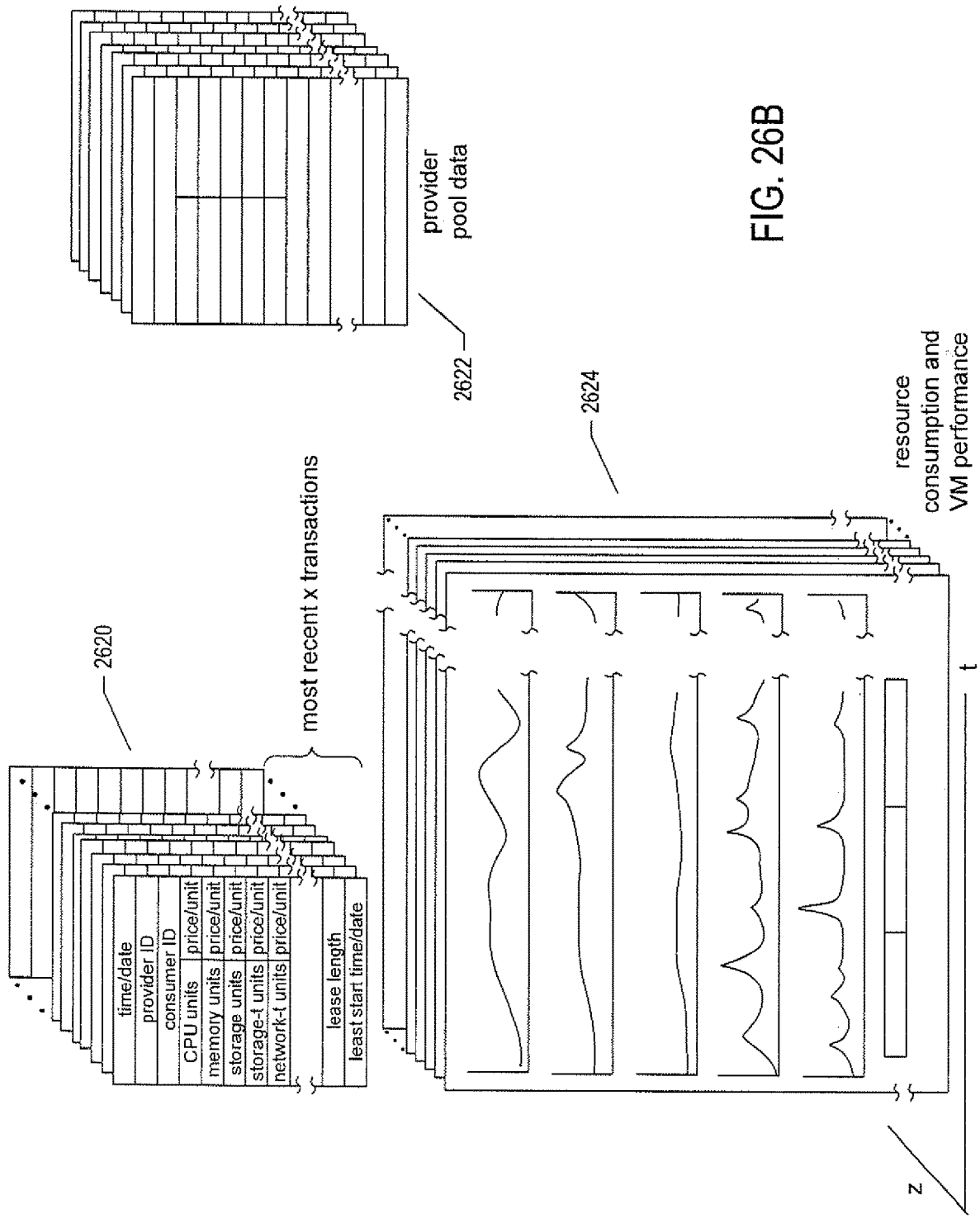

FIGS. 26A-B illustrate the type of data acquired and maintained by the cloud-exchange system for a variety of purposes, including for calibrating and recalibrating resource prices automatically on behalf of resource providers. As shown in FIG. 26A, the cloud-exchange system 2602 exchanges messages and information with cloud-exchange agents, such as cloud-exchange agent 2604, and computing-facility management servers, such as the management server 2606, within participant computing facilities, such as participant computing facility 2608. Cloud-exchange agents may include a variety of different types of information acquiring processes, including agents that monitor resource consumption by hosted virtual machine within resource-provider participants of the cloud-exchange, agents that locally manage hosting requests and processing of hosting transactions, and other types of cloud-exchange agents. The cloud-exchange system stores the information in a cloud-exchange database. FIG. 26B shows some of the types of information that may be acquired and stored with in the cloud-exchange system. In certain implementations, the cloud-exchange system stores information about each hosting transaction 2620, detailed information about the resource pools provided to the cloud-exchange system by participant resource-provider computer systems 2622, and information that characterizes resource consumption by virtual machines and virtual-machine performance and operational characteristics 2624. As discussed above, the information used for automated resource pricing calibration and recalibration on behalf of resource-provider participants in the cloud exchange, including the information stored in the market-resource-prices table, the ACR table, the EAR table, is obtained from this large quantity of information acquired and maintained by the cloud-exchange system.

Figure 27A:
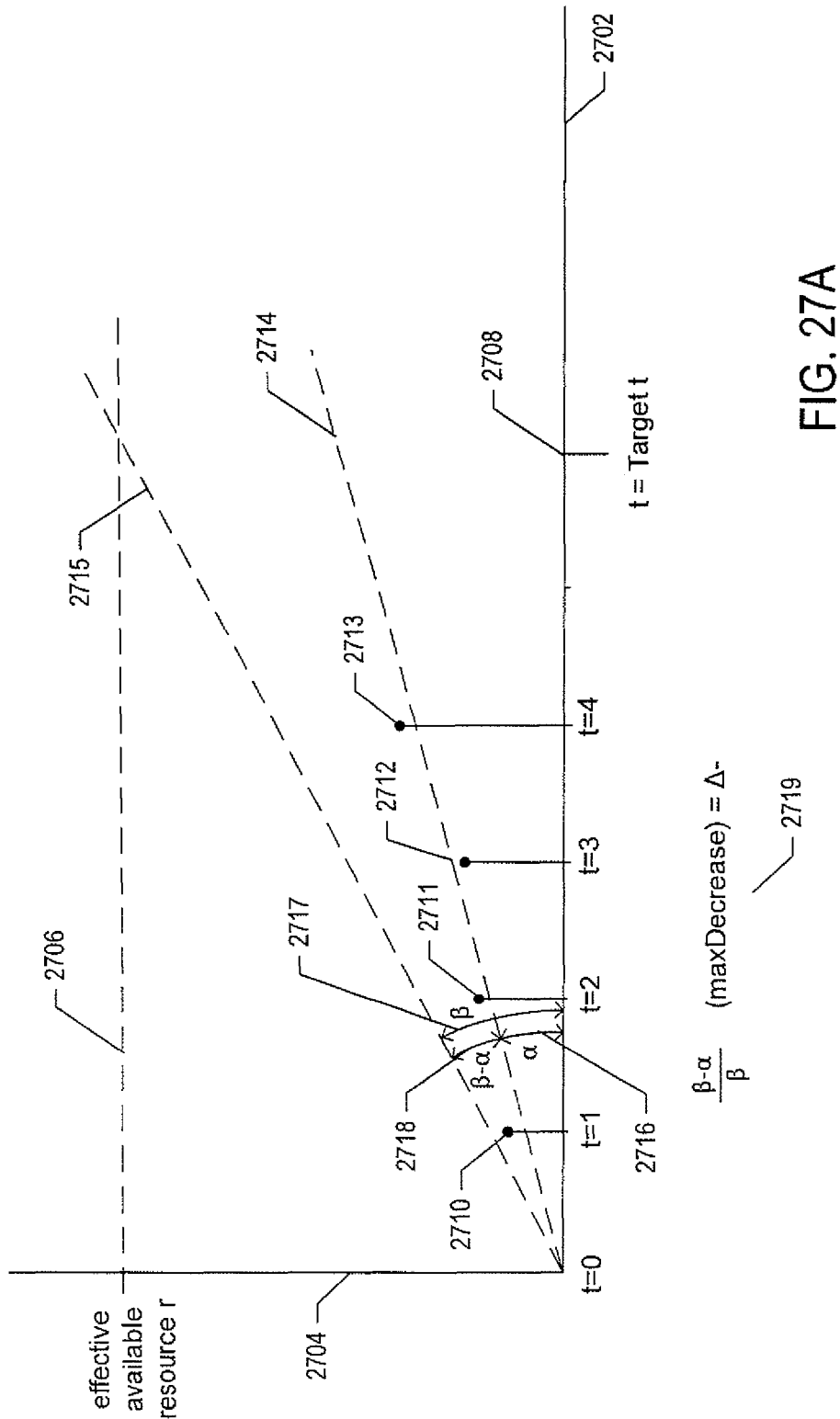
Figure 27B:
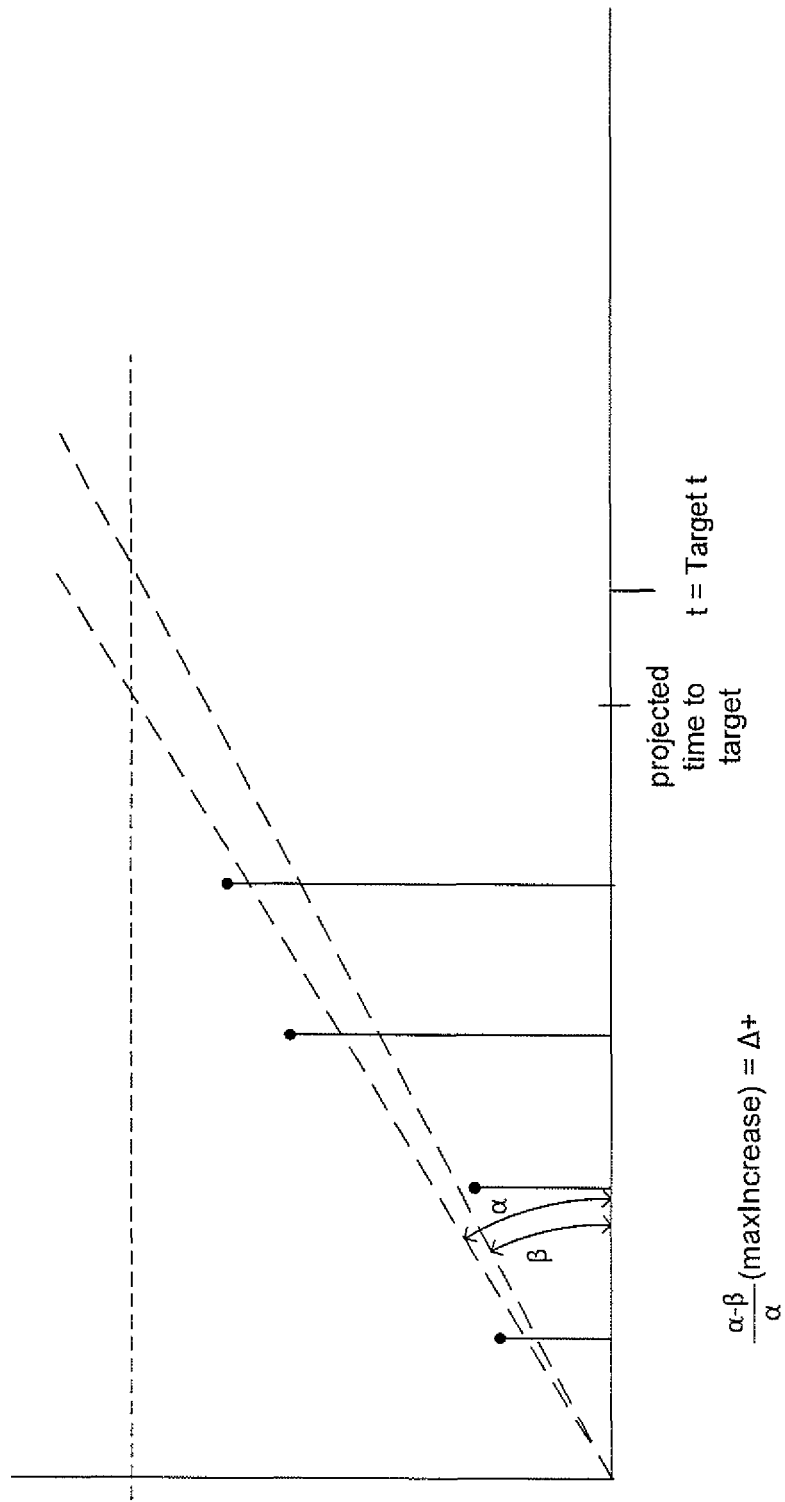

FIGS. 27A-E illustrate automated resource-pricing recalibration by the cloud-exchange system on behalf of resource-provider participants. In the plot shown in FIG. 27A, the horizontal axis 2702 represents time and the vertical axis 2704 represents the effective available resource capacity of a resource r. The horizontal dashed line 2706 represents the initial amount of resource r in the resource pool, in resource units per day. The time Target t 2708 represents a time at which it is desirable for hosted virtual machines to consume all of the effective available capacity of resource r as well as all of the effective available capacities of all other resources considered in hosting pricing. The target time Target t may be determined in a variety of different ways. The target time may be determined as a particular fraction of the total amount of time for which the resources of the resource pool have been made available to the cloud-exchange system. In alternative implementations, the target time may be a parameter value set by a resource-provider computing facility. The points 2710-2713 represent the amount of the resource r consumed by hosted virtual machines at times t=1, t=2, t=3, and t=4. A best-fit line is computed with respect to these points 2714 by any of many different types of linear-regression or curve-fitting methods. Dashed line 2715 represents a resource-consumption rate that would result in all of the available amount of resource r being consumed at target time Target t. Clearly, at the current rate of consumption represented by line 2714, the resource will not be exhausted by target time Target t. When the pricing for the resource r is recalibrated for the resource-provider computer system, at some point in time after time t=4, the cloud-exchange system determines the slope α of the resource-consumption line 2714 the slope β of the ideal resource-consumption line 2715 and the difference in slopes β-α 2718. These measured angles allow the cloud-exchange system to compute an additional price decrease for resource r, as indicated by expression 2719 in FIG. 27A, to be added to the price decrease computed by the methods discussed above with reference to FIGS. 25A-B. FIG. 27B illustrates a similar calculation for a price increase when the rate of consumption of the resource exceeds the target rate of consumption. In one implementation, the recalibration method computes additional price increases and price decreases for resources that are not being consumed according to the desired consumption rate and adds those to the price increases and price decreases computed by the method discussed above with reference to FIGS. 25A-E.

Figure 27C:
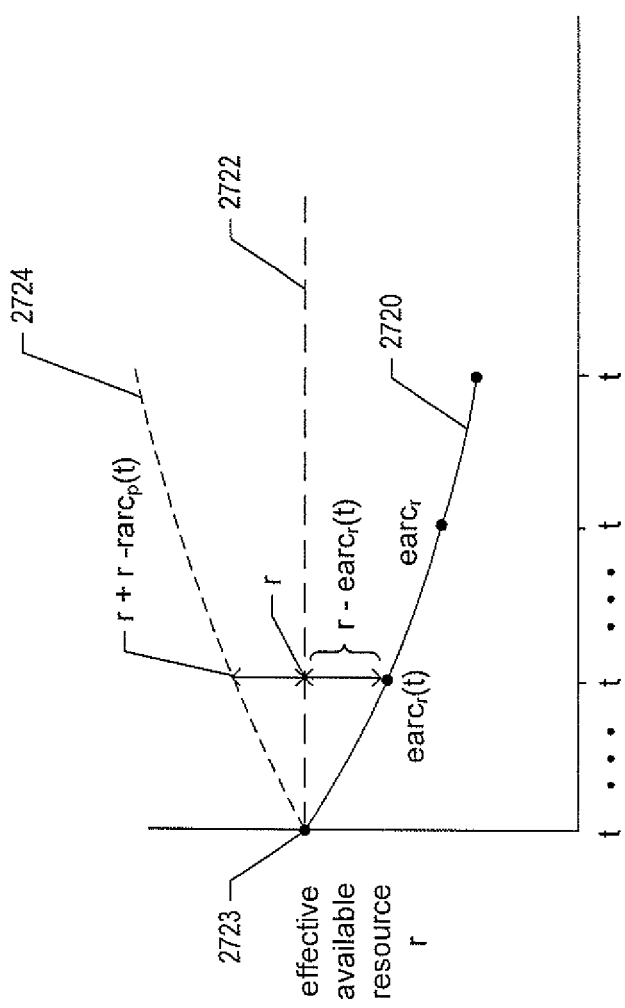

FIG. 27C illustrates prediction or estimation data that may be obtained from analysis of historical market-pricing information, average-consumption-rate information, transaction-history information, and other information stored by the cloud-exchange system. Various methods and analytical subsystems may be employed to generate this type of prediction or estimation data. One effective method and subsystem for resource-consumption prediction involves machine-learning subsystems, in which various types of pattern-recognition and trend-estimation technologies trained on training data generate prediction and estimation data based on various types of information input to them. Machine-learning methods and subsystems include various types of neural networks, convolutional neural networks, and classifiers. As shown in FIG. 27C, the prediction and estimation methods and subsystems may generate an estimated effective available resource curve ("ear curve") 2720 representing a predicted or estimated decrease in the effective available amount of a resource over a next number of time intervals. Mirror reflection of this curve about the horizontal dashed line 2722 through the current amount of the available resource 2723 produces a related estimated consumption curve ("ecc") 2724 indicating the amount of the resource consumed by hosted virtual machines.

Figure 27E:
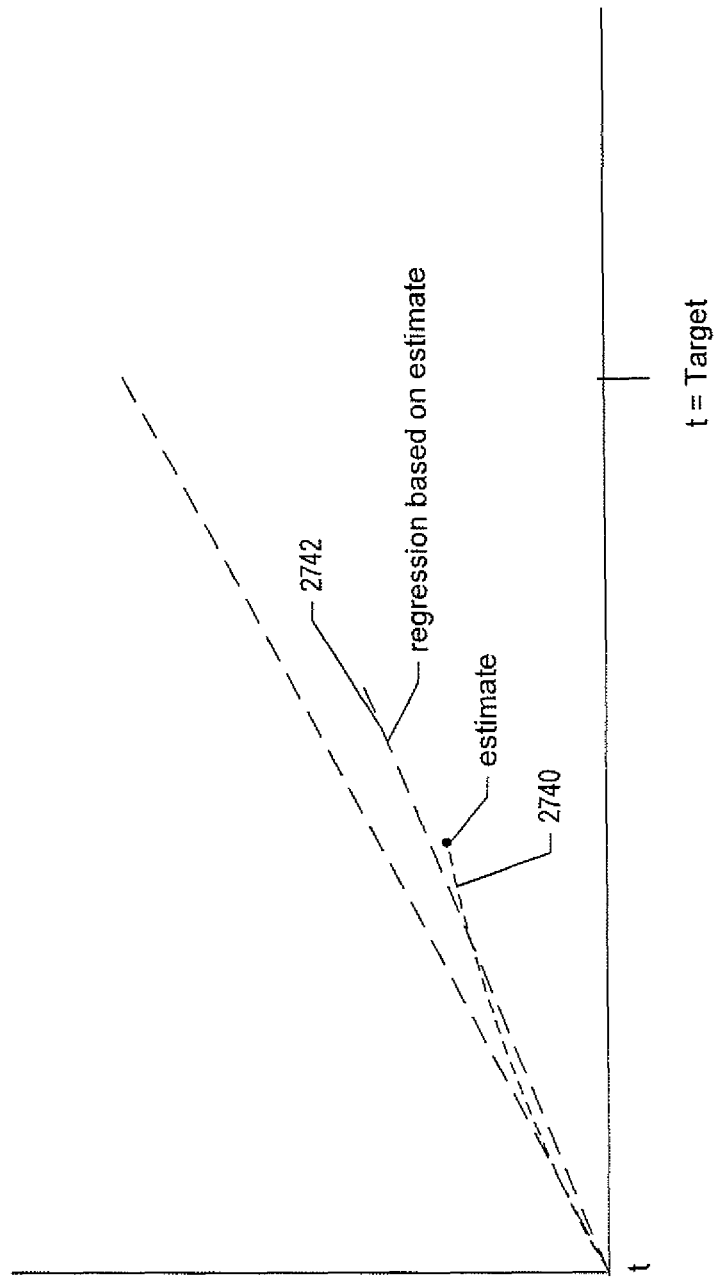

FIG. 27D shows one approach to using the estimated consumption curve for a resource to facilitate recalibration of resource pricing. As shown in FIG. 27D, pricing recalibration that occurs at the point in time 2730 has only two resource-consumption data points 2732-2733 to use for the computation of an additional price decrease, as discussed above with reference to FIG. 27A. However, by employing the above-mentioned data-analysis and consumption-prediction methods and subsystems, estimated values for three additional data points 2734-2736 are obtained. The computed consumption rate, represented by the slope of dashed line 2738, can then be obtained by linear regression of both the resource-consumption data points 2732-2733 as well as the estimated resource-consumption data points 2734-2736. Alternatively, as shown in FIG. 27E, the price correction can be obtained by using the above-mentioned data-analysis and consumption-prediction methods and subsystems, in the absence of actual consumption-rate data, to generate predicted rate-consumption data 2740, and the regression analysis can be carried out on this data to generate the estimated resource-consumption rate represented by dashed line 2742 in preparation for carrying out the computations illustrated in FIG. 27A.

Figure 28A:
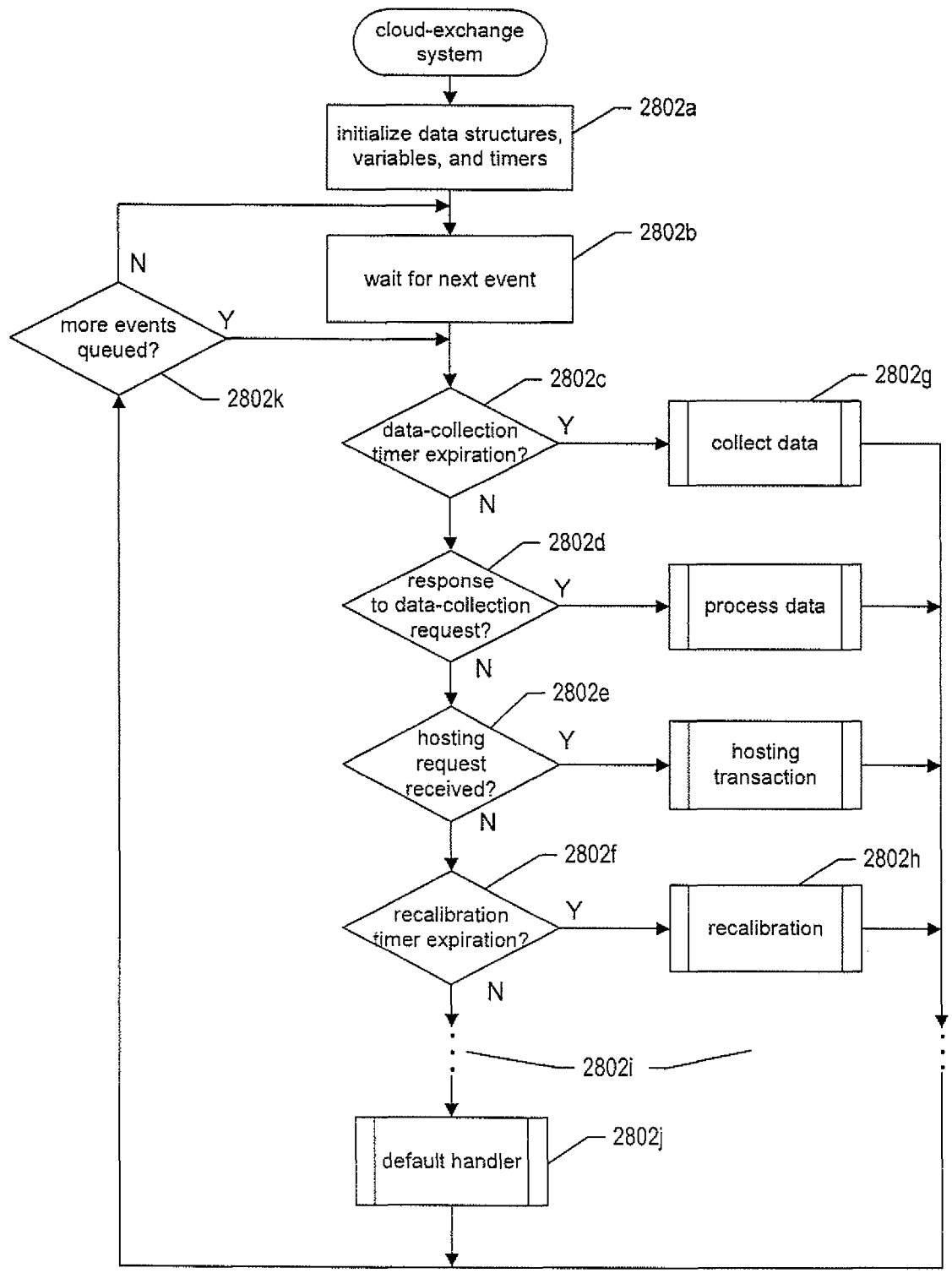
FIGS. 28A-G provide control-flow diagrams that illustrate automated resource-pricing calibration and recalibration by a cloud-exchange system on behalf of resource-provider computing facilities.

FIGS. 28A-G provide control-flow diagrams that illustrate automated resource-pricing calibration and recalibration by a cloud-exchange system on behalf of resource-provider computing facilities. FIG. 28A provides a control-flow diagram for the cloud-exchange system. The cloud-exchange system is modeled, in the control-flow diagram of FIG. 28A, as an event loop that continuously handles various types of events that occur during cloud-exchange-system operation. In step 2802a, the cloud-exchange system initializes various data structures, variables, and timers. Then, in step 2802b, the cloud-exchange system waits for the occurrence of a next event. When a next event occurs, one or more of a series of conditional steps 2802c-f are carried out to determine the type of event that has occurred and to call a corresponding event handler. For example, when the next occurring event is a data-collection timer expiration, as determined in step 2802c, a collect-data routine is called, in step 2802g, to carry out a scheduled data collection from participant computing facilities. As another example, when a recalibration timer expires, as determined in step 2802f, a recalibration handler is called, in step 2802h. Ellipses 2802i indicate that the cloud-exchange event loop may handle many additional types of events. A default handler 2802j handles rare or unexpected events. After an event is handled, when there are more events queued for handling, as determined in step 2802k, control returns to step 2802c to begin determining the type of the next event to handle. Otherwise, control flows to step 2802b.

Automated resource-pricing calibration occurs when a resource provider becomes an active participant of the cloud-exchange system, following registration of the resource-provider computing system with the cloud-exchange system and furnishing of a resource pool by the resource-provider computing system to the cloud-exchange system. Automated resource-pricing calibration occurs periodically, for those resource-provider computing facilities that specify automated pricing recalibration, to continuously adjust pricing in order to steer resource consumption towards full consumption for all resources. In general, a resource-provider computing system may specify automated resource-pricing calibration and recalibration or may, by contrast, prefer that the cloud-exchange system adhere to resource pricing supplied to the cloud-exchange system by the resource-provider system. Additionally, there are intermediate types of pricing strategies that involve the resource-provider computing facility allowing the cloud-exchange system to carry out automated resource-pricing calibration and recalibration up to a specified threshold level, beyond which resource-provider-computing-facility-supplied pricing is used. Automated resource-pricing calibration and recalibration is desirable for many reasons. One reason is that, for many cloud-provider computing facilities, the personnel overhead necessary for monitoring resource-consumption rates and adjusting resource pricing could easily far outweigh any benefits that might be obtained by monitoring and manually adjusting resource pricing. Furthermore, the types of analysis employed by the cloud-exchange system to calibrate and recalibrate resource pricing could not be undertaken by system administrators or managers of participant cloud-computing facilities, who lack the wealth of stored information that allows the cloud-computing system to make pricing adjustments by the above-discussed methods. Furthermore, automated resource-pricing calibration and recalibration can be carried out far more quickly, efficiently, and frequently by the cloud-exchange system, leading to a generally greater efficiency in resource exchange and higher revenues generated by resource exchange on behalf of resource-provider computing-facility participants. Initial automated resource pricing is carried out for a resource-provider computing facility, as mentioned above, when a resource pool is furnished to the cloud-exchange system by the resource-provider computing facility. Thus, when a resource-pool-provision event occurs, often during registration or re-engagement of a resource-provider computing facility with the cloud-exchange system, the provider-pricing routines, discussed below with reference to FIG. 28E, is invoked by the cloud-exchange system. Recalibration is carried out at semi-randomly selected times during each recalibration interval, as discussed below. Each recalibration in the discussed implementation, occurs following expiration of a recalibration timer.

Figure 28B:
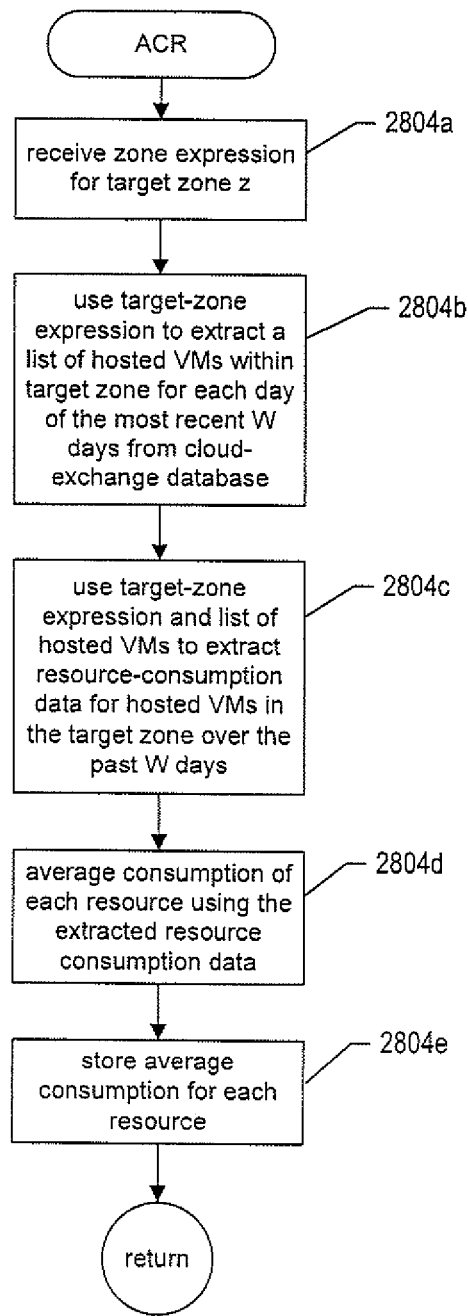

FIG. 28B provides a control-flow diagram for a routine "ACR," which computes the information stored in the ACR table, discussed above with reference to FIG. 25A. In step 2804a, the routine "ACR" receives a target-zone expression for a particular target zone z. The target-zone expression can be used to retrieve, from the cloud-exchange database, resource-consumption data related to target-zone z. In step 2804b, the routine "ACR" uses the received target-zone expression to extract a list of hosted virtual machines within the target zone z for each day of the most recent w days. In step 2804c, the routine "ACR" uses the target-zone expression and the list of hosted VMs to extract resource-consumption data for hosted VMs in the target zone for the past w days. In step 2804d, the routine "ACR" computes the average consumption rate for each of the resources using the extracted resource-consumption data and, in step 2804e, stores the data for use in resource-pricing calibration and recalibration. In certain implementations, ACR data is compiled, at regular intervals, for predefined target zones. In other implementations, the ACR data is compiled in preparation for each resource-pricing calibration or recalibration.

Figure 28C:
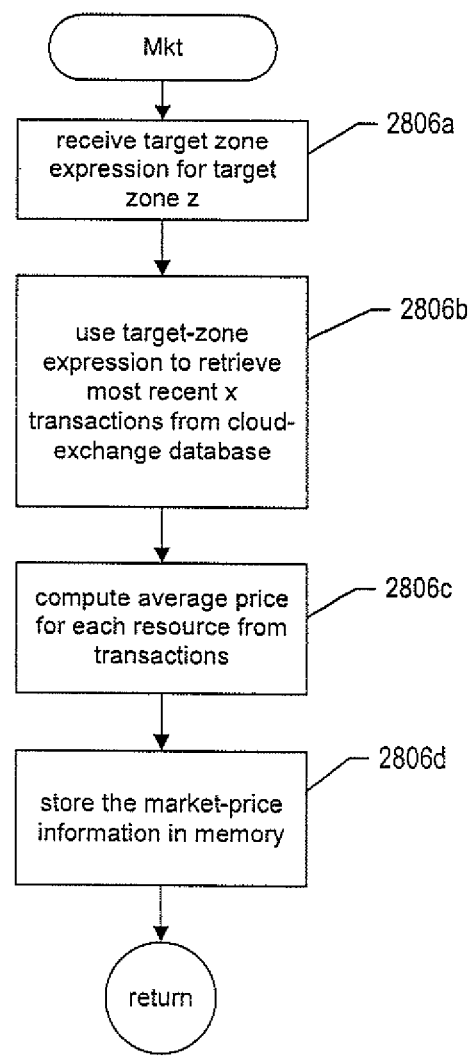

FIG. 28C provides a control-flow diagram for a routine "Mkt," which computes the information stored in the market-resource-prices table discussed above with reference to FIG. 25A. In step 2806a, the routine "Mkt" receives a target-zone expression for target zone z. In step 2806b, the routine "Mkt" uses the target-zone expression to retrieve a most recent set X of hosting transactions for the target zone z the from the cloud-exchange database. In step 2806c, the routine "Mkt" computes an average price for each resource from the set of transactions. In step 2806d, the average price information is stored in memory.

Figure 28D:
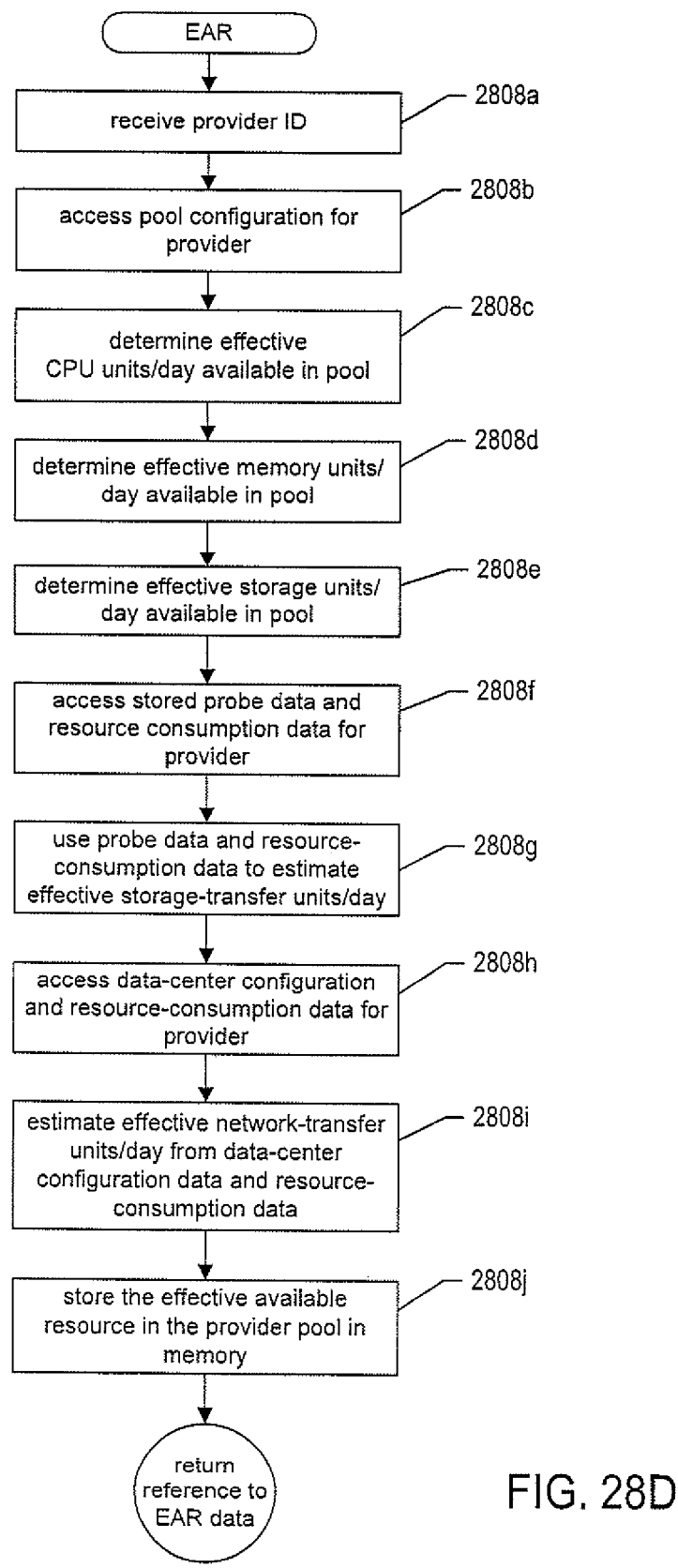
Figure 28E:
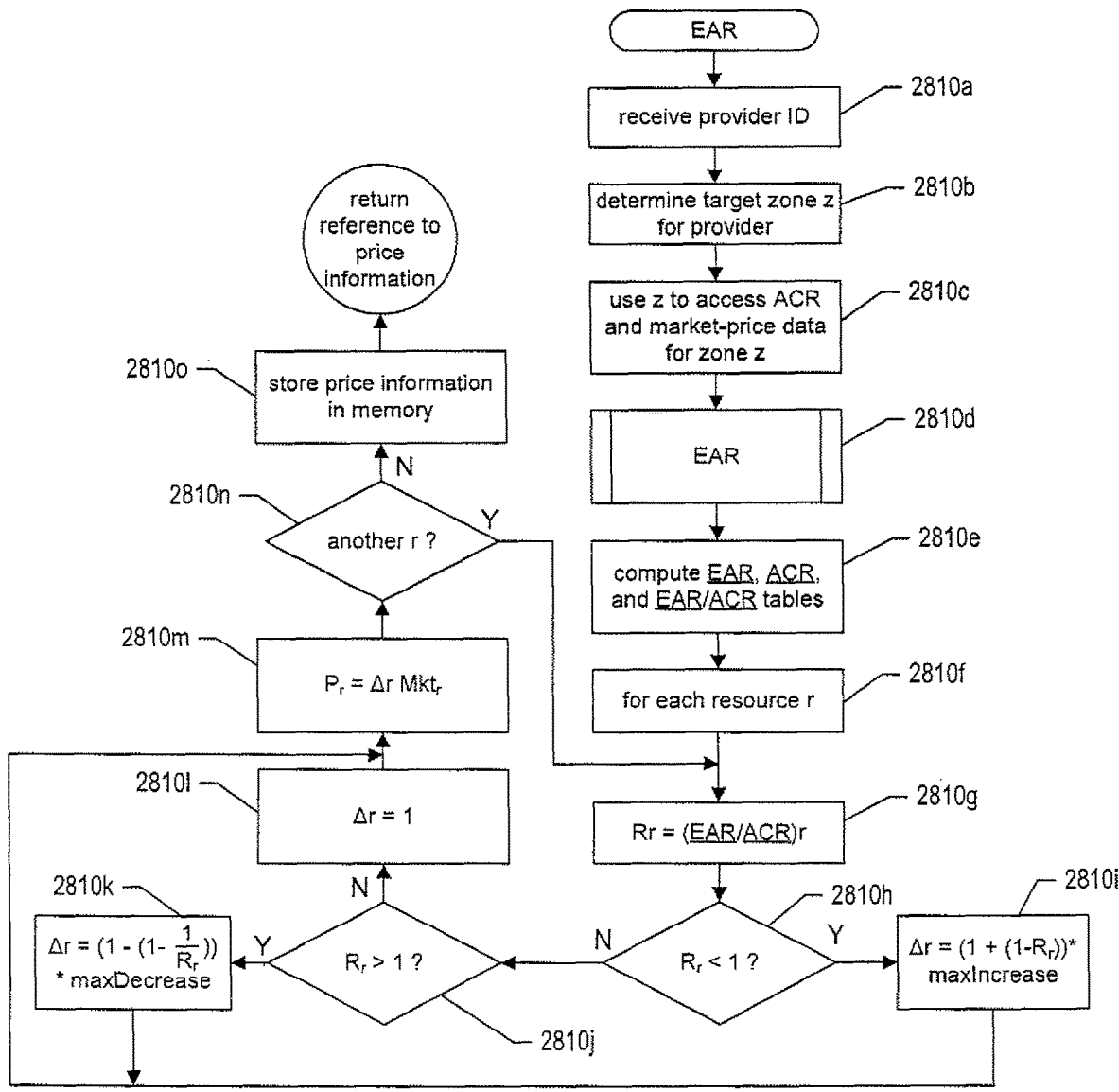

FIG. 28D provides a control-flow diagram for a routine "EAR" that obtains the information compiled in the EAR table discussed above with reference to FIG. 25B. In step 2808a, the routine "EAR" receives a resource-provider identifier. In step 2808b, the routine "EAR" accesses stored resource-pool-configuration information for the provider. In step 2808c, the routine "EAR" determines the effective amount of CPU units per day available in the resource pool. In step 2808d, the routine "EAR" determines the effective amount of memory units per day available in the pool. In step 2808 E, the routine "EAR" determines the effective amount of storage units per day available in the resource pool. In step 2808f, the routine "EAR" accesses stored probe data and resource-consumption data for the resource provider. In step 2808g, the probe data and resource-consumption data is used to estimate the effective storage-transfer units per day. In step 2808h, the routine "EAR" accesses data-center-configuration information and resource-consumption data previously obtained for the resource provider in order to estimate, in step 2808i, the effective network-transfer units per day. In step 2808j, the computed effective available resources in the resource-provider resource pool are stored in memory.

FIG. 28E provides a control-flow diagram for the routine "provider pricing," which is called by the cloud-exchange system to determine initial resource pricing for a resource-provider computing facility that has specified automated or semi-automated resource-pricing calibration and recalibration by the cloud-exchange system. In step 2810a, the routine "provider pricing" receives a resource-provider identifier. In step 2810b, the routine "provider pricing" determines a target zone z for the provider. In step 2810c, the routine "provider pricing" uses the target zone z to access stored ACR and market-price data for trading zone z, if available. Alternatively, the routine "provider pricing" calls the routines "ACR" and "Mkt," discussed above with reference to FIGS. 28B-C, to compile the market-price data and the ACR data for target zone z. In step 2810d, the routine "provider pricing" calls the routine "EAR," discussed above with reference to FIG. 28D, to compile the EAR data for the resource provider. In step 2810e, the routine "provider pricing" prepares the various tables discussed above with reference to FIG. 25D. In the for-loop of steps 2810f-n, the routine "provider pricing" computes the adjusted resource prices using the information computed in step 2810e for each resource according to the method discussed above with reference to FIGS. 25A-E. In step 2810o, the price information is stored in memory to facilitate computing hosting prices during subsequent distributed-search auctions of hosting requests.

Figure 28F:
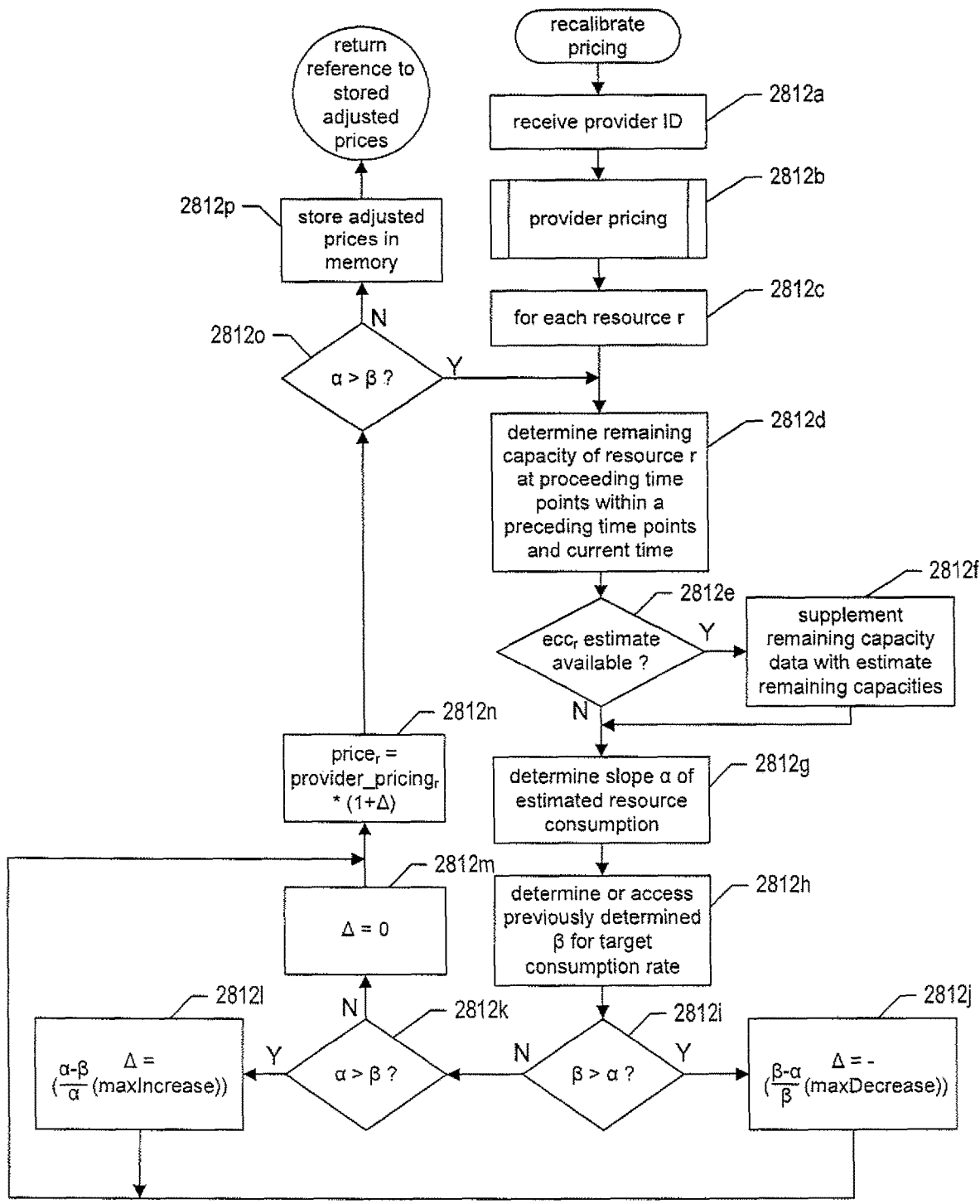

FIG. 28F provides a control-flow diagram for the routine "recalibrate pricing," which computes adjusted resource pricing for resource providers by the cloud-exchange system at various points in time following an initial resource-pricing calibration. In step 2812a, the routine "recalibrate pricing" receives a provider identifier. In step 2812b, the routine "recalibrate pricing" calls the routine "provider pricing," discussed above with reference to FIG. 28E. In the for-loop of steps 2812c-2812o, recalibration of the pricing for each resource r is carried out. In step 2812d, the routine "recalibrate pricing" determines the remaining capacity of resource rat the current time and at preceding time points within a preceding time window, as discussed above with reference to FIGS. 27A-B. When an ecc is available through a data-analysis subcomponent, such as a machine-learning subcomponent, as determined in step 2812e, the remaining-capacity data determined in step 2812d is supplemented with estimated data from the ecc, in step 2812f, as discussed above with reference to FIG. 27D. As discussed above, in alternative implementations, ecc data may be used exclusively as the remaining-capacity data. In step 2812g, the routine "recalibrate pricing" determines the slope α of a best fit line describing the remaining-capacity data, as discussed above with reference to FIG. 27A. In step 2812h, the slope β for a desired resource-consumption line that would result in full use of the resource by a target time is determined or retrieved from data storage. When β is greater than α, as determined in step 2812i, an additional price decrease Δ for the resource is computed in step 2812j, as discussed above with reference to FIG. 27A. Otherwise, when α is greater than β, as determined in step 2812k, an additional price increase Δ is computed for the resource. Otherwise, in step 2812m, the additional price factor Δ is set to 0. In step 2812n, the price for the resource is adjusted by multiplying the resource price by the factor 1 plus Δ. When there are more resources to consider, as determined in step 2812o, control returns to step 2812d for a subsequent iteration of the for-loop of steps 2812c-o. Otherwise, the adjusted prices are stored in memory, in step 2812p.

Figure 28G:
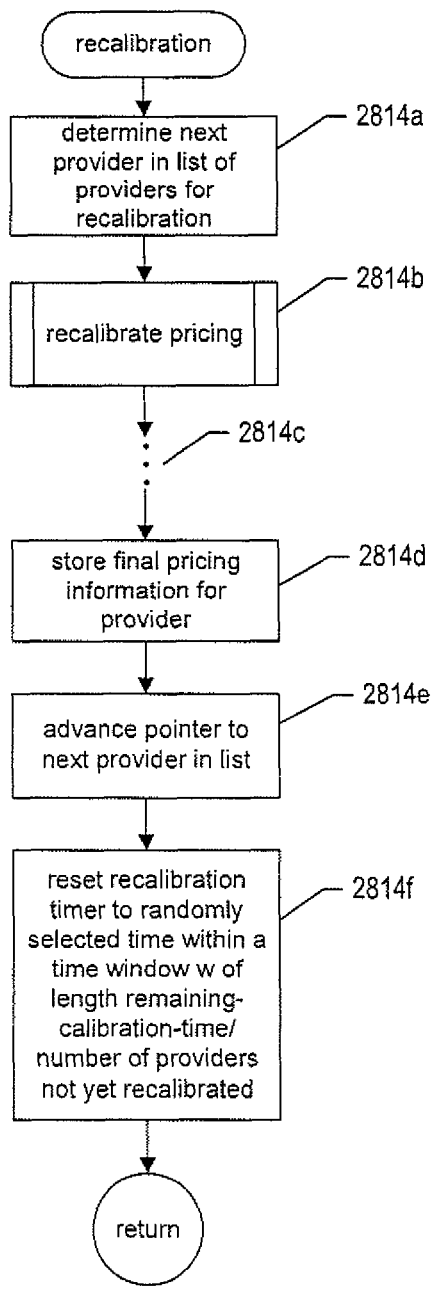

FIG. 28G provides a control-flow diagram for the routine "recalibration," called in step 2802h of FIG. 28A. In step 2814a, the routine "recalibration" determines a next resource-provider computing facility for which recalibration is to be computed from a list of resource providers. As discussed below, this determination is made by accessing a pointer into the list, in certain implementations. In step 2814b, the routine "recalibration" calls the routine "recalibrate pricing," discussed above with reference to FIG. 28F. Ellipses 2814c indicate that additional steps may be carried out. For example, the routine "recalibration" may determine whether or not full automated pricing recalibration is desired by the resource provider and, if not, may make additional adjustments to the pricing computed by the routine "recalibrate pricing" and/or use other constraints and parameter values specified by the resource provider to compute resource pricing. In step 2814d, the routine "recalibration" stores final pricing information for the resource provider. In step 2814; the routine "recalibration" advances a pointer to a next provider in the list of providers and then, in step 2814f, resets the timer to a random expiration time within a time window w of a length that ensures that the number of providers not yet recalibrated will end up being recalibrated by the end of the current recalibration period, such as by the end of the day.

Although the present invention has been described in terms of particular embodiments, it is not intended that the invention be limited to these embodiments. Modifications within the spirit of the invention will be apparent to those skilled in the art. For example, many different design and implementation parameters can be varied to produce alternative implementations, including choice of operating system, the hardware platforms and virtualization layers that are controlled by the distributed service-based application, modular organization, control structures, data structures, and other such parameters. For example, any number of different types of linear-regression and curve-fitting methods and techniques can be used to determine a best-fit line through the resource-consumption data, as discussed above with reference to FIG. 27A. In addition, more complex resource-consumption-estimation methods can be undertaken, with local estimates of the slope of the resource-consumption curves used to compute price adjustments near the point in time corresponding to the current time. A variety of additional methods are available for computing the initial price adjustments to steer hosting requests towards a resource-consumption trajectory that is parallel to, or that has a similar direction with respect to, a theoretical resource-consumption curve that would ensure full use of all resources allocated to the resource pool by a resource provider. Recalibration times and recalibration intervals may vary from implementation to implementation.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated resource-exchange system comprising:
multiple resource-exchange-system participants, each comprising a computing facility that includes multiple computers, each having one or more processors and one or more memories, and a local cloud-exchange instance; and
a cloud-exchange system that is implemented on one or more physical computers, each including one or more processors and one or more memories, and that includes a cloud-exchange engine, the cloud-exchange system
receiving hosting requests from resource-consumer resource-exchange-system participants,
identifying, in response to the hosting requests, resource-provider resource-exchange-system participants to host computational entities on behalf of the resource-consumer resource-exchange-system participants by a distributed search carried out by the cloud-exchange engine,
automatically determining initial resource prices for computational resources provided to the resource-exchange system by a particular resource-provider resource-exchange-system participant, the computational resources placed in a resource pool from which computational resources are subsequently allocated for hosting computational entities on behalf of resource-consumer resource-exchange-system participants, and
automatically recalibrating the resource prices for computational resources in the resource pool provided by the particular resource-provider resource-exchange-system participant.

2. The automated resource-exchange system of claim 1 wherein the cloud-exchange system automatically determines initial resource prices for computational resources provided by the particular resource-provider resource-exchange-system participant to the resource-exchange system in a resource pool by:
determining a target-time goal for depletion of the computational resources in the pool;
determining an expected proportion of the amounts of the computational resources requested in a hosting request;
determining market prices for the computational resources in the pool; and
determining initial resource prices for the computational resources by
initially selecting the market prices for the computational resources, and
modifying the selected market prices in order to steer the proportion of the amounts of the computational resources requested in a hosting request towards the proportion of the amounts of the computational resources in the resource pool.

3. The automated resource-exchange system of claim 2 wherein determining a target-time goal for depletion of the computational resources in the pool further comprises one of:
determining the target-time goal from one or more parameter values supplied to the resource-exchange system by the particular resource-provider resource-exchange-system participant; and
determining the target-time goal as a fraction of a time for which the particular resource-provider resource-exchange-system participant provided the computing resources in the resource pool to the resource-exchange system.

4. The automated resource-exchange system of claim 2 wherein determining an expected proportion of the amounts of the computational resources requested in a hosting request further comprises using information collected by the resource-exchange system related to the consumption of computing resources by hosted computational entities over a recent period of time to determine a proportion of the average amounts of computational resources consumed by hosted computational entities.

5. The automated resource-exchange system of claim 4 wherein information collected by the resource-exchange system related to the consumption of computing resources by hosted computational entities within a target zone is used to determine the proportion of the average amounts of computational resources consumed by hosted computational entities.

6. The automated resource-exchange system of claim 5 wherein the target zone is determined by one of:
determining a set of resource-provider resource-exchange-system participants within a threshold geographical distance from the particular resource-provider resource-exchange-system participant;
determining a set of resource-provider resource-exchange-system participants with less than a threshold network latency with respect to a target computer system; and
determining a set of resource-provider resource-exchange-system participants that meet a set of constraints and characteristics.

7. The automated resource-exchange system of claim 2 wherein determining market prices for the computational resources in the pool further comprises:
   using information collected by the resource-exchange system related to a recent set of hosting transactions to determine the average prices of computational resources requested for consumption.

8. The automated resource-exchange system of claim 7 wherein the recent set of hosting transactions includes one of:
   a fixed number of most recent completed hosting transactions; and
   a set of hosting transactions completed within a recent period of time.

9. The automated resource-exchange system of claim 7 wherein using information collected by the resource-exchange system related to a recent set of hosting transactions further comprises:
   using information collected by the resource-exchange system related to a recent set of hosting transactions within a target zone determined by one of
      determining a set of resource-provider resource-exchange-system participants within a threshold geographical distance from the particular resource-provider resource-exchange-system participant,
      determining a set of resource-provider resource-exchange-system participants with less than a threshold network latency with respect to a target computer system, and
      determining a set of resource-provider resource-exchange-system participants that meet a set of constraints and characteristics.

10. The automated resource-exchange system of claim 2 wherein modifying the selected market prices in order to steer the proportion of the amounts of the computational resources requested in a hosting request towards the proportion of the amounts of the computational resources in the resource pool further comprises:
   determining normalized amounts of the expected computational resources requested in a hosting request;
   determining normalized amounts of the computational resources in the resource pool; and
   for each computational resource,
      determining a normalized ratio of the amount of the computational resource in the resource pool to the average amount of the computational resource consumed by a hosted computational entity,
      when the normalized ratio is greater than one, modifying the market price for the resource by proportionally decreasing the market price, and
      when the normalized ratio is less than one, modifying the market price for the resource by proportionally increasing the market price.

11. The automated resource-exchange system of claim 1 wherein automatically recalibrating the resource prices for computational resources in the resource pool provided by the particular resource-provider resource-exchange-system participant further comprises:
   determining a target-time goal for depletion of the computational resources in the pool;
   determining an expected proportion of the amounts of the computational resources requested in a hosting request;
   determining market prices for the computational resources in the pool;
   determining initial recalibrated resource prices for the computational resources by
      initially selecting the market prices for the computational resources, and
      modifying the selected market prices in order to steer the proportion of the amounts of the computational resources requested in a hosting request towards the proportion of the amounts of the computational resources in the resource pool;
   using resource-consumption data for computational resources hosted by the particular resource-provider resource-exchange-system participant to determine a rate of consumption for each computational resource;
   determining a target rate of consumption for the computational resources from the determined target-time goal for depletion; and
   for each computational resource,
      further adjusting the modified selected market prices according to a ratio of the determined rate of consumption for the computational resource to the determined target rate of consumption for the computational resource.

12. The automated resource-exchange system of claim 11 wherein the resource-consumption data is obtained by one or more of:
   historical resource-consumption data for computational resources hosted by the particular resource-provider resource-exchange-system participant; and
   estimated resource-consumption data for computational resources hosted by the particular resource-provider resource-exchange-system participant obtained from a machine-learning subsystem.

13. The automated resource-exchange system of claim 1 wherein automatic recalibration of the resource prices for computational resources in the resource pool provided by the particular resource-provider resource-exchange-system participant occurs at time selected from a recalibration interval by a pseudorandom process.

14. The automated resource-exchange system of claim 1 wherein the computational resources include:
   central processing unit, in units of 1,000,000,000,000 operations;
   memory, in units of 1 GB of memory used for an hour;
   data storage, in units of 1 GB of data stored for an hour;
   storage transfer, in units of 1 GB of data transferred to, or retrieved from, mass-storage devices; and
   network transfer, in units of 1 GB of data transferred to, or received from, the network.

15. An automated method comprising:
   in an automated resource-exchange system that includes multiple resource-exchange-system participants, each comprising a computing facility that includes multiple computers, each having one or more processors and one or more memories, and a local cloud-exchange instance, and a cloud-exchange system that is implemented on one or more physical computers, each including one or more processors and one or more memories, and that includes a cloud-exchange engine,
      automatically determining initial resource prices for computational resources provided to a resource-exchange system by a particular resource-provider resource-exchange-system participant, the computational resources placed in a resource pool from which computational resources are subsequently allocated for hosting computational entities on behalf of resource-consumer resource-exchange-system participants, and automatically recalibrating the resource prices for computational resources in the resource pool provided by the particular resource-provider resource-exchange-system participant.

16. The method of claim 15 wherein automatically determining initial resource prices for computational resources provided by the particular resource-provider resource-exchange-system participant to the resource-exchange system in the resource pool further comprises:
  determining a target-time goal for depletion of the computational resources in the pool;
  determining an expected proportion of the amounts of the computational resources requested in a hosting request;
  determining market prices for the computational resources in the pool; and
  determining initial resource prices for the computational resources by
    initially selecting the market prices for the computational resources, and
    modifying the selected market prices in order to steer the proportion of the amounts of the computational resources requested in a hosting request towards the proportion of the amounts of the computational resources in the resource pool.

17. The method of claim 16 wherein modifying the selected market prices in order to steer the proportion of the amounts of the computational resources requested in a hosting request towards the proportion of the amounts of the computational resources in the resource pool further comprises:
  determining normalized amounts of the expected computational resources requested in a hosting request;
  determining normalized amounts of the computational resources in the resource pool; and
  for each computational resource,
    determining a normalized ratio of the amount of the computational resource in the resource pool to the average amount of the computational resource consumed by a hosted computational entity,
    when the normalized ratio is greater than one, modifying the market price for the resource by proportionally decreasing the market price, and
    when the normalized ratio is less than one, modifying the market price for the resource by proportionally increasing the market price.

18. The method of claim 16 wherein automatically recalibrating the resource prices for computational resources in the resource pool provided by the particular resource-provider resource-exchange-system participant further comprises:
  determining a target-time goal for depletion of the computational resources in the pool;
  determining an expected proportion of the amounts of the computational resources requested in a hosting request;
  determining market prices for the computational resources in the pool;
  determining initial recalibrated resource prices for the computational resources by
    initially selecting the market prices for the computational resources, and
    modifying the selected market prices in order to steer the proportion of the amounts of the computational resources requested in a hosting request towards the proportion of the amounts of the computational resources in the resource pool;
  using resource-consumption data for computational resources hosted by the particular resource-provider resource-exchange-system participant to determine a rate of consumption for each computational resource;
  determining a target rate of consumption for the computational resources from the determined target-time goal for depletion; and
  for each computational resource,
    further adjusting the modified selected market prices according to a ratio of the determined rate of consumption for the computational resource to the determined target rate of consumption for the computational resource.

19. The method of claim 18 herein the resource-consumption data is obtained by one or more of:
  historical resource-consumption data for computational resources hosted by the particular resource-provider resource-exchange-system participant; and
  estimated resource-consumption data for computational resources hosted by the particular resource-provider resource-exchange-system participant obtained from a machine-learning subsystem.

20. A physical data-storage device encoded with computer instructions that, when executed by processors within an automated resource-exchange system comprising resource-exchange-system-participant computing facilities and a cloud-exchange system, control the automated resource-exchange system to:
  automatically determine initial resource prices for computational resources provided to the resource-exchange system by a particular resource-provider resource-exchange-system participant, the computational resources placed in a resource pool from which computational resources are subsequently allocated for hosting computational entities on behalf of resource-consumer resource-exchange-system participants, and
  automatically recalibrate the resource prices for computational resources in the resource pool provided by the particular resource-provider resource-exchange-system participant.

* * * * *